US012052555B2

(12) United States Patent
Nelson et al.

(10) Patent No.: US 12,052,555 B2
(45) Date of Patent: *Jul. 30, 2024

(54) ELECTRONIC FURNITURE SYSTEMS WITH INTEGRATED INDUCTION CHARGER

(71) Applicant: THE LOVESAC COMPANY, Stamford, CT (US)

(72) Inventors: Shawn D. Nelson, Washington, UT (US); David M. Underwood, Hurricane, UT (US); Brian Kuchler, Hurricane, UT (US); Clint Gibson, St. George, UT (US); Troy Christiansen, St. George, UT (US)

(73) Assignee: THE LOVESAC COMPANY, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/300,148

(22) Filed: Apr. 13, 2023

(65) Prior Publication Data

US 2023/0319473 A1 Oct. 5, 2023

Related U.S. Application Data

(63) Continuation of application No. 17/128,575, filed on Dec. 21, 2020, which is a continuation-in-part of (Continued)

(51) Int. Cl.
*H04R 5/02* (2006.01)
*A47C 7/72* (2006.01)
(Continued)

(52) U.S. Cl.
CPC ............... *H04R 5/023* (2013.01); *A47C 7/72* (2013.01); *A47C 7/727* (2018.08); (Continued)

(58) Field of Classification Search
None
See application file for complete search history.

(56) References Cited

U.S. PATENT DOCUMENTS 988,059 A 3/1911 Allen
2,625,983 A 1/1953 Raymond et al.
(Continued)

FOREIGN PATENT DOCUMENTS

CN 2236262 Y 10/1996
CN 101005741 A 7/2007
(Continued)

OTHER PUBLICATIONS

Notice of Allowance and Fees Due (PTOL-85) dated Jul. 17, 2023 for U.S. Appl. No. 17/348,088, 22 page(s).
(Continued)

*Primary Examiner* — Quynh H Nguyen
(74) *Attorney, Agent, or Firm* — Polsinelli PC

(57) ABSTRACT

A furniture system includes a base and transverse member, with an induction charger provided in the transverse member and/or base, hidden from view and feel. The induction charger can be at least partially secured to either the base frame or the transverse member frame. The induction charger provides induction charging to a device positioned adjacent to a charging surface of the base or transverse member. The charging surface is positioned adjacent to the induction charger. Additionally, the induction charger is positioned between a first and second cushioning material. The first cushioning material is adjacent to (e.g., proximal to or on) the charging surface. The first and second cushioning materials have respective depths.

19 Claims, 42 Drawing Sheets

Related U.S. Application Data application No. 16/738,916, filed on Jan. 9, 2020, now Pat. No. 11,178,487, which is a continuation-in-part of application No. 16/273,773, filed on Feb. 12, 2019, now Pat. No. 11,172,301, which is a continuation of application No. 15/348,068, filed on Nov. 10, 2016, now Pat. No. 10,212,519, which is a continuation-in-part of application No. 15/270,339, filed on Sep. 20, 2016, now Pat. No. 10,236,643.

(60) Provisional application No. 62/257,623, filed on Nov. 19, 2015, provisional application No. 62/417,091, filed on Nov. 3, 2016.

(51) Int. Cl.
*A61H 23/02* (2006.01)
*H04R 1/02* (2006.01)

(52) U.S. Cl.
CPC ......... *A61H 23/0236* (2013.01); *H04R 1/025* (2013.01); *H04R 2201/028* (2013.01); *H04R 2420/07* (2013.01)

(56) References Cited

U.S. PATENT DOCUMENTS

| | | | |
|---|---|---|---|
| 2,653,648 | A | 9/1953 | Paul |
| 3,113,633 | A | 12/1963 | Eberhardt et al. |
| 3,870,297 | A | 3/1975 | Elder |
| 3,880,152 | A | 4/1975 | Nohmura |
| 3,893,731 | A | 7/1975 | Maggs |
| 4,120,017 | A | 10/1978 | Sickles |
| 4,124,249 | A | 11/1978 | Abbeloos |
| 4,321,717 | A | 3/1982 | Serra |
| 4,507,816 | A | 4/1985 | Smith, Jr. |
| 4,734,946 | A | 4/1988 | Saputo |
| 4,846,525 | A | 7/1989 | Manning |
| 5,106,153 | A | 4/1992 | Durling |
| 5,133,017 | A | 7/1992 | Cain et al. |
| 5,173,943 | A | 12/1992 | Dzurko |
| 5,362,296 | A | 11/1994 | Wang et al. |
| 5,367,727 | A | 11/1994 | Dyer, Jr. |
| 5,368,359 | A | 11/1994 | Eakin |
| 5,397,727 | A | 3/1995 | Lee et al. |
| 5,544,938 | A | 8/1996 | Saul et al. |
| 5,624,156 | A | 4/1997 | Leal et al. |
| 5,681,179 | A | 10/1997 | Lane |
| 5,683,139 | A | 11/1997 | Golynsky et al. |
| 5,735,573 | A | 4/1998 | Vredevoogd |
| 5,740,564 | A | 4/1998 | Hankins et al. |
| 5,790,993 | A | 8/1998 | Roma et al. |
| 5,828,766 | A | 10/1998 | Gallo |
| 5,895,365 | A | 4/1999 | Tomlinson |
| 5,967,820 | A | 10/1999 | Siegal et al. |
| 5,995,634 | A | 11/1999 | Zwolski |
| 6,000,353 | A | 12/1999 | De Leu |
| 6,000,758 | A | 12/1999 | Schaffner et al. |
| 6,073,723 | A | 6/2000 | Gallo |
| 6,092,867 | A | 7/2000 | Miller |
| 6,322,146 | B1 | 11/2001 | Fisher, Jr. |
| 6,683,965 | B1 | 1/2004 | Sapiejewski |
| 6,814,709 | B2 | 11/2004 | Schwartz et al. |
| 7,003,832 | B2 | 2/2006 | Wilson |
| 7,090,297 | B2 | 8/2006 | Mohn et al. |
| 7,164,255 | B2 | 1/2007 | Hui |
| 7,172,196 | B2 | 2/2007 | Randall |
| 7,213,885 | B2 | 5/2007 | White, III et al. |
| D547,087 | S | 7/2007 | Natuzzi |
| 7,312,393 | B2 | 12/2007 | McCarthy |
| 7,385,357 | B2 | 6/2008 | Kuennen et al. |
| 7,419,220 | B2 | 9/2008 | White et al. |
| 7,421,608 | B2 | 9/2008 | Schron |
| 7,547,073 | B2 | 6/2009 | White et al. |
| 7,553,288 | B2 | 6/2009 | Cohen |
| 7,575,279 | B2 | 8/2009 | Robertson |
| 7,631,937 | B2 | 12/2009 | Robertson |
| 7,699,389 | B2 | 4/2010 | Robertson |
| 7,735,912 | B2 | 6/2010 | Robertson |
| 7,766,421 | B2 | 8/2010 | Lawson |
| 7,825,625 | B2 | 11/2010 | Posamentier |
| 7,868,587 | B2 | 1/2011 | Stevens et al. |
| 7,871,280 | B2 | 1/2011 | Henriott |
| 7,918,308 | B2 | 4/2011 | Cohen |
| 7,963,612 | B2 | 6/2011 | Nelson |
| 7,982,436 | B2 | 7/2011 | Randall |
| 8,004,235 | B2 | 8/2011 | Baarman et al. |
| 8,035,340 | B2 | 10/2011 | Stevens et al. |
| 8,061,864 | B2 | 11/2011 | Metcalf et al. |
| 8,074,581 | B2 | 12/2011 | Epstein et al. |
| 8,097,984 | B2 | 1/2012 | Baarman et al. |
| 8,132,856 | B2 | 3/2012 | Wilson et al. |
| 8,146,229 | B2 | 4/2012 | Henriott et al. |
| 8,188,854 | B2 | 5/2012 | Yamashita |
| 8,228,026 | B2 | 7/2012 | Johnson et al. |
| 8,258,653 | B2 | 9/2012 | Kitamura et al. |
| 8,290,463 | B2 | 10/2012 | Liu et al. |
| 8,299,753 | B2 | 10/2012 | Hui |
| 8,324,759 | B2 | 12/2012 | Karalis et al. |
| 8,330,414 | B2 | 12/2012 | Takahashi et al. |
| 8,344,552 | B2 | 1/2013 | Cook et al. |
| RE44,038 | E | 3/2013 | Cho |
| 8,421,407 | B2 | 4/2013 | Johnson |
| 8,427,011 | B2 | 4/2013 | Jung et al. |
| 8,446,046 | B2 | 5/2013 | Fells et al. |
| 8,471,410 | B2 | 6/2013 | Karalis et al. |
| 8,519,668 | B2 | 8/2013 | Hui |
| 8,552,593 | B2 | 10/2013 | Jung et al. |
| 8,554,165 | B2 | 10/2013 | Liu et al. |
| 8,618,697 | B2 | 12/2013 | Karaoguz et al. |
| RE44,713 | E | 1/2014 | Jung |
| 8,629,578 | B2 | 1/2014 | Kurs et al. |
| 8,664,914 | B2 | 3/2014 | Toya et al. |
| 8,668,045 | B2 | 3/2014 | Cohen |
| 8,669,676 | B2 | 3/2014 | Karalis et al. |
| 8,716,977 | B2 | 5/2014 | Walley et al. |
| 8,760,010 | B2 | 6/2014 | Jung et al. |
| 8,783,778 | B2 | 7/2014 | Nelson et al. |
| 8,786,252 | B2 | 7/2014 | Toya et al. |
| 8,831,513 | B2 | 9/2014 | Baarman |
| 8,853,892 | B2 | 10/2014 | Fells et al. |
| 8,914,080 | B2 | 12/2014 | Kowalewski |
| 8,920,191 | B2 | 12/2014 | Carpanzano |
| 8,935,985 | B2 | 1/2015 | Hjelm |
| 9,010,851 | B2 | 4/2015 | Lapointe |
| 9,088,117 | B2 | 7/2015 | Rosenblum |
| 9,095,209 | B2 | 8/2015 | Mirth et al. |
| 9,119,000 | B2 | 8/2015 | Tracy |
| 9,124,106 | B2 | 9/2015 | Toya et al. |
| 9,124,308 | B2 | 9/2015 | Metcalf |
| 9,130,395 | B2 | 9/2015 | Jung |
| 9,142,995 | B2 | 9/2015 | Jung |
| 9,178,376 | B2 | 11/2015 | Jung et al. |
| 9,185,988 | B1 | 11/2015 | Sanchez |
| 9,277,826 | B2 | 3/2016 | Nelson et al. |
| 9,295,339 | B2 | 3/2016 | Hampton |
| 9,312,711 | B2 | 4/2016 | Toya et al. |
| 9,318,912 | B2 | 4/2016 | Baarman et al. |
| 9,362,779 | B2 | 6/2016 | Takahashi et al. |
| RE46,111 | E | 8/2016 | Kook |
| 9,419,478 | B2 | 8/2016 | Jung et al. |
| 9,438,069 | B2 | 9/2016 | Hongo |
| 9,490,654 | B2 | 11/2016 | Tomiki et al. |
| 9,520,738 | B2 | 12/2016 | Rejman et al. |
| 9,529,431 | B2 | 12/2016 | Bleacher et al. |
| 9,531,197 | B2 | 12/2016 | Jung et al. |
| 9,585,468 | B2 | 3/2017 | Udagawa et al. |
| 9,608,474 | B2 | 3/2017 | Mack |
| 9,685,817 | B2 | 6/2017 | Jung |
| 9,734,815 | B2 | 8/2017 | Defranks et al. |
| 9,735,836 | B2 | 8/2017 | Van Wageningen |
| 9,762,092 | B2 | 9/2017 | Jung et al. |
| 9,788,092 | B2 | 10/2017 | Rawls-Meehan et al. |
| 9,843,230 | B2 | 12/2017 | John |

(56) References Cited

U.S. PATENT DOCUMENTS

| | | | |
|---|---|---|---|
| 9,853,405 | B2 * | 12/2017 | Suri .................... H01R 25/006 |
| 9,905,217 | B2 | 2/2018 | Hyde et al. |
| 9,912,188 | B2 | 3/2018 | Lohr |
| 9,975,459 | B2 | 5/2018 | Takada et al. |
| 9,984,686 | B1 | 5/2018 | Mutagi et al. |
| 9,985,463 | B2 | 5/2018 | Seki et al. |
| 10,051,354 | B2 | 8/2018 | Linjama et al. |
| 10,074,475 | B2 | 9/2018 | Lohr et al. |
| 10,101,488 | B2 | 10/2018 | Krupezevic et al. |
| 10,103,584 | B2 | 10/2018 | Van Wageningen et al. |
| 10,123,621 | B2 | 11/2018 | Nelson et al. |
| 10,143,307 | B2 | 12/2018 | Nelson et al. |
| 10,212,519 | B2 | 2/2019 | Nelson et al. |
| 10,235,543 | B2 | 3/2019 | Pachler et al. |
| 10,235,643 | B2 | 3/2019 | Sawka |
| 10,236,643 | B2 | 3/2019 | Nelson et al. |
| 10,239,413 | B2 | 3/2019 | Riedel et al. |
| D848,393 | S | 5/2019 | Pennanen et al. |
| 10,299,095 | B2 | 5/2019 | Porat et al. |
| 10,305,329 | B2 | 5/2019 | Baarman et al. |
| 10,320,244 | B2 | 6/2019 | Van Wageningen |
| 10,326,317 | B2 | 6/2019 | Krupezevic et al. |
| 10,340,744 | B2 | 7/2019 | Tominaga et al. |
| 10,439,445 | B2 | 10/2019 | Jung et al. |
| 10,511,183 | B2 | 12/2019 | Pan et al. |
| 10,545,180 | B2 | 1/2020 | Van Wageningen |
| 10,679,601 | B2 | 6/2020 | Linjama et al. |
| RE48,193 | E | 9/2020 | Cho |
| 10,827,280 | B2 | 11/2020 | Linjama et al. |
| 10,957,302 | B2 | 3/2021 | Linjama et al. |
| 10,972,838 | B2 | 4/2021 | Nelson et al. |
| 10,979,241 | B2 | 4/2021 | Nelson et al. |
| 11,039,234 | B2 | 6/2021 | Linjama et al. |
| 11,112,301 | B2 | 9/2021 | Lee et al. |
| 11,139,698 | B2 | 10/2021 | Jung et al. |
| 11,159,026 | B2 | 10/2021 | Kim |
| 11,172,301 | B2 | 11/2021 | Nelson |
| 11,178,486 | B2 | 11/2021 | Nelson et al. |
| 11,178,487 | B2 | 11/2021 | Nelson et al. |
| 11,374,417 | B2 | 6/2022 | Bober et al. |
| 11,381,091 | B2 | 7/2022 | Fang et al. |
| 11,435,534 | B2 | 9/2022 | Hill et al. |
| 11,444,485 | B2 | 9/2022 | Partovi |
| 11,469,615 | B2 | 10/2022 | Bober et al. |
| 11,647,840 | B2 | 5/2023 | Nelson et al. |
| 11,689,856 | B2 | 6/2023 | Nelson et al. |
| 2001/0020810 | A1 | 9/2001 | Kennedy |
| 2002/0063454 | A1 | 5/2002 | Illulian |
| 2003/0025366 | A1 | 2/2003 | Barreiro |
| 2003/0102657 | A1 | 6/2003 | Kuo |
| 2003/0139693 | A1 | 7/2003 | Swift |
| 2004/0026998 | A1 | 2/2004 | Henriott et al. |
| 2004/0061943 | A1 | 4/2004 | Bosch et al. |
| 2004/0095000 | A1 | 5/2004 | Durling |
| 2005/0007067 | A1 | 1/2005 | Baarman et al. |
| 2005/0008147 | A1 | 1/2005 | Lee |
| 2005/0053252 | A1 | 3/2005 | Cohen |
| 2005/0096098 | A1 | 5/2005 | Woods |
| 2005/0185801 | A1 | 8/2005 | McCarty et al. |
| 2005/0253430 | A1 | 11/2005 | George et al. |
| 2005/0264044 | A1 | 12/2005 | Lee |
| 2006/0036201 | A1 | 2/2006 | Cohen |
| 2006/0061148 | A1 | 3/2006 | Pollard et al. |
| 2006/0076813 | A1 | 4/2006 | Mohn et al. |
| 2006/0102657 | A1 | 5/2006 | Naslund et al. |
| 2006/0220435 | A1 | 10/2006 | Carter et al. |
| 2006/0238087 | A1 | 10/2006 | Holt |
| 2006/0279124 | A1 | 12/2006 | White et al. |
| 2007/0001494 | A1 | 1/2007 | Hoover |
| 2007/0164178 | A1 | 7/2007 | Beilstein et al. |
| 2008/0012404 | A1 | 1/2008 | Dewert |
| 2008/0037794 | A1 | 2/2008 | Sugawara et al. |
| 2008/0122241 | A1 | 5/2008 | Blackmore et al. |
| 2008/0150329 | A1 | 6/2008 | Lawson |
| 2008/0220646 | A1 | 9/2008 | Leddusire |
| 2008/0262657 | A1 | 10/2008 | Howell et al. |
| 2009/0001775 | A1 | 1/2009 | Smith |
| 2009/0032660 | A1 | 2/2009 | Wadsworth et al. |
| 2009/0072782 | A1 | 3/2009 | Randall |
| 2009/0096255 | A1 | 4/2009 | Robertson |
| 2009/0212638 | A1 | 8/2009 | Johnson |
| 2009/0212639 | A1 | 8/2009 | Johnson |
| 2009/0212737 | A1 | 8/2009 | Johnson et al. |
| 2009/0250982 | A1 | 10/2009 | Cohen |
| 2010/0055928 | A1 | 3/2010 | Randall |
| 2010/0178797 | A1 | 7/2010 | Byrne |
| 2010/0290215 | A1 | 11/2010 | Metcalf et al. |
| 2010/0320819 | A1 | 12/2010 | Cohen et al. |
| 2011/0012403 | A1 | 1/2011 | Wilson et al. |
| 2011/0025915 | A1 | 2/2011 | Daban |
| 2011/0109163 | A1 | 5/2011 | Bennett |
| 2011/0109211 | A1 | 5/2011 | Kirkeby et al. |
| 2011/0110075 | A1 | 5/2011 | Smith |
| 2011/0298340 | A1 | 12/2011 | Nelson et al. |
| 2012/0026724 | A1 | 2/2012 | Metcalf et al. |
| 2012/0051579 | A1 | 3/2012 | Cohen |
| 2012/0200129 | A1 | 8/2012 | Wilson, Jr. |
| 2012/0286557 | A1 | 11/2012 | Hoffman et al. |
| 2012/0316884 | A1 | 12/2012 | Rozaieski et al. |
| 2013/0002001 | A1 | 1/2013 | Allen et al. |
| 2013/0066636 | A1 | 3/2013 | Singhal |
| 2013/0129105 | A1 | 5/2013 | Hua |
| 2013/0137524 | A1 | 5/2013 | Scott |
| 2013/0177198 | A1 | 7/2013 | Hogue et al. |
| 2013/0199421 | A1 | 8/2013 | Hjelm |
| 2013/0207478 | A1 | 8/2013 | Metcalf et al. |
| 2013/0234481 | A1 | 9/2013 | Johnson |
| 2013/0249257 | A1 | 9/2013 | Suhre et al. |
| 2013/0333940 | A1 | 12/2013 | Stencil |
| 2014/0010387 | A1 | 1/2014 | Cohen |
| 2014/0197666 | A1 | 7/2014 | Koch |
| 2014/0272266 | A1 | 9/2014 | Svilar |
| 2014/0285140 | A1 | 9/2014 | Jung |
| 2014/0368476 | A1 | 12/2014 | Rauch et al. |
| 2015/0061258 | A1 | 3/2015 | Flores et al. |
| 2015/0069965 | A1 | 3/2015 | Verschueren |
| 2015/0076881 | A1 | 3/2015 | Lapointe |
| 2015/0076891 | A1 | 3/2015 | Lapointe et al. |
| 2015/0230622 | A1 | 8/2015 | Orbelian |
| 2015/0255914 | A1 | 9/2015 | Kong et al. |
| 2015/0300627 | A1 | 10/2015 | Wang et al. |
| 2015/0334482 | A1 | 11/2015 | Rawls-Meehan et al. |
| 2016/0118035 | A1 | 4/2016 | Hyde et al. |
| 2016/0126916 | A1 | 5/2016 | Kappus et al. |
| 2016/0136529 | A1 | 5/2016 | Weston et al. |
| 2016/0174715 | A1 | 6/2016 | Nelson et al. |
| 2016/0257227 | A1 | 9/2016 | Takada et al. |
| 2016/0286291 | A1 | 9/2016 | Linjama et al. |
| 2016/0379631 | A1 | 12/2016 | Wang et al. |
| 2017/0135490 | A1 | 5/2017 | Andrix et al. |
| 2017/0143122 | A1 | 5/2017 | Nelson et al. |
| 2017/0149181 | A1 | 5/2017 | Nelson et al. |
| 2017/0150264 | A1 | 5/2017 | Nelson et al. |
| 2017/0214197 | A1 | 7/2017 | Suri |
| 2017/0221340 | A1 | 8/2017 | Rhoads et al. |
| 2017/0295941 | A1 | 10/2017 | King et al. |
| 2017/0317458 | A1 * | 11/2017 | Byrne .................... H02J 50/12 |
| 2018/0000244 | A1 | 1/2018 | Nelson et al. |
| 2018/0041354 | A1 | 2/2018 | Nelson et al. |
| 2018/0158192 | A1 | 6/2018 | Rocque et al. |
| 2018/0191178 | A1 | 7/2018 | Byrne et al. |
| 2018/0253947 | A1 | 9/2018 | Muhsin et al. |
| 2019/0222935 | A1 | 7/2019 | Nelson et al. |
| 2019/0266993 | A1 | 8/2019 | Linjama et al. |
| 2020/0100030 | A1 | 3/2020 | Nelson et al. |
| 2020/0100031 | A1 | 3/2020 | Nelson et al. |
| 2020/0221227 | A1 | 7/2020 | Nelson et al. |
| 2021/0002170 | A1 | 1/2021 | Chien et al. |
| 2021/0112341 | A1 | 4/2021 | Nelson et al. |
| 2021/0352422 | A1 | 11/2021 | Lin et al. |
| 2022/0060829 | A1 | 2/2022 | Nelson et al. |
| 2022/0078555 | A1 | 3/2022 | Nelson et al. |
| 2022/0095060 | A1 | 3/2022 | Yang et al. |
| 2022/0115907 | A1 | 4/2022 | Bober et al. |

(56) References Cited

U.S. PATENT DOCUMENTS

| | | | |
|---|---|---|---|
| 2022/0337928 | A1 | 10/2022 | Nelson |
| 2022/0400868 | A1 | 12/2022 | Nelson et al. |
| 2022/0408925 | A1 | 12/2022 | Rafieha |
| 2023/0111916 | A1 | 4/2023 | Nelson et al. |
| 2023/0209262 | A1 | 6/2023 | Nelson et al. |
| 2023/0209263 | A1 | 6/2023 | Nelson et al. |
| 2023/0217170 | A1 | 7/2023 | Nelson et al. |

FOREIGN PATENT DOCUMENTS

| | | | |
|---|---|---|---|
| CN | 201135239 | Y | 10/2008 |
| CN | 201178847 | Y | 1/2009 |
| CN | 201282826 | Y | 8/2009 |
| CN | 201341645 | Y | 11/2009 |
| CN | 201452358 | U | 5/2010 |
| CN | 201518894 | U | 7/2010 |
| CN | 101909490 | A | 12/2010 |
| CN | 202211357 | U | 5/2012 |
| CN | 202530580 | U | 11/2012 |
| CN | 202553058 | U | 11/2012 |
| CN | 101909490 | B | 3/2013 |
| CN | 202817641 | U | 3/2013 |
| CN | 202907151 | U | 4/2013 |
| CN | 202981088 | U | 6/2013 |
| CN | 203563950 | U | 4/2014 |
| CN | 203609079 | U | 5/2014 |
| DE | 102012211865 | A1 | 5/2013 |
| EP | 3244633 | A1 | 5/2016 |
| EP | 3244628 | A1 | 11/2017 |
| EP | 3097703 | B1 | 10/2018 |
| FI | 20196020 | A1 | 5/2021 |
| GB | 2300329 | A | 10/1996 |
| JP | 47-004753 | Y1 | 2/1972 |
| JP | 56-087863 | A | 7/1981 |
| JP | 59-067079 | A | 4/1984 |
| JP | 59-107523 | A | 6/1984 |
| JP | S59107523 | U | 7/1984 |
| JP | 06-079086 | A | 3/1994 |
| JP | 08-063174 | A | 3/1996 |
| JP | 08063174 | A | 3/1996 |
| JP | 3047023 | U | 3/1998 |
| JP | 3047023 | B2 | 5/2000 |
| JP | 2001-285976 | A | 10/2001 |
| JP | 2004-097273 | A | 4/2004 |
| JP | 2007-003994 | A | 1/2007 |
| JP | 2008-513138 | A | 5/2008 |
| JP | 2008-545504 | A | 12/2008 |
| JP | 2011505921 | A | 3/2011 |
| JP | 2013-094405 | A | 5/2013 |
| JP | 2014-230026 | A | 12/2014 |
| JP | 2015-126460 | A | 7/2015 |
| KR | 20080012919 | A | 2/2008 |
| WO | 99/63786 | A1 | 12/1999 |
| WO | 2006/135509 | A2 | 12/2006 |
| WO | 2009/113319 | A1 | 9/2009 |
| WO | 2012/093398 | A2 | 7/2012 |
| WO | WO-2012093398 | A3 | 10/2012 |
| WO | 2014/072975 | A1 | 5/2014 |
| WO | 2015/118217 | A1 | 8/2015 |
| WO | 2016/044884 | A1 | 3/2016 |
| WO | 2017/087266 | A1 | 5/2017 |
| WO | 2017/087268 | A1 | 5/2017 |
| WO | WO-2017087224 | A1 | 5/2017 |
| WO | 2017/194785 | A1 | 11/2017 |
| WO | 2018/134142 | A1 | 7/2018 |
| WO | 2018/189422 | A1 | 10/2018 |
| WO | 2021/105554 | A1 | 6/2021 |
| WO | 2021/141783 | A1 | 7/2021 |
| WO | 2022/262950 | A1 | 12/2022 |

OTHER PUBLICATIONS

Notice of Allowance and Fees Due (PTOL-85) dated Jul. 25, 2023 for U.S. Appl. No. 17/520,488, 5 page(s).

Office Action from U.S. Appl. No. 13/869,600, dated Dec. 15, 2015 (9 pages).

Office Action received for U.S. Appl. No. 15/270,339, dated Aug. 6, 2018.

Office Action received for U.S. Appl. No. 15/270,339, dated Jun. 22, 2017.

Office Action received for U.S. Appl. No. 15/348,068, dated Nov. 1, 2017.

Office Action received for U.S. Appl. No. 15/348,068, dated Oct. 2, 2018.

Office Action received for U.S. Appl. No. 15/786,922, dated Nov. 28, 2018.

Office Action received for U.S. Appl. No. 16/273,773, dated Jun. 16, 2020.

Office Action received for U.S. Appl. No. 16/273,773, dated Oct. 25, 2019.

Office Action received for U.S. Appl. No. 16/738,916, dated Jan. 28, 2021.

Office Action received for U.S. Appl. No. 17/520,488, dated Feb. 24, 2023.

Office Action received in U.S. Appl. No. 17/128,575, dated Oct. 24, 2022.

Office Action received in U.S. Appl. No. 17/348,088, dated Jul. 26, 2022.

Restriction Requirement received for U.S. Appl. No. 15/348,068, dated Aug. 2, 2017.

Restriction Requirement received for U.S. Appl. No. 17/349,363, dated Jun. 10, 2022, 8 pages.

Sobro Coffee Table with Built in Fridge, Speakers, Outlets, LED Light, and More—Black, 12 pages, www.amazon.com, Nov. 29, 2022.

Sobro Smart Side/Nightstand Table—with Cooling Drawer, Wireless Charging, Bluetooth Speakers, USB-C and 120V outlets, LED Light, Black/Black, 11 pages, www.amazon.com, Nov. 29, 2022, www.amazon.com/SOBRO-Smart-Side-Nightstand-Table/dp/B0842Y2DTN/ref=psdc_1063306_t3_B07S96M4Q3?th=1.

The Wall Street Journal newspaper article entitled, "Wireless Charging Everywhere," dated Dec. 30, 2015.

U.S. Appl. No. 60/778,761, entitled Power Delivery Surface Power Supply Safety, filed Mar. 3, 2006 (59 pages).

"The Wireless Speaker and Audio (WISA(Registered)) Association," retrieved Nov. 7, 2016 at www.wisaassocation.org, 2 pages.

"WISA Wireless Speaker & Audio," retrieved on Nov. 7, 2016 at www.wisaassociation.org, 3 pages.

Black Sobro Smart End Table with Built-In-Outlets, 7 pages, www.wayfair.com, Nov. 30, 2022.

Bose Corporation, Wikipedia, http://en.wikipedia.org/wiki/Bose_Corporation, Apr. 25, 2012.

Corrected Notice of Allowance received for U.S. Appl. No. 15/786,922, dated Sep. 23, 2020.

Corrected Notice of Allowance received for U.S. Appl. No. 15/786,922, dated Sep. 28, 2020.

Curry, M. "Its Speakers Sound Good Even in Terrible Listening Environments, i.e. Your Apartment;" Core77; Article [online]. Sep. 29, 2015 [retrieved Jan. 30, 2017]. Retrieved from the Internet: <URL: http://www.core77.com/posts/41080/Sonos-Debuts-Software-That-Makes-Its-Speakers-Sound-Good-Even-in-Terrible-Listening-Environments-ie-Your-Apartment; p. 2, paragraph 2 to p. 4, paragraph 1.

Equalization (audio) Wikipedia, web.archive.org archived pages, https://web.archive.org/web/20210325042554/https://en.wikipedia.org/wiki/Equalization_(audio) dated Mar. 25, 2021, last updated Mar. 20, 2021 (11 pages).

Equalization (audio); Wikipedia, https://en.wikipedia.org/wiki/Equalization_(audio), printed Jul. 13, 2021 (11 pages).

Equalization—What's the difference of frequency sets for 10 band equalizers?—Sound Design Stock Exchange; sound.stackechange.com question/answer website pages; dated Jan. 22, 2015 (2 pages).

Final Office Action dated May 22, 2019 from U.S. Appl. No. 15/786,922.

Final Office Action received for U.S. Appl. No. 13/869,600, dated Sep. 14, 2016.

(56) References Cited

OTHER PUBLICATIONS

Final Office Action received for U.S. Appl. No. 15/270,339, dated Mar. 12, 2018.
Final Office Action received for U.S. Appl. No. 15/348,068, dated Apr. 2, 2018.
Final Office Action received for U.S. Appl. No. 16/273,773, dated Feb. 12, 2020.
Final Office Action received for U.S. Appl. No. 16/273,773, dated Oct. 13, 2020.
Final Rejection dated May 24, 2021 for U.S. Appl. No. 16/738,916.
Final Rejection received for U.S. Appl. No. 16/696,696, dated May 3, 2021.
Issue Notification issued for U.S. Appl. No. 17/128,575 dated Jun. 7, 2023.
Issue Notification issued for U.S. Appl. No. 17/349,363 dated Apr. 27, 2023.
Issue Notification received for U.S. Appl. No. 15/270,339, dated Feb. 27, 2019.
Issue Notification received for U.S. Appl. No. 15/348,068, dated Jan. 30, 2019.
Issue Notification received for U.S. Appl. No. 15/786,922, dated Aug. 5, 2020.
Jason Cartwright, This connected bed has wireless charging, bluetooth and a subwoofer, 8 pages, Aug. 12, 2019, www.techau.com.au, Nov. 28, 2022.
Leviton, "2-Gang White Duplex Outlet/Quick Port Plate Recessed Device," retrieved Nov. 17, 2017 at homedepot.com, (2 pages).
Leviton, "Product Bulletin for Recessed Devices Cal. Nos. 689 and 690," Copyright 2008, published and available, on information and belief, at least as early as 2008 (2 pages).
Lovesac StealthTech, Sactionals Sound + Charge System, Setup Guide, 48 pages, Publicly available at least as early as Feb. 2023.
Lovesac StealthTech, sound by harman/kardon, Get Ready for a Fully Immersive Audio Experience, Welcome to Sactionals StealthTech Sound + Charge, Software Application Screen Prints, 41 pages, publicly available, on information and belief, at least as early as Nov. 2021, Printed Feb. 2023.
NOA received for U.S. Appl. No. 15/270,339, dated Jan. 24, 2019.
NOA received for U.S. Appl. No. 15/348,068, dated Dec. 12, 2018.
Non-Final Office Action received for U.S. Appl. No. 18/065,329, dated May 30, 2023, 7 pages.
Non-Final Rejection dated Apr. 19, 2021 for U.S. Appl. No. 16/273,773.
Non-Final Rejection received for U.S. Appl. No. 16/696,696, dated Jan. 14, 2021.
Non-Final Rejection received for U.S. Appl. No. 17/349,363, dated Aug. 25, 2022.
Notice of Allowance and Fees Due (PTOL-85) dated Apr. 13, 2023 for U.S. Appl. No. 17/128,575, 3 page(s).
Notice of Allowance and Fees Due (PTOL-85) dated Jul. 27, 2021 for U.S. Appl. No. 16/273,773.
Notice of Allowance Office Action received for U.S. Appl. No. 17/520,488, dated Mar. 17, 2023, 5 pages.
Notice of Allowance received for U.S. Appl. No. 15/786,922, dated Jul. 10, 2020.
Notice of Allowance received for U.S. Appl. No. 15/786,922, dated Mar. 2, 2020.
Notice of Allowance received for U.S. Appl. No. 15/786,922, dated Sep. 15, 2020.
Notice of Allowance received for U.S. Appl. No. 16/696,712, dated Aug. 27, 2020.
Notice of Allowance received for U.S. Appl. No. 16/696,712, dated Dec. 30, 2020.
Notice of Allowance received for U.S. Appl. No. 17/128,575, dated Feb. 13, 2023, 15 pages.
Notice of Allowance received for U.S. Appl. No. 17/348,088, dated Mar. 28, 2023, 5 pages.
Notice of Allowance received for U.S. Appl. No. 17/349,363, dated Jan. 5, 2023, 6 pages.
Notice of Allowance received for U.S. Appl. No. 17/349,363, dated Sep. 28, 2022, 8 pages.
Notice of Allowance received in U.S. Appl. No. 16/696,696, dated Sep. 21, 2021.
Notice of Allowance received in U.S. Appl. No. 16/738,916, dated Sep. 28, 2021.
Notice of Allowance received in U.S. Appl. No. 17/348,088, dated Dec. 19, 2022.
Office Action dated Oct. 1, 2019 from U.S. Appl. No. 15/786,922.
Amendment and Response to Office Action for U.S. Appl. No. 16/273,773 dated May 11, 2020, 13 pages.
Communication Pursuant to Article 94(3) EPC for European Patent Application No. 16866890.3, mailed on Dec. 12, 2019, 4 pages.
Gear Diary, "Lovesac Sactionals StealthTech Sound + Charge System Brings Invisible and Immersive Harmon Kardon Sound to Your Home Theater," Oct. 18, 2021 [Retrieved on Oct. 24, 2022], 6 pages.
International Search Report and Written Opinion for Application No. PCT/US2016/061085, mailed on Jan. 31, 2017, 11 pages.
International Search Report and Written Opinion for Application No. PCT/US2016/061491, mailed on Apr. 3, 2017, with Search History, 25 pages.
International Search Report and Written Opinion for Application No. PCT/US2016/061508, mailed on Apr. 19, 2017, 12 pages.
Invitation to Pay Additional Fees and, Where Applicable, Protest Fee, for International Application No. PCT/US2016/061491, dated Jan. 24, 2017, 2 pages.
Korean Office Action for Application No. 10-2018-7014059 dated Nov. 1, 2023 (32 pages).
Lovesac, "An Unparalleled, Immersive Home Experience," Lovesac.com [Online], Retrieved on Oct. 24, 2022, 8 pages.
Notice of Allowance for U.S. Appl. No. 17/348,088, mailed on Aug. 16, 2023, 2 pages.
Notice of Allowance for U.S. Appl. No. 18/065,329, mailed on Aug. 31, 2023, 7 pages.
Office Action for U.S. Trademark U.S. Appl. No. 97/627,790, published on Jan. 30, 2023, 41 pages.
Photos of Lovesac Stealthech Sectional Furniture SIDE Upright Member/Arm Rest (Fabric Covering and Foam Removed) with Speakers, which was publicly available at least as early as Feb. 2022; 6 photos; 3 pages.
U.S. Trademark Application, U.S. Appl. No. 97/627,790, filed Oct. 11, 2022, publicly accessed Oct. 24, 2022, 3 pages.

* cited by examiner

ELECTRONIC FURNITURE SYSTEMS WITH INTEGRATED INDUCTION CHARGER

CROSS-REFERENCE TO RELATED APPLICATIONS

This application is a continuation of U.S. patent application Ser. No. 17/128,575, filed on Dec. 21, 2020, entitled ELECTRONIC FURNITURE SYSTEMS WITH INTEGRATED INDUCTION CHARGER, which is incorporated herein by reference in its entirety, and which is a continuation-in-part of U.S. patent application Ser. No. 16/738,916, filed on Jan. 9, 2020, entitled ELECTRONIC FURNITURE SYSTEMS WITH INTEGRATED INDUCTION CHARGER, which is incorporated herein by reference in its entirety, and which is a continuation-in-part of U.S. patent application Ser. No. 16/273,773, filed on Feb. 12, 2019, entitled ELECTRONIC FURNITURE SYSTEMS WITH INTEGRATED INTERNAL SPEAKERS, which is a continuation of U.S. patent application Ser. No. 15/348,068, filed on Nov. 10, 2016, entitled ELECTRONIC FURNITURE SYSTEMS WITH INTEGRATED INTERNAL SPEAKERS, which:

(A) is a continuation-in-part of U.S. patent application Ser. No. 15/270,339, filed on Sep. 20, 2016, entitled ELECTRICAL HUB FOR FURNITURE ASSEMBLIES, which claims priority to and the benefit of U.S. Provisional Patent Application Ser. No. 62/257,623, filed on Nov. 19, 2015, entitled FURNITURE WITH ELECTRONIC ASSEMBLIES; and (B) also claims priority to and the benefit of U.S. Provisional Patent Application Ser. No. 62/417,091, filed on Nov. 3, 2016, entitled ELECTRONIC FURNITURE SYSTEMS WITH INTEGRATED INTERNAL SPEAKERS.

Each of the foregoing patent applications is incorporated herein in its entirety by reference.

BACKGROUND

The Field of the Invention

This Invention is in the field of furniture with built-in electronic assembly systems.

The Relevant Technology

Charging cables and outlets are widely used in homes and businesses to charge any number of rechargeable devices, such as phones, tablets, laptops, and the like. Unfortunately, outlets for charging such devices may not be near enough to where people are seated on furniture to allow users to recharge their devices while, for example, lounging on their couch or other furniture. Moreover, wiring and cabling associated with such systems is unsightly and cumbersome.

Furniture also tends to take up a great deal of space in a home, office or business environment. When sitting on furniture, it is often desirable to listen to music, watch TV, or watch a movie in a home theater environment, or employ one or more rechargeable electronic components. Improved furniture is needed with improved electronic assembly systems that can be used in association with modern furniture assemblies or devices.

BRIEF SUMMARY OF THE INVENTION

The present invention relates to space-saving furniture systems with associated electrical assembly systems, including one or more of integrated, embedded induction chargers, internal speaker systems, internal electrical power sources, electrical devices, and other electrical components associated with furniture that can be conveniently used by individuals while sitting on the furniture. Any of such may be provided separately, or in combination with one another.

The audio-enhanced furniture system conveniently provides furniture for comfortably sitting, as well as integrated induction chargers for convenient recharging of mobile devices and other electronic devices as a user is comfortably sitting on the furniture. The induction charger or induction charger assembly may be provided, e.g., hidden from view, and also touch or feel, from the user, such as under a cover (e.g., fabric cover) of the base or transverse member of a furniture system. The induction charger can be provided in the base, or in the transverse member. The induction charger can be provided seated within a hole formed into a frame or cushioning material of whichever of the base or transverse member the induction charger is included in. In an embodiment, the device to be inductively charged may be positioned (e.g., laid) on top of the base or transverse member including the induction charger, for charging. In another embodiment, the induction charging zone provided by the induction charger may be located between two abutting upholstered surfaces (e.g., between a base and transverse member, between a base and a base, or between a transverse member and another transverse member), where the upholstered surfaces abut one another, allowing a user to “wedge” the device to be charged in between such cushioned, upholstered surfaces, holding the device in place (e.g., due to a friction fit), while it charges wirelessly through induction. It will be apparent that various configurations, for positioning and placement of the induction charger may be possible, several of which are described herein.

In some embodiments, a furniture system has an electrical charging system for charging an electrical device. The system includes a base comprising a base frame. The base provides a seating surface. The system also includes a transverse member that provides a backrest or an armrest. The transverse member also includes a transverse member frame. Additionally, the system includes a first cushioning material and a second cushioning material. The second cushioning material is mounted on the transverse member frame or the base frame. The system also includes an induction charger that comprises an induction coil. The induction coil is embedded between the first cushioning material and the second cushioning material so as to provide induction charging to an electrical device positioned adjacent to the first cushioning material. The induction charger is hidden so as to not be seen (or felt) by a user of the furniture system. Furthermore, the first cushioning material has a first depth, and the second cushioning material has a second depth.

In some embodiments, a furniture system has an electrical charging system for charging an electrical device. Here, the furniture system includes a base comprising a base frame, where the base provides a seating surface. The system also includes a transverse member that provides at least one of a backrest or armrest. The transverse member comprises a transverse member frame, a first cushioning material, and a second cushioning material. The system also includes an induction charger that includes an induction coil. The induction coil is embedded between the first and second cushioning materials so as to provide induction charging to an electrical device positioned proximate or adjacent to the first cushioning material. The induction charger is hidden so as to not be seen (or felt) by a user of the furniture system. The first cushioning material has a first depth, and the second cushioning material has a second depth. As a result of positioning the induction charger between the first cushioning material and the second cushioning material, this positioning secures the induction charger in place such that the induction charger is not permanently or semi-permanently coupled to the transverse member frame (e.g., but may "float" between the two cushioning materials).

In some embodiments, a furniture system provides an electrical charging system for charging an electrical device. The furniture system comprises a base that includes a base frame. The base provides a seating surface. The system also includes a transverse member that provides at least one of a backrest or armrest. Here, the transverse member comprises a transverse member frame. The system also includes a first cushioning material and a second cushioning material. The first cushioning material and the second cushioning material are mounted on the transverse member frame or the base frame. The system also includes an induction charger that comprises an induction coil. The induction coil is embedded between the first and second cushioning materials so as to provide induction charging to an electrical device positioned adjacent to the first cushioning material. The induction charger is hidden so as to not be seen (e.g., or felt) by a user of the furniture system. The first cushioning material is disposed along a first side of the induction charger, the second cushioning material is disposed along a second side of the induction charger, a third cushioning material is disposed along a third side of the induction charger, and a fourth cushioning material is disposed along a fourth side of the induction charger. The first cushioning material has a first depth, and the second cushioning material has a second depth.

Another embodiment is directed to a furniture system that provides an electrical charging system for charging an electrical device, the furniture system comprising a base including a base frame, the base providing a seating surface. The system also includes a transverse member providing at least one of a backrest or armrest. The transverse member comprises a transverse member frame, a first cushioning material, and a second cushioning material, where the second cushioning material is mounted on the transverse member frame. The system also includes an outer cover that is selectively mounted over the first cushioning material. The system further includes an induction charger that includes an induction coil. The induction coil is embedded between the first and second cushioning materials so as to provide induction charging to an electrical device positioned on the outer cover. The induction charger is hidden so as to not be seen (or felt) by a user of the furniture system. The first cushioning material has a first depth, and the second cushioning material has a second depth.

In an embodiment, a charging surface is located adjacent to the induction charger such that the induction charger provides induction charging to the electrical device when the electrical device is positioned adjacent to the charging surface. In some cases, the charging surface is on or proximate to the first cushioning material. In some implementations, the charging surface is on a cover mounted over the first cushioning material such that the cover is also mounted over the induction charger. The cover, which has the charging surface thereon, may be an outer cover that covers an inner cover mounted on the first cushioning material. The outer cover can be selectively mounted on the inner cover. Optionally, the induction charger includes an electrical cord (perhaps a pluggable electrical cord) in electrical communication with the indication coil.

In some embodiments, the system further includes an inner cover mounted on the first cushioning material and an outer cover selectively mounted on the inner cover. The induction charger can, therefore, provide induction charging to the electrical device positioned adjacent to the outer cover.

In an embodiment, the first cushioning material is proximate to or on a cover, which cover provides a charging surface. The cover may be an inner cover, such that the first cushioning material is proximate to or on the inner cover. The furniture system can further include an outer cover, where the outer cover is positioned over the inner cover and where the charging surface is on the outer cover.

In an embodiment, the distance between the charging surface where a device can be placed for induction charging, and the induction charger that is embedded in the base frame or transverse member frame, may be at least 10 mm, or at least 12 mm (e.g., such as about 15 mm). By way of further example, in embodiments where the induction charger is positioned between first and second cushioning materials of given depths, the first depth of the first cushioning material can be dependent on a charging height operational range of the induction charger. Such first depth can be at least 10 mm or at least 15 mm. The second depth can be at least 10 mm, such as about 25 mm. In some cases, the distance is dependent on a charging height operational range of the induction charger.

When no force is applied to the charging surface, the first cushioning material and the second cushioning are in an uncompressed state, and when a force is applied to the charging surface, the cushioning materials are compressed. In such a compressed state, a thickness of the combination of the first and second cushioning materials can be less than 75%, less than 50%, or less than 40% of a thickness of the combination as compared to when in the uncompressed state.

The first and second cushioning materials may have different, or the same depths. In an embodiment, the first cushioning material is the part of the charging surface, while in another embodiment, the first cushioning material is separate from and abuts or is otherwise proximate to the charging surface, or rather, abuts a cover that covers the first cushioning material. The charging surface can include a cover that covers the first cushioning material.

In an embodiment, any of the cushioning materials can include foam padding.

Where third and/or fourth cushioning materials are provided, these can positioned on respective lateral sides of the induction charger (e.g., and the first and second cushioning materials can be positioned on top and bottom sides of the induction charger).

The first cushioning material can be separate from the charging surface, or can be integral with the charging surface. In an embodiment, the first cushioning material is below the charging surface.

The charging surface can be an outer surface (e.g., upholstered surface) comprising polyester, chenille, tweed, linen, velvet, leather, polyester linen, cotton, cotton blend, denim, twill, faux fur, or leather material.

In an embodiment, the charging surface is an integral outer skin of the first cushioning material.

The first cushioning material can be positioned proximate to the charging surface such that the first cushioning material is within 30 mm of the charging surface. The charging surface can be an outer surface of an outer cover disposed on the base frame or the transverse member frame. In an embodiment, an inner cover is underneath the outer cover, and the first cushioning material can be adjacent to the inner cover.

The first cushioning material and charging surface can be configured to include a removable lid or other access opening, that when removed or otherwise opened, provides access to the induction charger.

One furniture system (e.g., a modular furniture system) including an induction charger includes a transverse member comprising a frame having a panel (e.g., an upper panel) and an induction charger assembly. A spring biasing mechanism can be provided, for biasing the induction charger relative to the frame of the transverse member, such that in the absence of a force (e.g., a user pressing on the induction charger assembly) at least a portion of the induction charger is spring based away from the frame of the transverse member. For example, the configuration may be such that the induction charger can be pushed down relative to the panel or other portion of the frame when a force is exerted downward onto the induction charger, and it springs back upon release of the force.

In an embodiment, the portion of the induction charger that is spring biased away from the frame is spring biased above the upper panel. The spring biasing mechanism can be a coil spring, or other mechanism.

In an embodiment, the transverse member comprises a cushioning material disposed on the panel of the frame. For example, the portion of the induction charger that is biased away from the frame can be configured to move through the cushioning material (e.g., a hole therein).

In an embodiment, the panel (e.g., an upper panel) includes a cushioning material disposed thereon (e.g., above an upper panel), where the induction charger is embedded within the cushioning material.

The upper panel can include a hole extending therethrough. The induction charger can be mounted within the hole, to be selectively pushed downwardly relative to the panel of the frame when a downward force is exerted onto the induction charger.

In an embodiment, the spring biasing mechanism may be or include the cushioning material.

In an embodiment, the induction charger assembly comprises a housing, the housing having an outwardly extending flange and an induction coil disposed within a housing, wherein the outwardly extending flange is secured to the cushioning material such that a portion of the cushioning material is disposed between the outwardly extending flange and the upper panel.

The panel (e.g., an upper panel) can include a hole extending therethrough. The induction charger assembly can include a receptacle secured to the panel within the hole. An induction charger housing can be movably coupled to the receptacle such that the housing moves relative to the receptacle when a force is applied to the induction charger housing. The induction charger assembly can also include an induction coil or other induction structure for performing inductive charging, positioned inside the housing. The induction charger assembly can also include an electrical cord in electrical communication with the induction coil (e.g., for providing power to the induction coil).

The spring biasing mechanism may comprise a coil spring or a gas cylinder or other compressible fluid spring.

The transverse member may further comprise a cover layer disposed over the cushioning material.

The induction charger and/or induction charger assembly may be hidden from view beneath the cover layer. By way of example, the induction charger can refer to an induction coil or other structure capable of providing inductive charging, in electrical communication with an electrical cord that provides power thereto. The coil may be within a protective coil housing. The induction charger assembly can include the induction charger, a housing that houses portions of the induction charger (e.g., the same or different from any coil housing), and a receptacle, e.g., mounted on a frame of the base or transverse member, where the induction charger is movably mounted within the receptacle. A spring biasing mechanism biases the induction charger with respect to the frame of the transverse member.

In one embodiment, a furniture system having an electrical charging system for charging an electrical device includes a transverse member and an induction charger assembly. The transverse member includes a frame having an upper panel. The induction charger assembly is coupled to the upper panel of the transverse member. The induction charger assembly includes a receptacle mounted on the upper panel of the frame, an induction charger movably mounted within the receptacle, and a spring biasing mechanism that biases the induction charger with respect to the frame of the transverse member.

The spring biasing mechanism may be of any configuration including but not limited to a coil spring, a compressible fluid spring such as a hydraulic cylinder, or other spring, or even in the form of a cushioning material that is resilient or elastic.

The transverse member can include a cushioning material disposed on the upper panel of the frame, where the induction charger assembly is at least partially embedded within the cushioning material. The spring biasing mechanism can comprise a coil spring.

The transverse member can comprise a cover disposed on (e.g., over) the cushioning material. The induction charger is biased such that a vertical distance from a top surface of the induction charger to an upper surface of the transverse member is at least 10 mm, or at least 12 mm.

In an embodiment, the induction charger the housing is configured to elastically travel downwardly relative to the receptacle in response to a downward force on the induction charger.

The cover can include an access hole or opening (e.g., a zippered opening) through which the induction charger can be accessed.

In an embodiment, the upper surface of the cushioning material of the transverse member is flush with an upper surface of the induction charger in the absence of a downward pressing force on the induction charger, e.g., presenting a flush surface under which the induction charger is hidden.

In one embodiment of the present disclosure, a furniture system having an electrical charging system for charging an electrical device includes a transverse member and an induction charger. The transverse member includes a frame having an upper panel, a cushioning material disposed on the upper panel, wherein a hole extends through the upper panel and at least partially through the cushioning material, with a cover extending over the cushioning material. An induction charger assembly is connected to the transverse member. The induction charger assembly is disposed below the cover, with at least a portion of the induction charger assembly disposed within the cushioning material. The induction charger assembly includes a receptacle coupled to the frame, an induction charger movably mounted within the receptacle, and a spring biasing mechanism configured to bias the induction charger relative to the receptacle. In such an embodiment, the induction charger is configured to elastically or resiliently move down within the receptacle when a force presses down on the induction charger.

The spring biasing mechanism can be a coil spring, or other structures as disclosed herein.

The induction charger assembly can include a housing movably secured at least partially within the receptacle via the spring biasing mechanism, and an induction coil in the housing, where the induction charger assembly further includes an electrical cord in electrical communication with the induction coil.

The induction charger can be mounted on the upper panel of the frame.

In one embodiment of the present disclosure, a modular furniture system having an electrical charging system for charging an electrical device includes a transverse member, an induction charger assembly, and a spring biasing mechanism. The transverse member includes a frame having a panel. The spring biasing mechanism biases the induction charger relative to the frame of the transverse member, such that in the absence of a force, a portion of the induction charger is spring biased away from the frame of the transverse member. As described herein, the spring biasing mechanism may be any of various structures, including simply a cushioning material disposed on the panel of the frame, where the induction charger is embedded within the cushioning material.

The induction charger assembly can comprise a housing, having an outwardly extending flange, and an induction coil within a housing. The flange can be secured to the cushioning material such that a portion of the cushioning material is disposed between the flange and the panel.

The panel can have a hole therethrough. The induction charger assembly can include a receptacle secured to the panel within the hole, an induction charger housing movably coupled to the receptacle such that the housing moves relative to the receptacle when a force is applied to the induction charger housing, and an induction coil within the induction charger housing.

The transverse member can further include a cover disposed over the cushioning material. The induction charger can be hidden from view beneath the cover.

The induction chargers of the present invention can be used in a couch, in a chair, in sectional seating systems, and in sectional systems having a variety of different components, such as recliners, seats, foot rests and a vast variety of configurations. The induction charger may also be included in various other pieces of furniture (e.g., a bed).

At least some configurations of the induction chargers described in the present disclosure elastically yield downward or otherwise toward or into the furniture system in response to loads, such as loads from sitting on the induction chargers, to prevent the induction chargers from breaking, while hiding the charger from sight or being felt. The induction chargers can elastically yield as such and still be positioned close enough to the surface of the furniture system to effectively charge electronic devices placed in a charging zone, on a given surface of the furniture system. Thus, the induction chargers described herein can be hidden within the furniture system for aesthetic purposes while maintaining functionality and durability of both the furniture and induction charger components.

One exemplary furniture system including an embedded induction charger includes a base having a frame, the base providing a seating surface, and a transverse member providing a backrest and/or an armrest, where the transverse member also comprises a frame. An induction charger is secured at least partially within the frame of the base or transverse member, where the induction charger provides induction charging to a device positioned on a given surface (e.g., an upper surface) of the base or transverse member, over the induction charger. The induction charger is hidden so as to not be seen or felt by a user of the furniture system. A vertical distance from a top surface of the induction charger to the surface where charging of the device occurs (e.g., an upper surface of the transverse member or base including the induction charger) can be at least 10 mm, at least 12 mm, or at least 15 mm. Such distance can aid in ensuring that the induction charger is not felt (e.g., when a user might compress cushioning material adjacent the cover of the furniture system), otherwise feeling something hard embedded therein. The ability to position the induction charger at a distance greater than 5 mm, or greater than 7 mm from the surface where the device is charged, while still providing charging at such a distance, is advantageous (e.g., in better hiding such an induction charger).

In an embodiment, the transverse member frame is at least partially covered by cushioning material, the transverse member further including an upholstery cover positioned over the cushioning material, the induction charger being hidden beneath the upholstery cover and the cushioning material of the transverse member.

In an embodiment, the transverse member frame may be at least partially covered by cushioning material, the transverse member further including an inner cover positioned over the cushioning material, with a zippered opening providing access through the inner cover, the induction charger being hidden beneath the inner cover under the zippered opening of the transverse member, the induction charger being accessible for removal and/or replacement through the zippered opening.

The furniture system can be a modular furniture system. In an embodiment, the system may be an upholstered furniture system.

The furniture system can include removable covers for positioning over the base and transverse member, the induction charger being hidden beneath the removable cover.

Another exemplary furniture induction charger system for use in a furniture system comprises a base providing a seating surface; and a transverse member providing at least one of an armrest or a backrest, wherein the base and transverse member each comprise a frame, with cushioning material disposed at least partially about the frame, wherein each of the base and transverse member include an upholstered cover extending thereover, such that both the base and transverse member have upholstered surfaces, the furniture induction charger system comprising an induction charger positioned within at least one of the base or transverse member such that the induction charger is hidden from view, under an upholstered cover of at least one of the base or transverse member, wherein the induction charger is seated within a hole formed into at least one of the frame or the cushioning material of the transverse member or base which includes the induction charger, where the induction charger is positioned at a location where the transverse member or the base abut another transverse member or base, such that the furniture system includes an induction charging zone at the location where such abutment occurs, allowing a user to place a device to be inductively charged between the two abutting upholstered surfaces. The induction charger may be positioned within the transverse member, or the base. The abutting upholstered surfaces could be configured to hold the device to be inductively charged therebetween in a friction fit. The furniture system could be a modular furniture system, where the base and transverse member are selectively coupleable to one another.

In any of the embodiments described herein, the device to be charged may be a smartphone, other mobile phone, or other portable electronic device (e.g., tablet).

Any of the embodiments described herein can include hiding the induction charger beneath cushioning material and/or an upholstery cover of the furniture component (e.g., base or transverse member) in which the induction charger is positioned.

Any of the embodiments described herein can include a cover (e.g., an inner cover, and optionally an outer cover), e.g., positioned over cushioning material and/or the frame of the base or transverse member including the induction charger. A zippered or other selectively accessible opening can be provided, providing access through a cover (e.g., an inner cover), where the induction charger is hidden beneath the zippered or other cover with such an opening, making the induction charger accessible for removal and/or replacement through such opening.

Any of the embodiments described herein can be employed in modular furniture systems, e.g., which allow a user to selectively couple bases and/or transverse members of the furniture system to one another. In some such modular embodiments, the same components (e.g., bases and transverse members) can be coupled to one another in different configurations, using the same components, which allows a user to disassemble a given modular furniture assembly, and put together a new furniture assembly using the same components, coupled to one another in a different configuration. This can allow a user to reposition an induction charger (e.g., embedded in a base or transverse member) by simply rearranging such components.

Any of the furniture systems described herein can be upholstered furniture systems.

Any of the furniture systems described herein can include a removable cover (e.g., an outer cover, over an inner cover). Such removable covers can be configured for positioning over the base or transverse members, and the induction charger can be hidden under such a removable cover (e.g., in some embodiments, the charger can be hidden under both an inner cover and an outer cover, where the outer cover is removable). The inner cover may include a zippered or other selectively accessible opening, for accessing the induction charger.

In any of the embodiments described herein, the induction charger may be in the base, or in the transverse member of a furniture assembly.

These and other objects and features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1A:
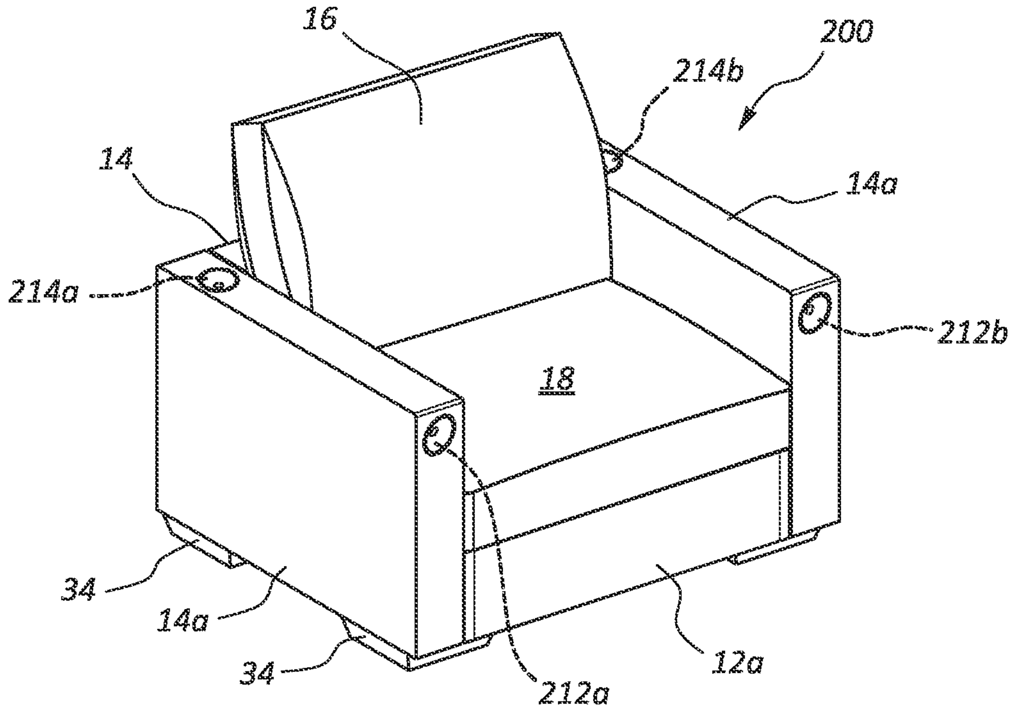
FIG. 1A is a perspective view of a modular furniture assembly in the form of a surround sound chair of the present invention having audio speakers in the transverse members thereof to form a surround sound speaker system, the position and orientation of the speakers reflected in phantom lines in the transverse members.
Figure 1B:
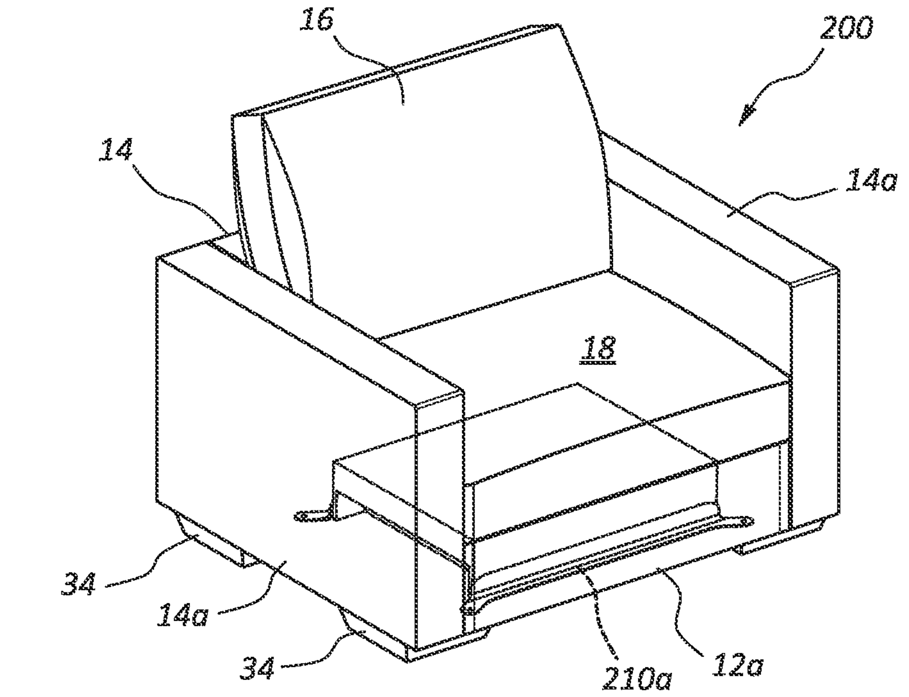
FIG. 1B is a perspective view of the modular furniture assembly of FIG. 1A in the form of the chair, wherein the surround sound chair also has a subwoofer speaker in the base thereof, the subwoofer speaker shown in phantom lines in the base.
Figure 2:
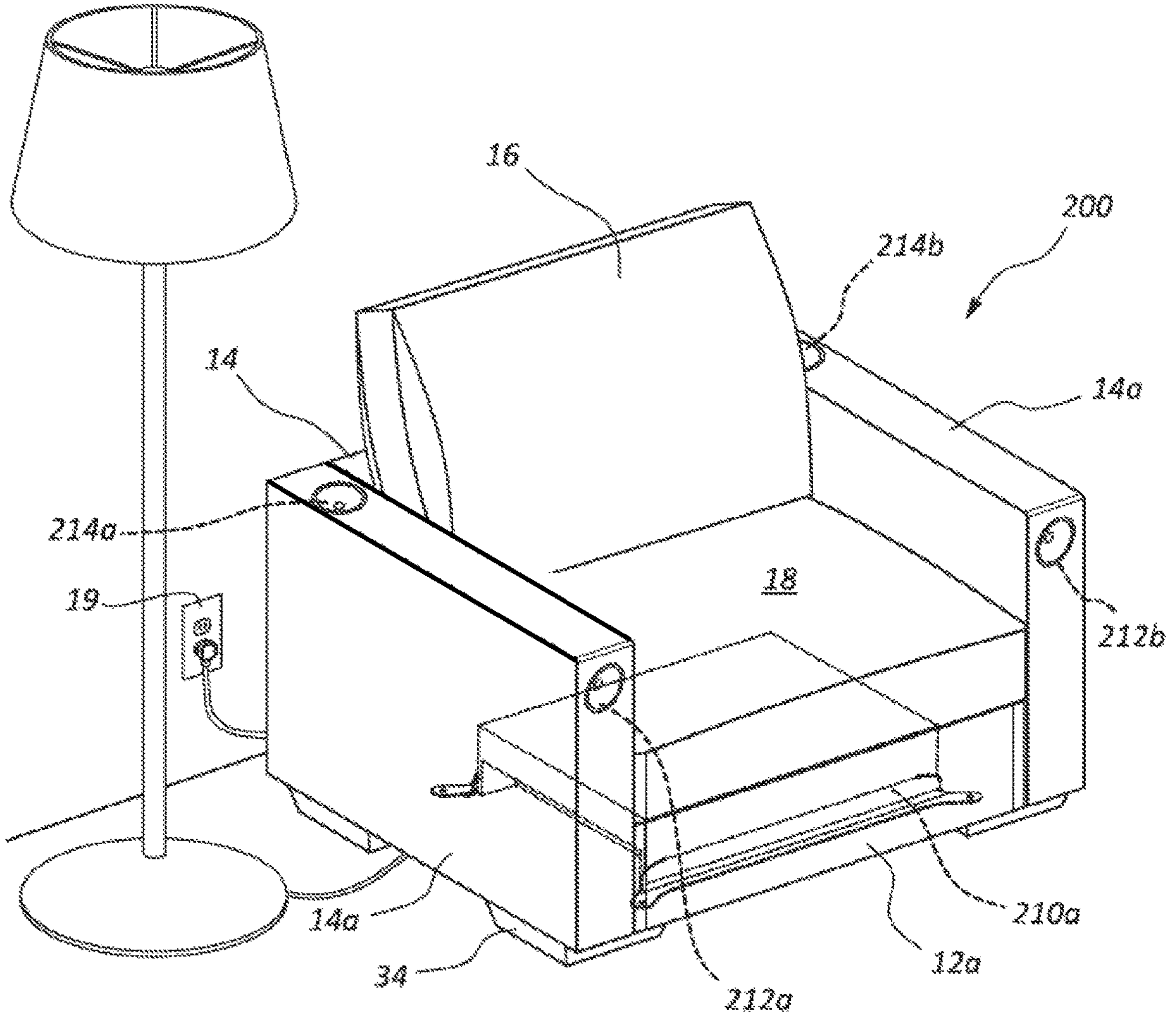
FIG. 2 shows an embodiment of the surround sound chair of FIGS. 1A-B with an adjacent lamp that is electrically coupled to the hub of the chair.
Figure 3:
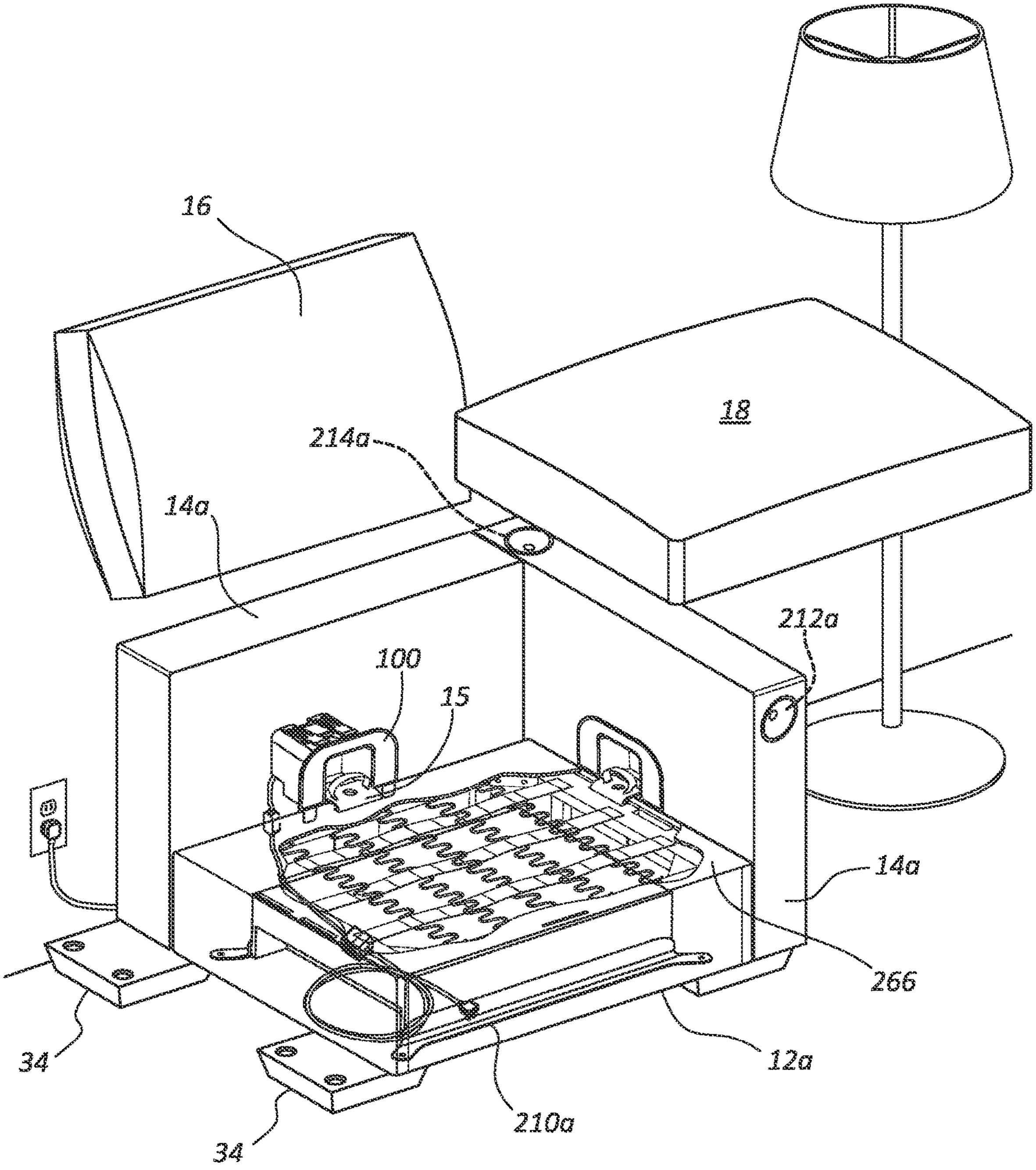
FIG. 3 is a chair having a surround sound speaker system as in FIGS. 1A-B, the cushions exploded therefrom and a cutaway view of the base shown.

FIGS. 1-3: Modular Furniture System w/ Surround-Sound Speakers

FIG. 1A is a perspective view of a modular furniture assembly in the form of a chair of the present invention having audio speakers embedded in the transverse members thereof to form a surround sound speaker system, the speakers reflected in phantom lines in the transverse members.

FIG. 1B is a perspective view of the modular furniture assembly of FIG. 1A in the form of the chair, wherein the chair also has a subwoofer speaker in the base thereof, the subwoofer speaker shown in phantom lines in the base.

As shown in FIGS. 1A and 1B, the present invention relates to an audio-enhanced, modular furniture system 200 comprising a speaker-containing base member 12*a* selectively coupled to speaker-containing transverse members 14*a* and a non-speaker containing transverse member 14. The speaker-containing base member 12*a* and speaker-containing transverse members 14*a* and transverse member 14 are connected to each other as shown in FIGS. 1A and 1B.

Audio-enhanced, modular furniture system 200 advantageously includes one or more speakers positioned therein and as shown in FIGS. 1A-B, has a set of speakers in each armrest transverse member 14*a* and a subwoofer 210 in base 12*a*.

In the embodiment of FIGS. 1A-1B, furniture system 200 comprises an integrated internal subwoofer 210*a* and four integrated, internal non-subwoofer speakers 212*a-b*, 214*a-b*. The non-subwoofer speakers 212*a-b*, 214*a-b*, as shown in FIG. 1A, include two front speakers 212*a-b* and two surround, rear speakers 214*a-b* which are oriented upwardly in the embodiment of FIG. 1A. The subwoofer 210*a* may handle low frequency sounds (e.g., from about 20 Hz up to about 120 Hz, up to about 100 Hz, or up to about 80 Hz), while the front and rear speakers 212*a-b*, 214*a-b* may handle higher frequencies (e.g., from a cut-off frequency of the subwoofer up to about 20 kHz). Any of the speakers may include cone drivers, dome drivers, ribbon drivers, horn drivers, any other driver configuration, or a combination of drivers.

As illustrated in FIGS. 1A and 1B, the footprint of system 200 having speakers 210*a*-214*b* therein, has the same mathematical specifications as the footprint of a modular furniture assembly not having speakers therein. Thus, the addition of speakers within system 200 does not add any additional space requirements to a home or office. In addition, wiring and/or cabling typically associated with speakers is also hidden within the furniture assembly itself, presenting a very clean, aesthetically desirable appearance, while at the same time providing high quality stereo, surround, or other sound playback.

Instead, the use of the speakers mounted within the furniture system 200 efficiently uses furniture and provides a high-quality, high-fidelity listening experience to the user. The speakers are hidden within certain discrete portions of the transverse members 14*a* and within the base 12*a*, thereby enabling efficient use of space.

In the illustrated embodiment of FIGS. 1A-1B, speakers 212*a* and 212*b* are shown mounted in a front facing surface of transverse members 14*a*. As discussed in further detail herein, in one embodiment, such front-facing placement of speakers 212*a* and 212*b* works in conjunction with a front wall, flat screen television or other surface which aids in reflection of the front directed sound from front-facing speakers 212*a* and 212*b*, the sound being reflected back to the user seated on furniture assembly 200, the reflected sound potentially having the advantages of reflected sound, which may, in some embodiments, include improved sound quality. For example, sound reflected back to the seated user may mimic sound coming from front speakers actually positioned in front of the seated user.

The subwoofer assembly within base 12*a* is hidden inside the frame of base 12*a* and is therefore underneath the seat cushion 18.

FIG. 2 shows an embodiment of the surround sound chair of the furniture system 200 of FIGS. 1A-B with an adjacent lamp that is electrically coupled to an integral electrical hub mounted internally within the chair. Details of the internal electrical hub 100 will be discussed further with respect to FIGS. 5-7.

FIG. 3 is a furniture system 200 in the form of a chair having a surround sound speaker system as in FIGS. 1A-B, the cushions exploded therefrom and a cutaway view of the base 12*a* shown.

FIG. 3 shows an exploded view of the surround sound chair of the furniture system 200 of FIGS. 1A-B and FIG. 2, showing use of: (1) selectively mounting couplers 15 which couple transverse members 14, 14*a* to base 12*a*; (2) integral electrical hubs 100 mounted internally within the furniture system 200 to provide a source of electrical power; as well as (3) details of base 12*a*, including cushioning assemblies and integral, internal speaker assemblies of base 12*a*.

Figure 4A:
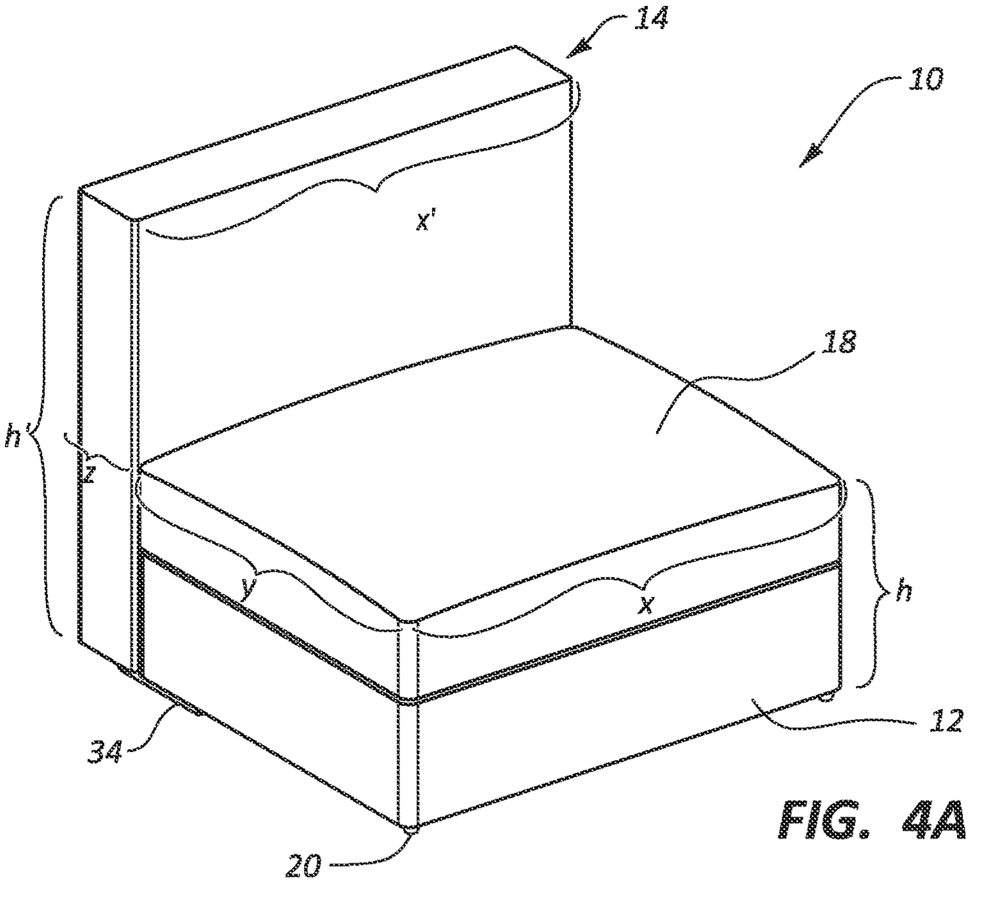
FIGS. 4A-4B illustrate a modular furniture assembly of the present invention.
Figure 4B:
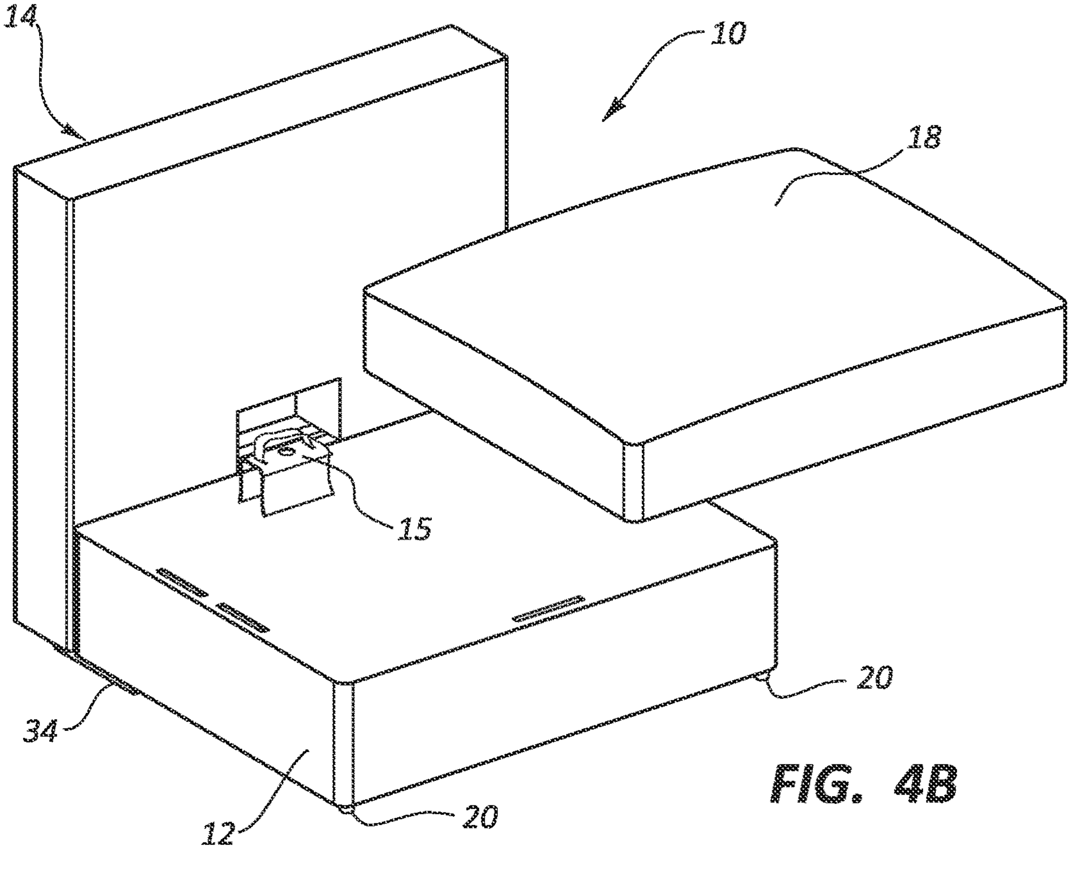

Audio-enhanced modular furniture system 200 has bases 12*a* and transverse members 14*a* that are similar to base 12 and transverse member 13 of FIGS. 4A-B. Base 12*a* connects to transverse member 14*a* and 14 in the same or similar manner to that of base 12 and transverse member 14 shown in FIGS. 4A-B, which will now be discussed.

FIGS. 4-7: Coupling and Electrical Power

Figure 5:
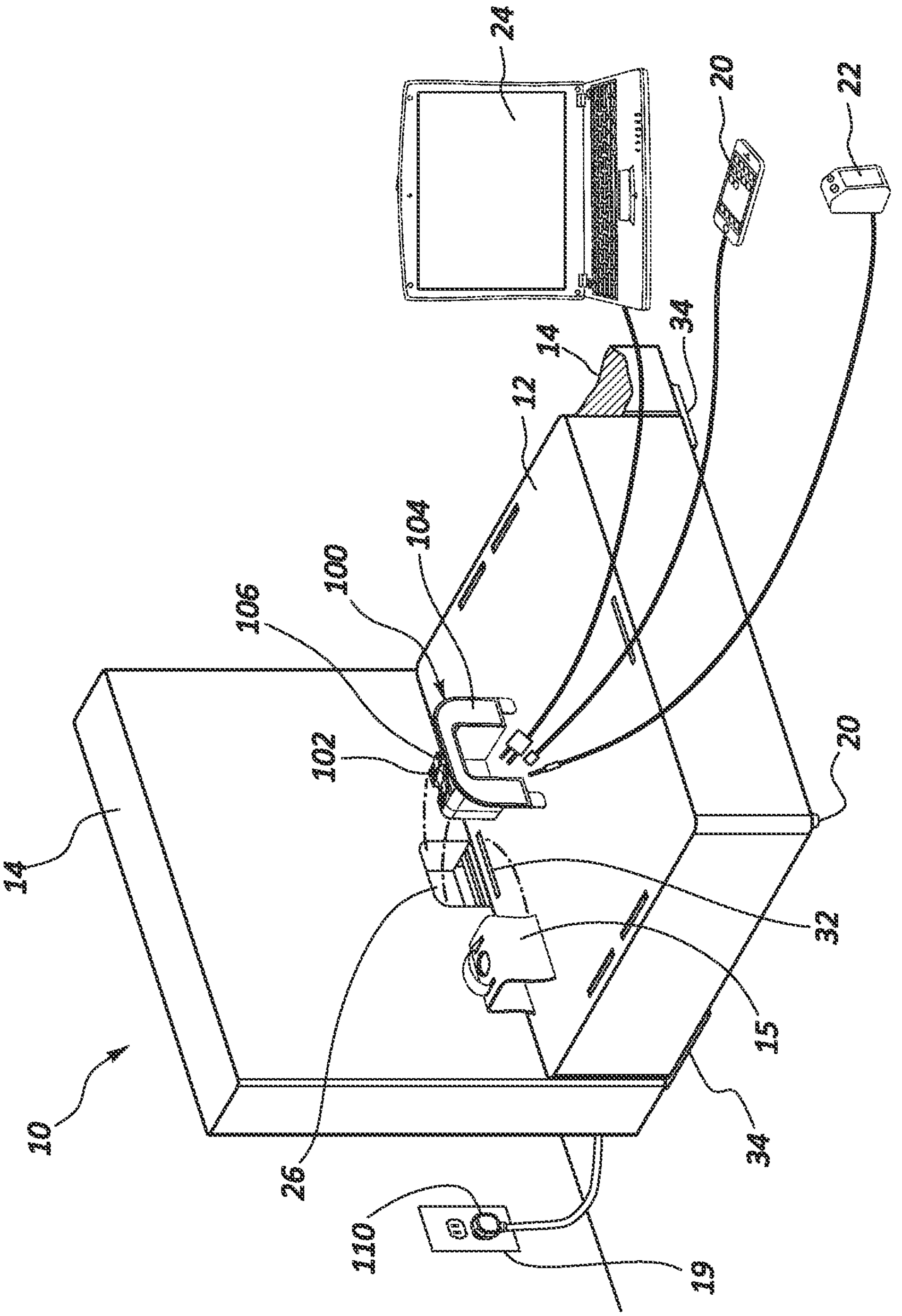
FIG. 5 illustrates the modular furniture assembly of FIGS. 2A-2B in an exploded view with the addition of certain electronic assemblies which connect to an electrical hub configured to be mounted within the modular furniture assembly.
Figure 6:
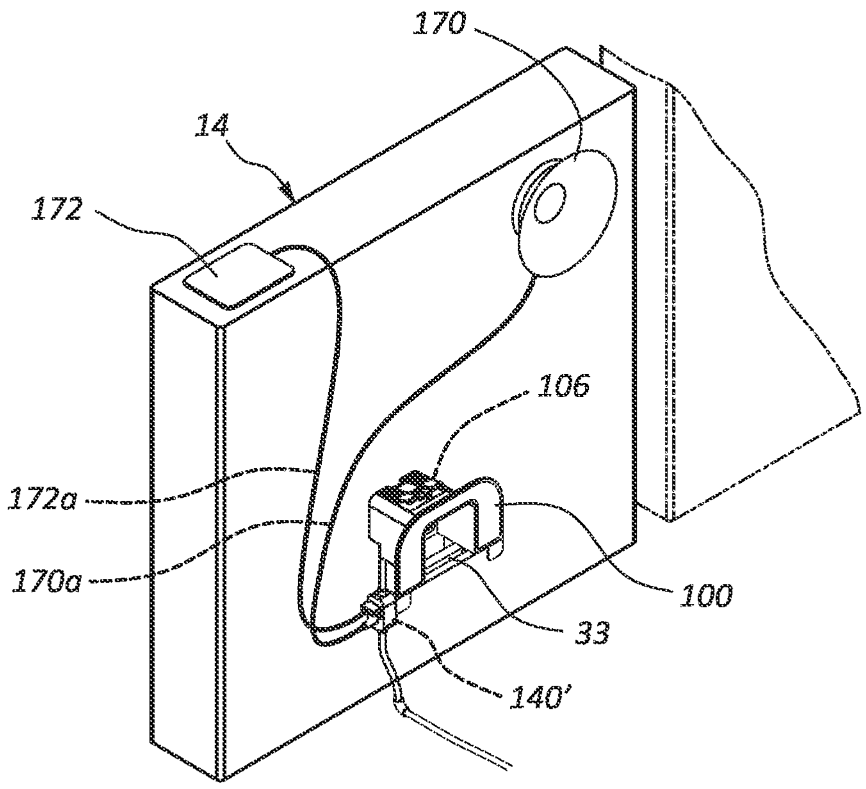
FIG. 6 is a perspective view of a transverse member of the present invention, including phantom views of certain electronic components internally mounted and connected to a hub of the present invention. An adjacent transverse member is also depicted.
Figure 7:
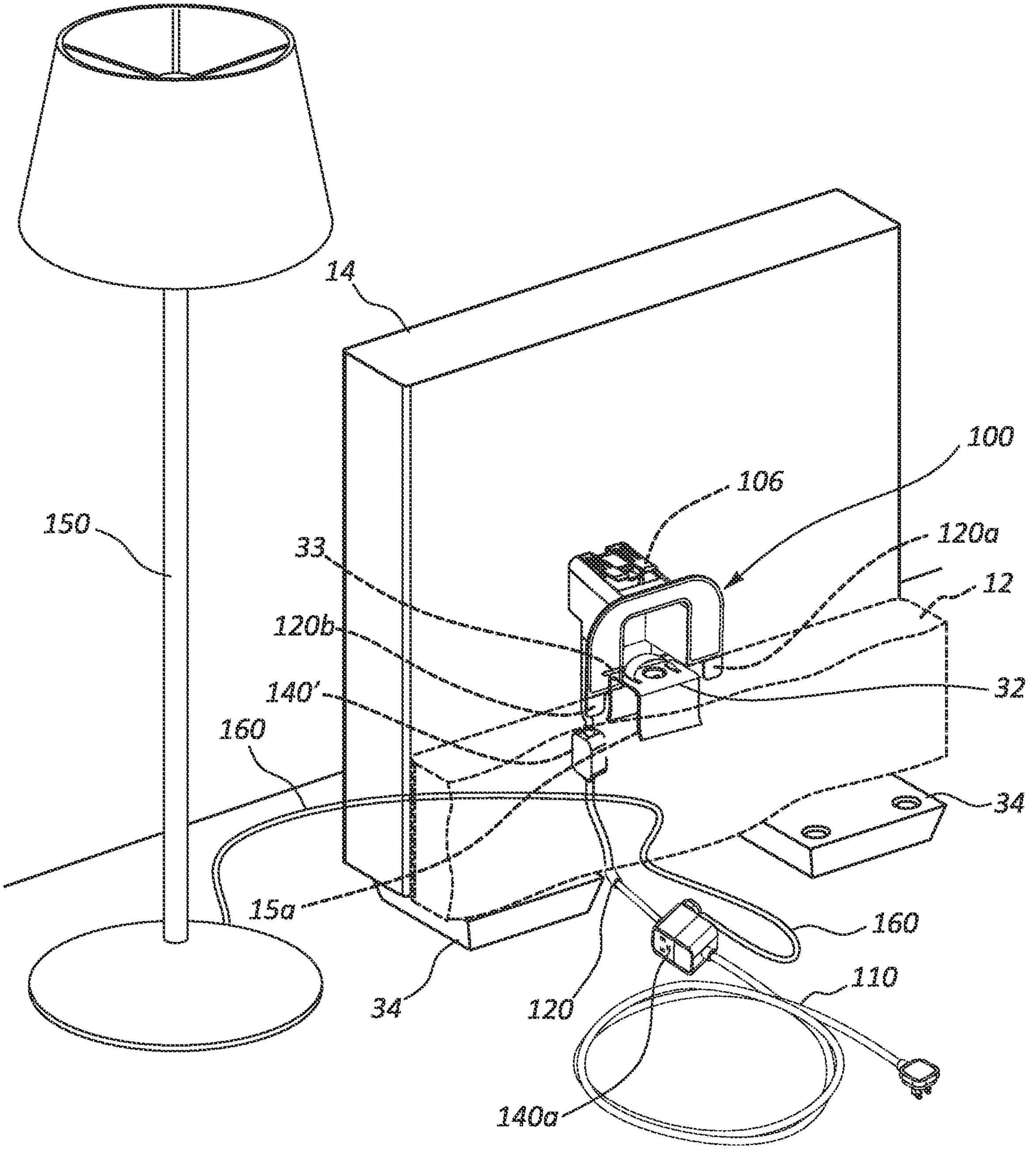
FIG. 7 is a perspective view of a transverse member and a hub mounted within the transverse member, including a lamp electrically coupled to the hub.

Additional details of each of the components reflected in FIG. 3 will be discussed in additional detail with reference to FIGS. 4A-4B, 5-7, and 8A-8H. For example, FIGS. 4A-4B shows additional details relating to the use of couplers 15 and the coupling of a base 12 to a transverse member 14. FIG. 5 shows further details relating to couplers 15, as well as details relating to electrical hub 100, which acts as a source of electrical power for the speakers and other electrically powered devices, such as phones, computers, lamps, recharging systems, and other electrical devices that can be conveniently used by a user sitting on the modular furniture assembly depicted in FIG. 5. FIG. 6 shows the coupling of electrical hub 100 within a transverse member 14, as well as the advantageous use of electrical hub 100 to power a speaker 170 and an induction charger 172 that can be used to wirelessly charge electrical devices, e.g., phones, etc., placed on or within a transverse member 14, e.g., when transverse member 14 is being used as an armrest. FIG. 7 shows the use of hub 100 to power a lamp. FIGS. 8A-8H demonstrate an embodiment of a speaker system coupled within base 12*a*. FIGS. 9A-12 demonstrate embodiments of speaker systems within transverse members 14*a*.

The coupling together of components of the modular furniture assembly of the present invention and the electrical power system within the modular furniture assembly will now be discussed with detailed reference to FIGS. 4A-7. The principles of coupling using coupler 15 and the use of hub 100 to provide electrical power can be employed in conjunction with speaker-containing bases 12*a* and transverse members 14*a* and/or in conjunction with non-speaker containing bases and transverse members.

FIGS. 4A-4B: Modular Furniture Configuration and Coupling

FIGS. 4A-4B illustrate a modular furniture assembly 10 of the present invention. Modular furniture assembly 10 of FIGS. 4A-B illustrates the configuration of base 12 and transverse member 14 and the coupling of base 12 and transverse member 14 to each other. Once base 12 is placed adjacent transverse member 14, coupler 15 selectively couples base 12 to transverse member 14. Coupler 15 can also be used to couple speaker-containing base 12*a* to speaker-containing transverse member 14.

In one embodiment, neither base 12 nor transverse member 14 of FIGS. 4A-4B have a speaker, electrical hub, or other electrical component therein, whereas, in another embodiment, base 12 and transverse member 14 of FIGS. 4A-4B each may have one or more speakers, an electrical hub, or other electrical component therein. FIGS. 4A-4B are shown in order to illustrate the use of coupler 15 to couple a non-speaker-containing base/transverse member combination or a speaker-containing base/transverse member combination.

As shown in FIGS. 4A-4B, each of the modular furniture assemblies 10 have a seat cushion 18 on base 12 thereon for sitting on by a user. In addition, foot couplers 34 are shown for coupling the bottom portions of transverse members 14 and bases 12 to each other.

Further discussion and disclosure relating to the modular furniture assemblies 10 and their connection to each other and to the transverse members 14 are shown and discussed in the following patents and patent applications, each of which are incorporated herein by reference: (i) U.S. patent application Ser. No. 14/332,705, filed Jul. 16, 2014, entitled MOUNTING PLATFORM FOR MODULAR FURNITURE ASSEMBLY, (ii) U.S. Pat. No. 8,783,778, entitled MOUNTING PLATFORM FOR MODULAR FURNITURE ASSEMBLY, (iii) U.S. Pat. No. 7,963,612 entitled MODULAR FURNITURE ASSEMBLY, (iv) U.S. patent application Ser. No. 11/449,074, filed Jun. 8, 2006, entitled MODULAR FURNITURE ASSEMBLY, now U.S. Pat. No. 7,547,073, (v) U.S. Pat. No. 7,213,885 entitled MODULAR FURNITURE ASSEMBLY, (vi) U.S. Provisional Application No. 62/354,426 filed Jun. 24, 2016 entitled MODULAR FURNITURE ASSEMBLY CORNER SEATING SYSTEM; (vii) U.S. Provisional Patent Application Ser. No. 62/257, 623, filed on Nov. 19, 2015, entitled FURNITURE WITH ELECTRONIC ASSEMBLIES; (viii) U.S. patent application Ser. No. 15/270,339, filed on Sep. 20, 2016, entitled ELECTRICAL HUB FOR FURNITURE ASSEMBLIES; (ix) U.S. patent application Ser. No. 15/276,524, filed Sep. 26, 2016, entitled Modular Furniture Assembly Corner Seating System; and (x) U.S. patent application Ser. No. 15/342,800, filed Nov. 3, 2016, entitled Furniture System with Recliner Assembly, each of which are incorporated herein by reference.

The bases and transverse members of the present invention can include one or more covers (e.g., an inner cover and an outer cover). Such covers have various advantageous, such as that the outer covers are conveniently removable so that the user can remove the covers, wash them, and swap them with other covers as desired. In one embodiment, the speakers used in the present invention are frequency tuned so that there is a high quality sound emitted through the inner and/or the outer removable covers.

FIG. 5: Electrical Power Hub for Modular Furniture

FIG. 5 illustrates the modular furniture assembly of FIGS. 4A-4B in an exploded view with the addition of certain electronic assemblies which connect to an electrical hub configured to be mounted within the modular furniture assembly.

Hub 100 of FIG. 5 is used to provide electrical power to the speakers of furniture system 200 and other electrical components. Base 12 of furniture assembly 10 is selectively coupled to first and second transverse members 14 of furniture assembly 10, a second transverse member being shown in a partial view in FIG. 5.

Each transverse member 14 has a cavity 26 in a middle, lower portion thereof. A U-shaped coupler 15, selectively couples an upper portion of a base 12 to a middle, lower portion of a transverse member 14. Foot couplers 34 selectively couple respective feet of base 12 to respective feet of the transverse members 14. Foot couplers 34 have apertures therein that receive the feet of respective adjacent bases and transverse members, coupling them to each other.

In one embodiment, a foot coupler such as coupler 34 can be placed under a foot of a base that is not adjacent a transverse member or other base, for aesthetic continuity and/or to provide a level surface of all four corners of the base. Furniture assembly 10 is a modular furniture assembly that can be assembled as illustrated in FIG. 5, for example.

As illustrated in FIG. 5, a U-shaped coupler 15 selectively connects a portion of base 12 to a portion of a transverse member 14 by placing one plate of the U-shaped coupler 15 within an aperture 32 in the frame of base 12 and another plate of the U-shaped coupler 15 within an aperture 33 (see FIG. 7) in the frame of transverse member 14 that is in the cavity 26 of transverse member 14, thereby selectively coupling base 12 to transverse member 14. The second transverse member 14, shown in partial view in FIG. 5, and/or additional transverse members 14, can be selectively coupled similarly or in exactly the same manner to base 12.

Base 12 is used as a seat member and/or for receiving a cushion 18 to be used as a seat member while transverse member 14 can be used as a backrest and/or arm rest. Various combinations of bases, transverse members, and U-shaped couplers and foot couplers can be used in varying numbers to create a variety of different furniture assemblies of the present invention, as discussed and illustrated in the patents and patent applications that are incorporated herein by reference.

Electrical hub 100 is also shown in an exploded view in FIG. 5, electrical hub 100 being selectively mounted within the cavity 26 of transverse member 14 and a portion of an electrical hub 100 being selectively sandwiched between a portion of base 12 and a portion of transverse member 14, thereby maintaining hub 100 in a convenient, stable position within furniture assembly 10. Hub 100 acts as a convenient power source for electrical devices 20, 22, and 24. As described in further detail herein, hub 100 may also provide power for speakers and/or other audio components (e.g., an audio receiver).

When cushion 18 of FIG. 4B is placed onto base 12 and adjacent transverse member 14 of FIG. 5, hub 100 is not visible to the user, with the exception of the portion of the electrical cord 110 that extends from behind furniture assembly 10 and into the electrical wall outlet 19. For example, when cushion 18 of FIG. 3 is placed on the base **12*a* and adjacent transverse member 14*a*, hub 100 is not visible to the user, as shown in FIG. 2**.

An electronic furniture assembly of FIG. 5 thus comprises: (i) a furniture assembly 10 comprising: (A) a base 12, (B) a transverse member 14, and (C) a coupler 15 for coupling the base 12 to the transverse member 14; and (ii) an electrical hub 100 as shown in FIG. 5 configured to selectively reside within the furniture assembly 10. As shown in FIGS. 1A, 1B and 2, electrical hub 100 enables the resulting electronic furniture assembly of FIGS. 1A, 1B and 2 to conveniently receive and act as a source of electrical power for personal objects, such as all phones, computers and other accessories used while sitting on the furniture assembly 10. Power available through hub 100 may also be used to power speakers and other audio components embedded within the furniture assembly in a manner that during normal use (e.g., with cushion 18 is in place), the speakers, hub 100, and even any wiring/cabling associated therewith is hidden from view.

The electrical hub 100 comprises one or more electrical outlets. Hub 100 is configured to be selectively integrated into furniture assembly 10. One or more electrical hubs 100 is configured to be selectively integrated into a variety of other furniture assemblies, having one or multiple transverse members 14, such as the furniture assemblies disclosed in U.S. Pat. No. 8,783,778, entitled MOUNTING PLATFORM FOR MODULAR FURNITURE ASSEMBLY and (vii) Provisional Patent Application Ser. No. 62/257,623, filed on Nov. 19, 2015, entitled "Furniture with Electronic Assemblies," each of which are incorporated herein by reference. The electrical hubs 100 described herein are compatible to communicate with the transverse member cavities disclosed in the aforementioned patents and applications.

Hub 100 can be conveniently used within the transverse members of the furniture assemblies disclosed in U.S. Pat. No. 7,213,885 entitled MODULAR FURNITURE ASSEMBLY, wherein the furniture assemblies have a configuration such that the length X of the base and the length X' of the transverse member are equal to each other and wherein the length X of the base is equal to the width of the base and the width of the transverse member, such that X=Y+Z and X=X' as disclosed in U.S. Pat. No. 7,213,885 entitled MODULAR FURNITURE ASSEMBLY, which is incorporated herein by reference.

The drawings provided herein show hub 100 in use in connection with modular furniture. However, hub 100 is conveniently used in connection with various types of furniture, including: (i) fixed, non-configurable furniture; (ii) furniture that is assembled by a consumer (known as "assemble-able furniture); and furniture that can be configured into a variety of different configurations (known as "modular furniture"). Assemble-able furniture includes (i) modular furniture that can be configured into a variety of different configurations and (ii) furniture that can only be assembled into a single configuration. Hub 100 is conveniently used in connection with various types of furniture, including (i) fixed-nonconfigurable, (ii) assembleable-modular and (iii) assembleable-non-modular furniture.

Although FIG. 5 illustrates a furniture assembly 10 that includes two transverse members 14, and a base member 12, in other embodiments, the hub 100 or hubs 100 may be used in other combinations of transverse members 14 and base members 12, such as those disclosed in the aforementioned patents and applications, hub 100 being configured to be disposed partially within at least one of the transverse members 14 of such assemblies. When positioned thereon, cushion 18 hides the hub 100 from view. A number of mobile, computing and/or other electronic devices 20, 22, 24 are plugged in to the hub 100 that resides at least partially within the transverse member 14 behind the cushion 18.

FIG. 5 illustrates a mobile phone 20, a speaker 22, and a laptop computer 24 electrically connected to the hub 100. Other electrical devices that may be plugged into the hub 100 may include, but are not limited to, table lamps, induction chargers, couch and/or chair lamps, reading and/or floor lamps, mobile computing devices, speakers, stereo systems, vacuums, heaters, fans, electric blankets, and the like for use by a user using furniture assembly 10.

FIG. 5 also illustrates a hub electrical cord 110 plugged into a wall outlet 19. The hub electrical cord 110 provides electrical power to the hub 100, which in turn provides electrical power to the one or more electronic devices 20, 22, 24 that are plugged or otherwise connected into the hub 100. In this way, electronic devices 20, 22, 24 are powered via the hub 100 in a visually pleasing and convenient way. For example, the electrical outlets of hub 100 and connections of the electrical devices to the hub 100 are typically not seen by the user when the user is seated on the couch or by others in the room when the cushion(s) is on the base 12. The hub electrical cord 110 thus provides power to multiple electronic devices 20, 22, 24 from a single a power source. A person sitting on or otherwise using the illustrated furniture assembly 10 has access to his or her electronic devices 20, 22, 24 while they are being powered through the hub 100 without the need for multiple electrical cords or other power strips separate from the furniture assembly 10.

As shown in FIG. 5, in one embodiment, the electrical hub 100 comprises: (a) an electrical outlet assembly 102; (b) a securement panel 104 wherein a rear face of the securement panel 104 is linked to the electrical outlet assembly 102, such that at least one outlet of the electrical outlet assembly 102 is spaced away and offset from the securement panel 104; and (c) an installation clip 106 mounted to the electrical outlet assembly 102, the installation clip 106 being moveable with respect to the electrical outlet assembly 102, the installation clip 106 having an extended position and being capable of being moved to a compressed position when it is desired to move the hub into cavity 26. Electrical outlet assembly 102 includes electrical cord 110 and at least one electrical outlet in electrical communication with cord 110.

The free end of the installation clip 106 is movable with respect to the assembly and is configured to be normally in the extended position absent any other force, and is selectively moved by a user from the extended position to the compressed position in order to mount the electrical hub 100 within the furniture assembly 10. Clip 106 is further configured to be selectively moved by a user from the extended position to the compressed position in order to remove the electrical hub 100 from the furniture assembly. Hub 100 is configured to be selectively mounted within a furniture assembly 100 in order to provide a source of electrical power for one or more electrical devices 20, 22, 24 adjacent the furniture assembly, as illustrated in FIG. 5.

Additional information regarding hub 100 is disclosed in U.S. patent application Ser. No. 15/270,339, filed on Sep. 20, 2016, entitled "Electrical Hub for Furniture Assemblies," which is incorporated herein by reference.

FIGS. 6-7: Electrical Components Coupled to Electrical Hub 100

FIG. 6 is a perspective view of a transverse member of the present invention, including phantom views of certain electronic components connected to a hub of the present invention. An optional adjacent transverse member is also depicted.

FIG. 6 illustrates a transverse member 14 of the present invention having an electrical hub 100 mounted therein, wherein a speaker 170 and an induction charger 172 are fed electrical power through the electrical hub, the speaker and induction charger being mounted within the transverse member.

Various electronic devices can be electrically coupled to the outlets of the electrical outlet assembly 102 or to the interior outlet 140' shown in FIGS. 5-6, such as speakers, induction chargers (e.g., under the fabric of a transverse member serving as an arm rest), refrigerators, amplifiers for a surround sound system, and a vast number of other electrical devices that are convenient to have in a furniture assembly. In various embodiments, outlet 140' has one, two, or more than two electrical outlets.

In addition, one or more additional transverse members with a hub 100, a speaker 170, and a charger 172 can also be provided in order to provide stereo and surround sound and in order to provide a conveniently wired electrical furniture assembly.

Using induction charger 172 mounted within a transverse member 14, a user seated on a furniture assembly 10 can conveniently recharge an electrical device, such as a cellular phone, while seated on the modular furniture assembly.

Wireless qi charging, e.g., via induction charger 172 embedded within the transverse member or other devices is used to charge mobile devices, such as cellular phones, computers, lighting systems, lamps, or other electronic devices. As shown in FIG. 6, the qi charger, also known as an induction charger, may be hidden under furniture covers and/or embedded within the wooden frame of an embodiment of transverse member 14. The induction charger may be hidden both visibly (i.e., hidden from view), as well as hidden from "feel", in that its presence may not be readily perceived by a user, e.g., sitting on an armrest or other component of the furniture system, even where such induction charger may be positioned therein. In one embodiment, the induction charger is mounted on an upper surface of one or more transverse members under a thin cover in order to provide easy access for mobile devices, such as cellular phones, etc.

The induction charger charges though layers of fabric when desired. The induction charger may be placed in a variety of locations such as within the transverse member or the base.

Other embedded devices that may be employed in transverse member 14 or in a base 12, including ambience lights, heating systems, cooling systems and motion sensors, for example.

FIG. 7 is a cutaway perspective view of a transverse member 14 and a hub 100 mounted within the transverse member 14, including a lamp 150 electrically coupled to the hub 100. As shown in FIG. 7, the hub electrical cord 110 extends from the hub 100, through the transverse member 14, out of a hole in the bottom portion of the frame of the transverse member 14 and below transverse member 14, so that the hub electrical cord 110 can be plugged in to an external power source. The illustrated hub electrical cord 110 is flexible and in some of the embodiments shown, e.g., in FIG. 7 is comprised of a plurality of extension cords.

An electrical device such as lamp 150 has a cord 160 thereof conveniently connected to floor resting cord outlet 140*a* as shown in FIG. 7. Electrical cord 110 is thus advantageous because cord outlets such as floor resting cord outlet 140*a* can power an electrical device such as lamp 150 and hide at least a portion of the corresponding electrical cord 160 from view, providing a more functional furniture assembly and a more pleasing aesthetic appearance.

Cord elbow 120 extending about electrical cord 110 is also illustrated. The cord elbow 120 is a rigid or semi-rigid component (comprised, e.g., of a hard plastic) positioned about cord 110 in a bending, elbow shape along the length of the hub electrical cord 110. The cord elbow 120 is positioned about the hub electrical cord 110 so as to facilitate a convenient permanent bending of the hub electrical cord 110 while simultaneously protecting the bent portion of cord 110. In one embodiment, the cord elbow 120 bends the hub electrical cord 110 at a position where the hub electrical cord 110 reaches the floor or other surface when extending between the electrical outlet assembly 102 and a power source, such as a wall outlet 19.

Elbows such as cord elbow 120 provide a protected, smooth transition from a vertical orientation to a horizontal orientation, and may be comprised of a variety of different materials, such as a hard plastic, or a rubber, neoprene, silicone or other material that can be wrapped around and electrical cord and form a rigid or semi-rigid tubular member wrapped around the cord.

Elbows such as cord elbow 120 extending about cord thus protect the electrical cord from breaking or fraying while bending, minimize the amount of electrical cord seen, and in some instances hides the electrical cord from view.

Also as shown in FIG. 7, one coupler plate 15*a* of coupler 15 is configured to fit within a corresponding aperture 32 of base 12 while another plate of coupler 15 fits within a corresponding aperture 33 of transverse member 14 to thereby selectively connect base 12 to member 14. As shown, in one embodiment, U-shaped coupler 15 has a ribbon handle attached thereto for removing coupler 15 from respective apertures 32, 33 and may have a hole in a top portion thereof, which assists in reducing the weight of the coupler 15. In other embodiments, the hole and ribbon are not employed.

FIG. 7 further shows the convenience and utility of internal cord outlet 140*a* or 140' mounted within the body of transverse member 14, which accepts the cord 160 of a lamp 150, and/or the respective cords 170*a*, 172*a* (FIG. 6) of one or more speakers 170 and one or more wireless electrical induction chargers 172 mounted within transverse member 14.

Induction charger 172 can be mounted under the fabric within a transverse member 14, for example for conveniently, wirelessly charging electronic devices wireless, e.g. a phone and/or computer placed by a user on a transverse member 14.

One or more tabs 120*a-b* extend from the panel 104 of the hub 100 and are configured to reside between the transverse member 14 and the base member 12 when transverse member 14 and base member 12 are coupled together. In this way, the tabs 120*a-b* are press fitted between the transverse member 14 and base member 12 so as to help secure the hub 100 at least partially within the cavity 26 in transverse member 14.

Coupler 15 and similar couplers and hub 100 and similar hubs can be employed to provide coupling and electrical power in conjunction with speaker-containing bases 12*a* and transverse members 14*a* and/or in conjunction with non-speaker containing bases and transverse members.

FIGS. 8A-8H: Base 12*a* with Speaker System

FIGS. 8A-8H demonstrate an example of the base 12*a* of the furniture system 200 in the form of the chair of FIGS. 1A-FIG. 3 of the present invention and the subwoofer speaker system mounted within the frame of the base 12*a*.

FIGS. 8A-8H illustrate how subwoofer 210*a* is mounted and positioned within base 12*a*. As shown in FIGS. 8A-8H, base member 12*a* includes a frame assembly 216 into which subwoofer 210*a* is mounted. Subwoofer 210*a* can receive its audio signal wirelessly (e.g., from transmitter 224, or from receiver/amplifier 217), or through a wired connection (e.g., from audio receiver 217). Power for a powered subwoofer may be provided from hub 100. If the subwoofer is passive (e.g., no internal amplifier), the amplified signal may be provided from receiver/amplifier 217.

FIGS. 8A-H illustrate how subwoofer 210*a* is embedded into the frame assembly 216 of base 12. Frame assembly 216 of base 12*a* has a cavity 226 within frame assembly 216, within which subwoofer 210*a* is positioned.

Subwoofer speaker 210*a* is comprised of a subwoofer speaker driver 211*a*, including electronics and other structure typically associated with such a speaker driver, such as its magnet. Speaker driver 211*a* is coupled to a speaker housing 228 on which driver 211*a* is mounted. Speaker housing 228 provides a given, desired internal volume associated with subwoofer speaker 210*a*. In the illustrated embodiment, housing 228 is separately defined from the cavity 226 within frame assembly 216.

The configuration of speaker housing 228 enables speaker 210*a* to be removed from the cavity 226 of base member 12*a* so as to allow a user to remove subwoofer assembly 210*a* from a given base member 12*a* and install it into another base member 12, for example, which may not have previously included a subwoofer speaker 210*a* therein. Subwoofer assembly 210*a* is thus entirely self-contained. Enclosure 228 may be sealed or ported, as desired.

Subwoofer speaker 210*a* further includes elongate attachment arms 230*a* and 230*b* mounted on opposing sides of speaker housing 228. Arms 230*a* and 230*b* are attached to the enclosure 228 and couple enclosure 228 to frame assembly 216 of base 12*a*.

In the illustrated embodiment, arms 230*a* and 230*b* each include an angled terminal extension 232 at each end thereof and a mounting hole 232*a* associated therewith. The positioning and orientation of holes 232*a* are configured to allow subwoofer speaker 210*a* to be received within cavity 226 of frame assembly 216 in a manner that holes 232*a* align with the holes for mounting feet 20*a* of base member 12*a*.

Each of the arms 230*a-b* are comprised of an L-shaped shaft body having an approximately 90 degree angled L-shaped cross section, each shaft body having terminating extensions 232 extending from the shaft body. The terminating extensions 232 are angled to extend laterally outward from the shaft body as shown in FIG. 8H. As shown in FIG. 8H, the terminating extensions 232 extend in the same plane as one of the legs of the L-shaped shaft body. Using the arms 230*a-b*, the associated speakers can be quickly and efficiently coupled to the frame assembly of the base and can be readily removed therefrom in order to selectively replace the speakers.

Thus, in one embodiment of the present invention, the speaker system comprises one or more arms configured to couple one or more speakers to a frame of a portion of the furniture assembly, the one or more arms comprised of an L-shaped shaft body having an angled L-shaped cross section, the shaft body having terminating extensions extending from the shaft body, the terminating extensions being are angled to extend laterally outward from the shaft body, the terminating extensions extending in the same plane as one of the legs of the L-shaped shaft body.

Figure 8A:
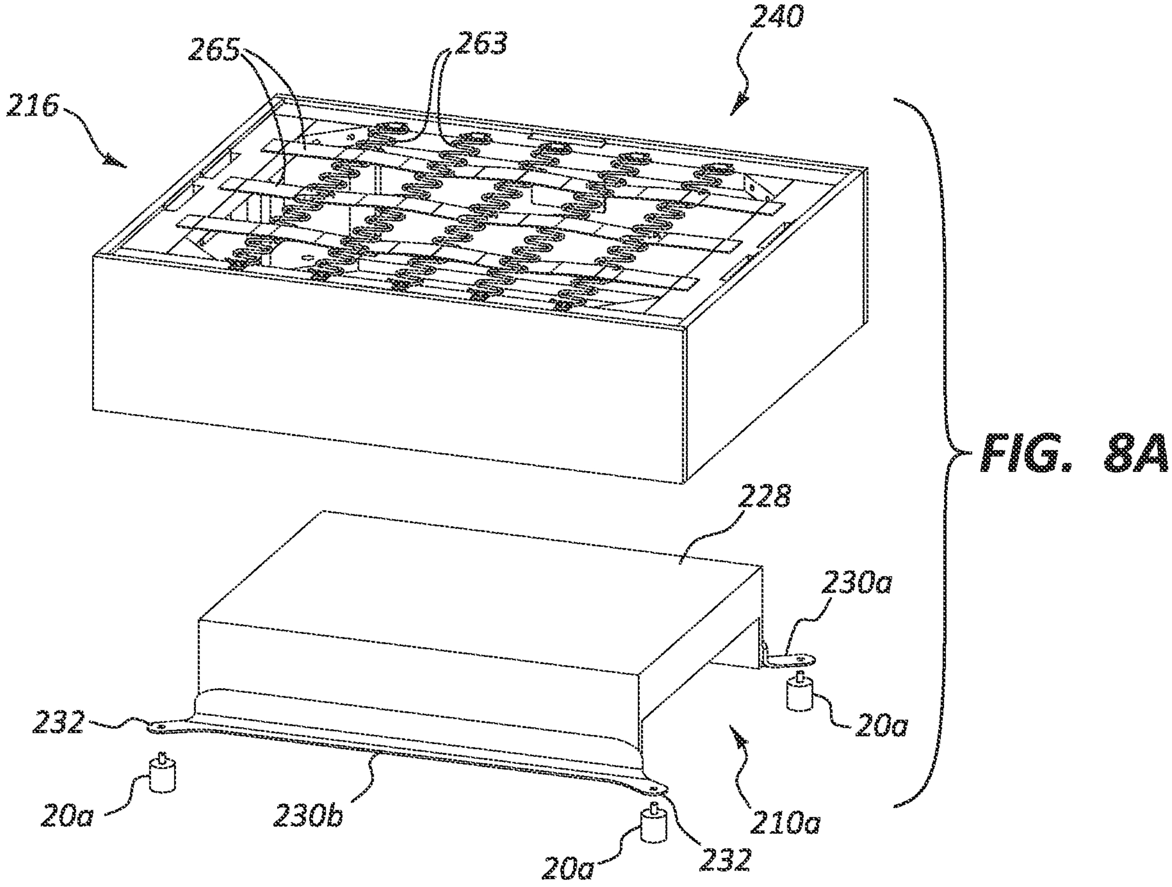
FIGS. 8A-8H demonstrate the speaker-containing base of the chair of FIGS. 1A-1B of the present invention with the subwoofer speaker system mounted within the frame of the base. An outer and inner cover and feet members associated with components of the base are depicted in FIG. 8F.
Figure 8B:
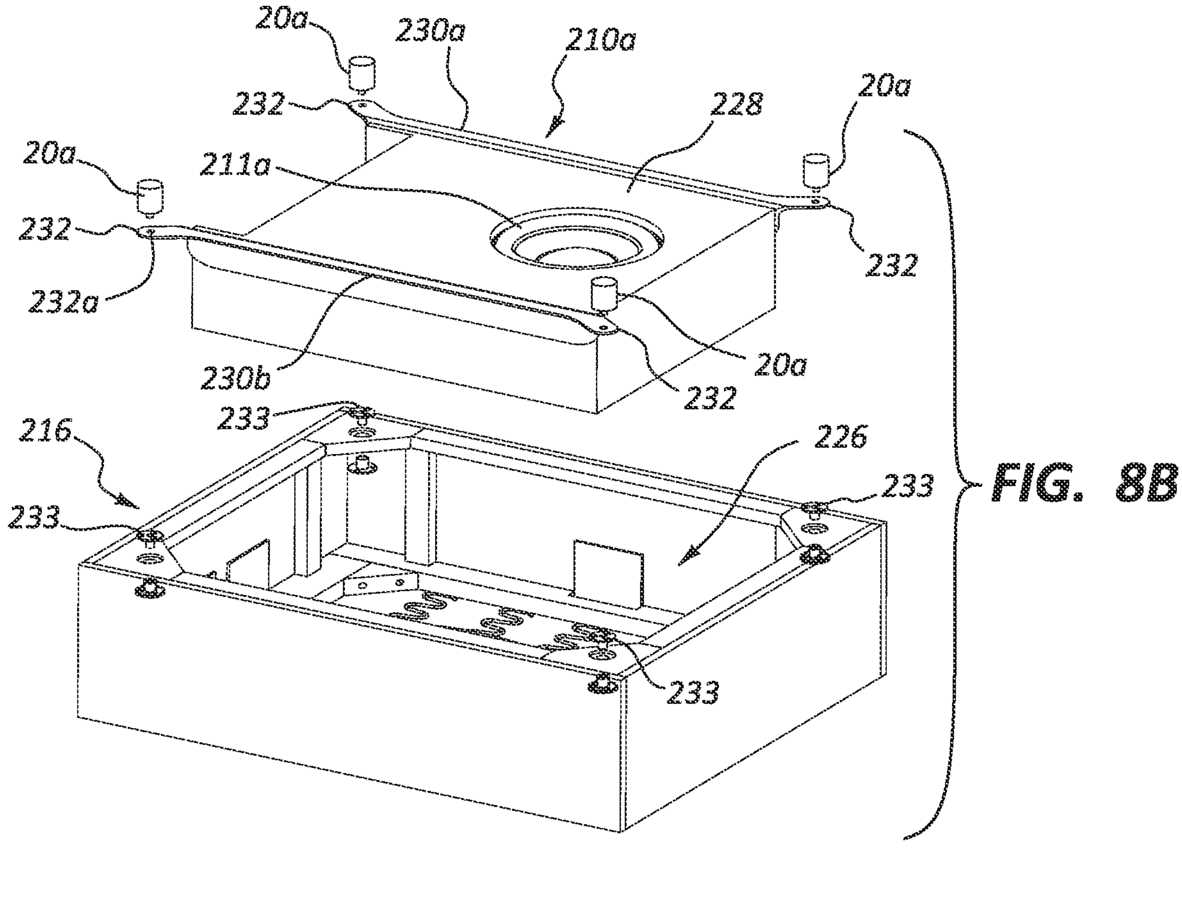
Figure 8C:
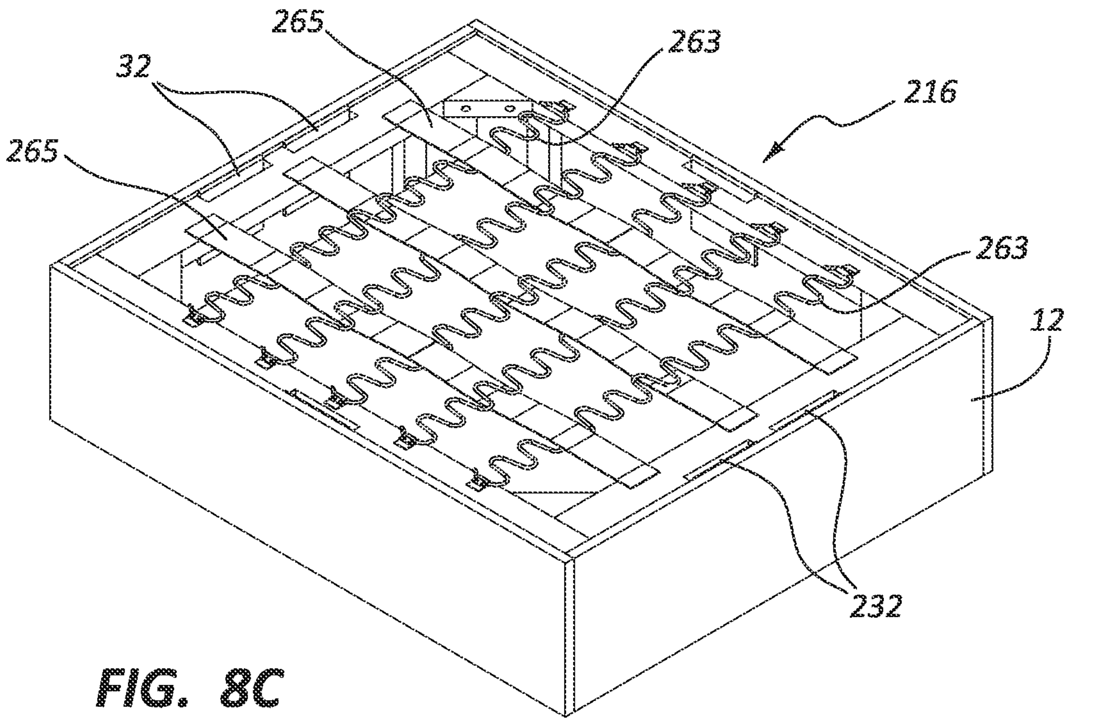
Figure 8D:
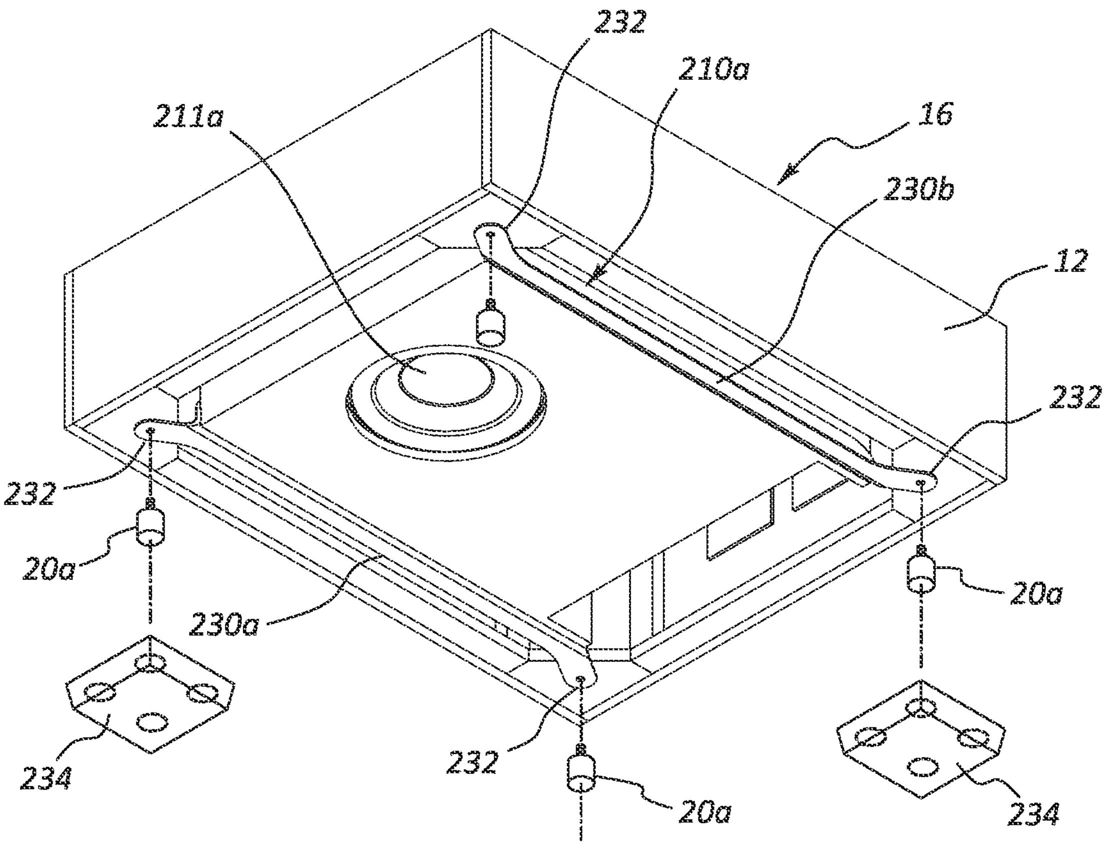
Figure 8E:
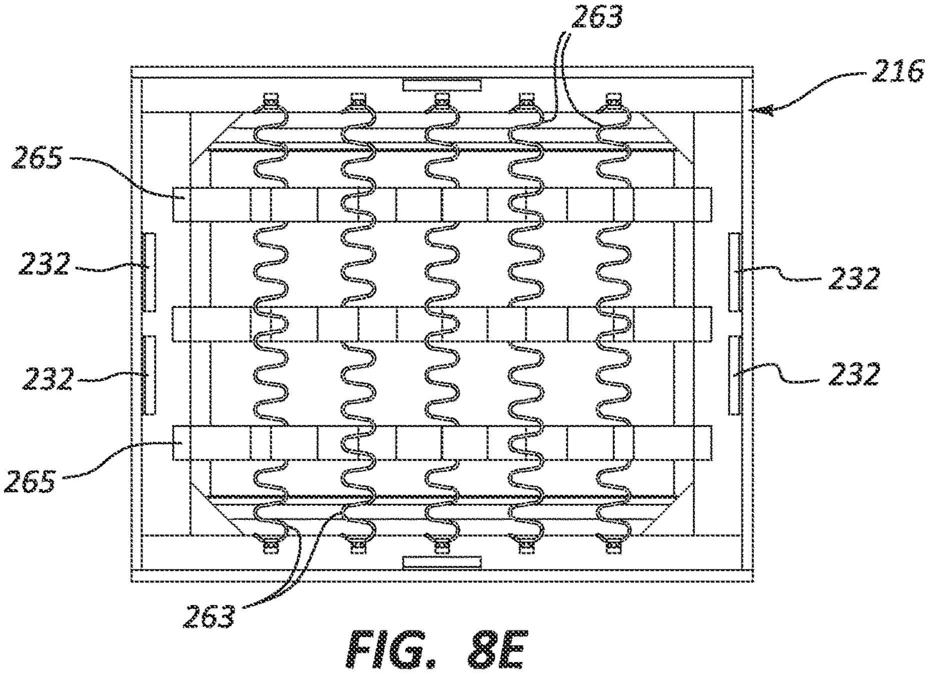
Figure 8F:
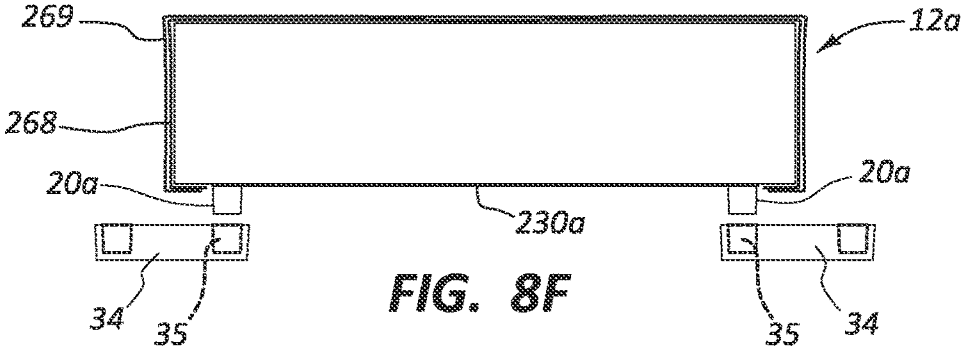
Figure 8G:
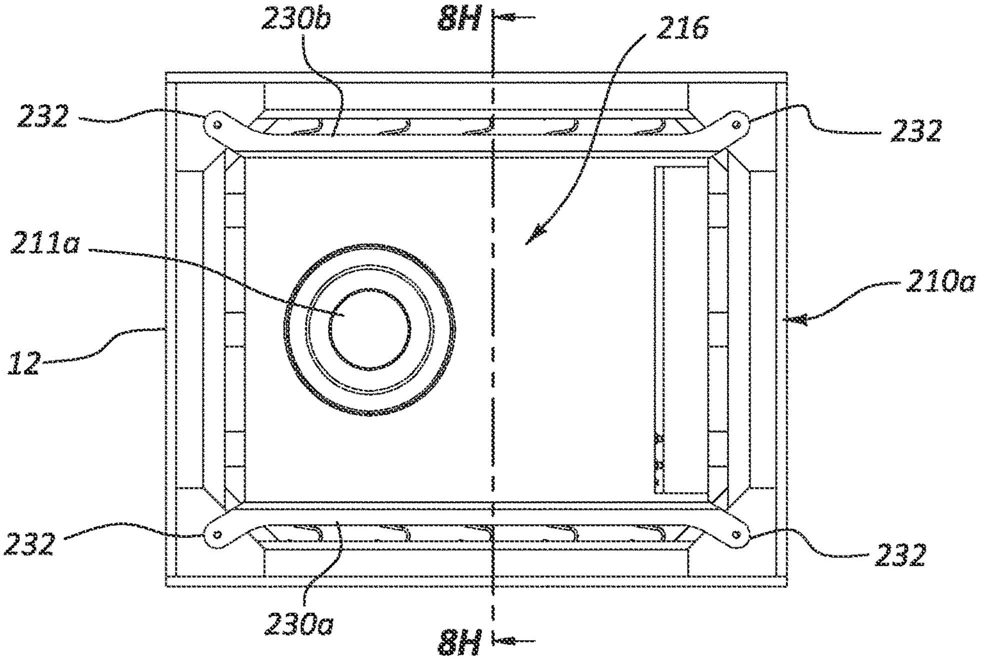
Figure 8H:
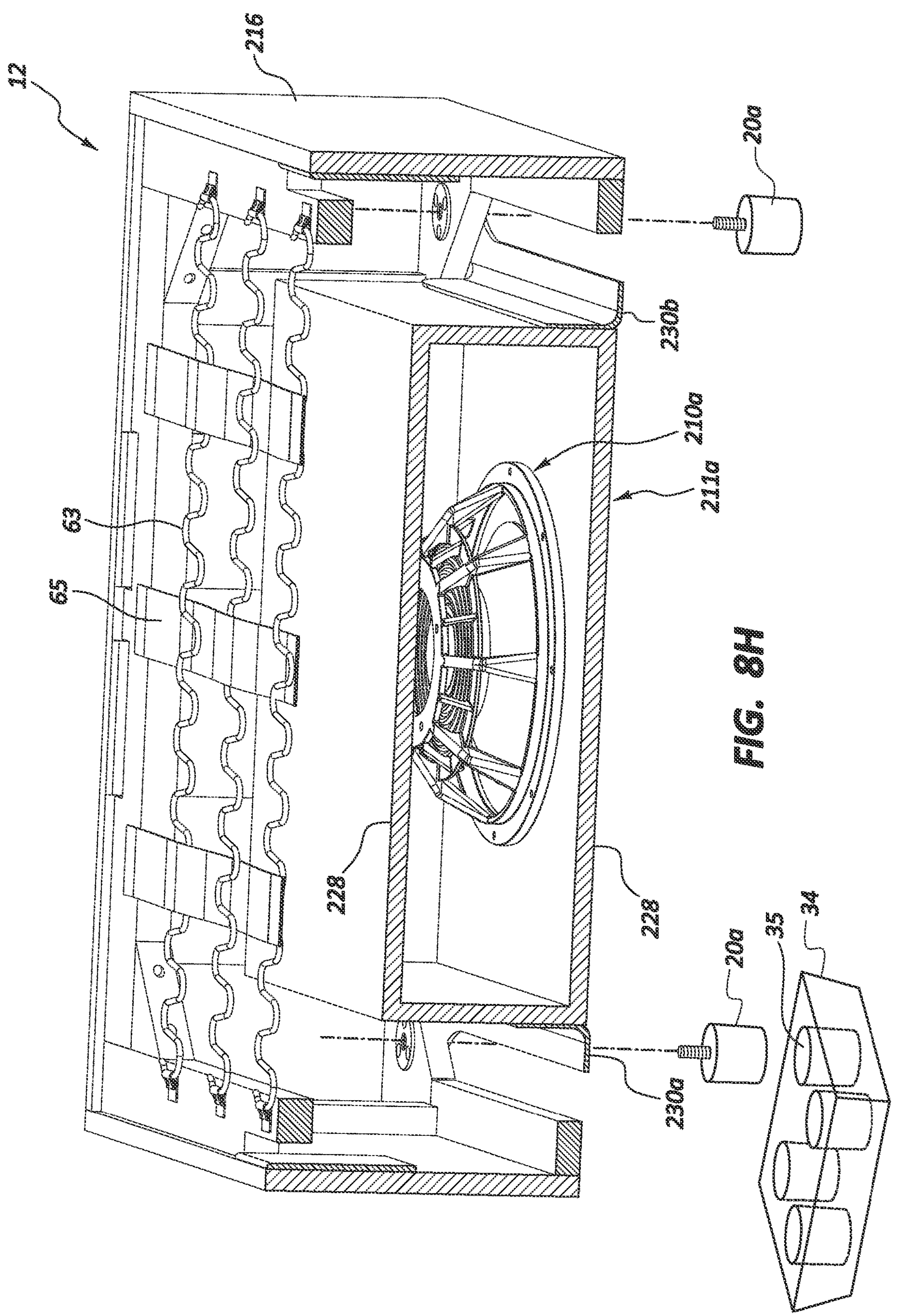

This relationship is further shown in FIGS. 8A-8H in which the positioning of feet 20*a* is depicted. Feet 20*a* of base member 12*a* are shown as being configured to be mounted to the respective four corners of frame assembly 216 with arms 230*a* and 230*b* being sandwiched between the respective feet 20*a* and a hole in frame assembly 216 into which feet 20*a* are threadedly received, for example. FIG. 8B illustrates the positioning of upper and lower internally threaded hubs 233 that sandwich corner portions of frame assembly 216. Feet 20*a* can be selectively threaded into hubs 233 within the corner portions of frame assembly 216.

As further shown in FIGS. 8A-H, the subwoofer speaker 210*a* is shown positioned within frame assembly 216 of base 12 in an orientation so that the driver 211*a* of subwoofer speaker 210*a* is oriented downwards, for example, in the same direction as feet 20*a* (towards the floor).

In other words, the cone of driver 211*a* associated with subwoofer 210*a* is shown as directing sound downward towards the floor or other support surface when assembled within base 12*a*.

Other configurations are possible. For example, the driver 211*a* can alternatively be flipped over so that the cone of driver 211*a* associated with subwoofer speaker 210*a* is oriented upwardly within base 12*a*, in other words, toward the seated user.

Each of these different configurations provides a different sound-enhanced experience for the user. For example, when driver 211*a* is pointed downward towards the floor, sound is reflected off the floor, the reflected sound potentially having the advantages of reflected sound, which may, in some embodiments, include improving the sound quality.

When driver 211*a* is pointed upwardly toward the user sitting on the base 12*a*, it may be possible for the user to feel and experience an increased amount of reverberation, improving the fourth dimensional experience for the user who can, in some embodiments, feel the sound of the speaker more intensely.

The illustrated configuration provides a high degree of protection for the driver 211*a* of subwoofer speaker 210*a*, while also providing excellent sound quality. In some embodiments, as frequencies of 120 Hz or less, or 80 Hz or less are largely omni-directional, a user seated on couch 200 cannot readily tell from which direction such sounds are coming.

Providing a full enclosure housing 228 for subwoofer speaker 210*a*, in addition to using an enclosure associated with frame assembly 216 of base 12*a*, provides additional protection to the driver 211*a* of subwoofer speaker 210*a*.

For example, the top side of enclosure 228 is spaced apart from the springs 263 coupled to the top of frame assembly 216 on which the cushion is positioned. The space thus provided between the top of enclosure 228 and the springs 263 coupled to the top of frame assembly 216, so that when a user sits on a cushion 18 positioned on the springs 263 coupled to the top of frame assembly 216 (or on fabric cover 266 or other cover over the springs 263), there is little risk of damage to driver 211*a* of subwoofer speaker 210*a*.

For example, such a space or clearance between the springs 263 and the housing 228 may be at least about 2 inches to about 5 inches, for example.

As shown in FIGS. 8A and 8B, one or more internally threaded hubs 233 are coupled to each of the corners of base frame 226. In one embodiment, corresponding upper and lower hubs 233 are mounted within a corner such that each corner has an upper hub and a lower hub in an aperture thereof. Feet 20*a* are threadedly coupled to corresponding corners by being threaded within corresponding upper and/or lower hubs 233.

In the embodiment of FIG. 8D, foot couplers 234 are shown. Foot couplers 234 are further shown in FIGS. 8F and 8H. In one embodiment, the diameter of each of the holes of foot couplers 234 are larger than the outer diameter of the feet 20*a*, such that the rim and body portions of the foot couplers 234 contact the corners 232 of the arms 230*a*-230*b*, such that weight of the arm's base frame 216 and an individual sitting on the base 12*a* are received by the foot couplers 234 and not by the feet 20.

FIG. 8F shows an example of an inner and outer cover 268, 269 mounted on base frame 216 and having ends that extend slightly onto the underside of base frame 216, as shown in FIG. 8F. Covers 268, 269 may be comprised of a variety of different fabrics. Additional covers or shielding members can be used to protect base frame 216 and/or speaker system 210*a*, such as a metal or plastic mesh or caging material to cover driver 211*a* on the bottom of frame assembly 216. A removable outer cover 269 is selectively, removably mounted on the undersurface of frame 216 and/or on inner cover 268 in order to protect inner cover 268 and frame 216 and in order to provide a selectively changeable aesthetic appearance. Covers 268, 269 may be secured over frame assembly 216 with attachment members, such as with one or more two-part attachment members, such as VELCRO, snaps, or with a variety of different attachment members. Staples or other attachment members may be used to connect inner cover 268 to frame 216.

As shown in FIGS. 8A-8H, at the top end of frame assembly 216, serpentine springs 63 and/or Italian webbing 65 are mounted on frame assembly 216. Such resilient cushioning structures provide support to a cushion 18 placed over frame assembly 216 and may also help to ensure that even if a user were to step or jump on the top of frame assembly 216 or a cushion placed thereon, the springs and webbing 263 and 265 will not be pressed against enclosure housing 228.

Even in the unlikely event that a user were able to depress springs 263 and/or webbing 265 to a top surface of housing 228, the rigid enclosure housing 228 will still protect subwoofer driver 211*a* from any damage. Thus, the configuration of housing 228 and the space between housing 228 and springs 263 provides dual layers of protection for subwoofer driver 211*a*.

As further illustrated in FIGS. 8F and 8H, the foot couplers 34, used to couple adjacent base members 12*a* and/or transverse member 14*a* to one another have apertures 35 that are large enough to surround feet 20*a* without contacting feet 20*a*, such that the upper surfaces of foot couplers 34 contact the surface of arms 230*a* and 230*b* on the respective corners of base 12*a*, along with other surfaces of the corners, so that more of the force and strain associated with base members 12*a* is carried by arm members 230*a* and 230*b*, and frame assembly 216 and foot couplers 34, rather than all of the force being concentrated within foot members 20.

FIGS. 9A-12 Transverse Member with Speakers

Figure 9A:
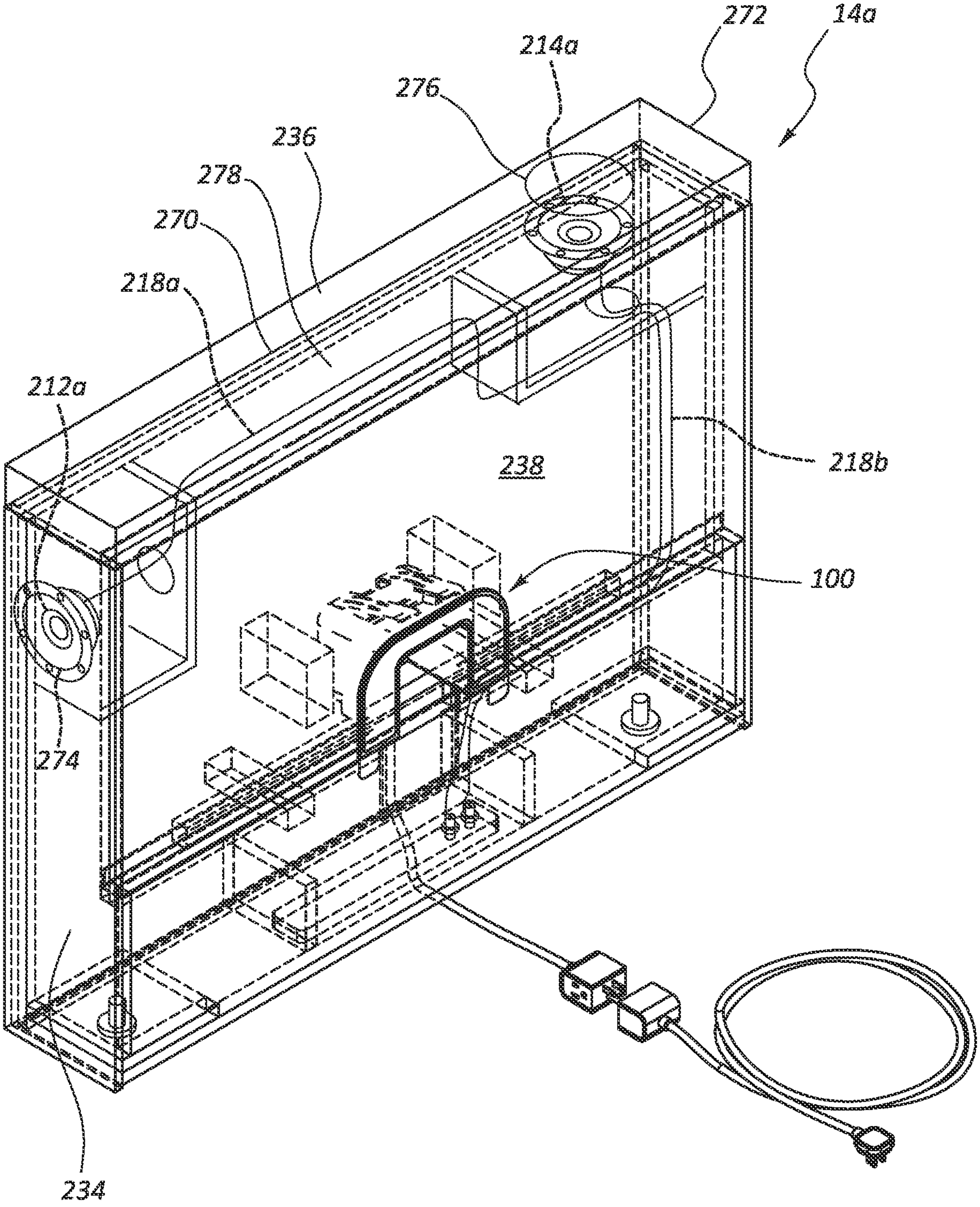
FIGS. 9A-9D demonstrate the transverse member of FIG. 1A through FIG. 3 of the present invention and the speaker system mounted within the frame of the transverse member. The electrical hub 100, which is selectively mounted within the transverse member, is shown mounted within the transverse member.
Figure 9B:
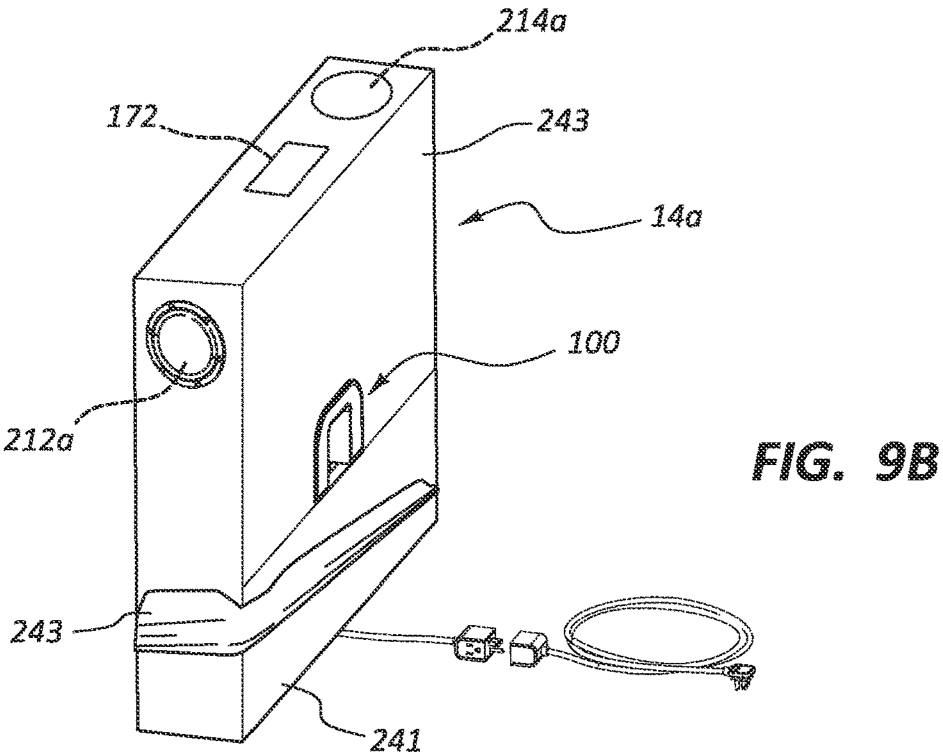
Figure 9C:
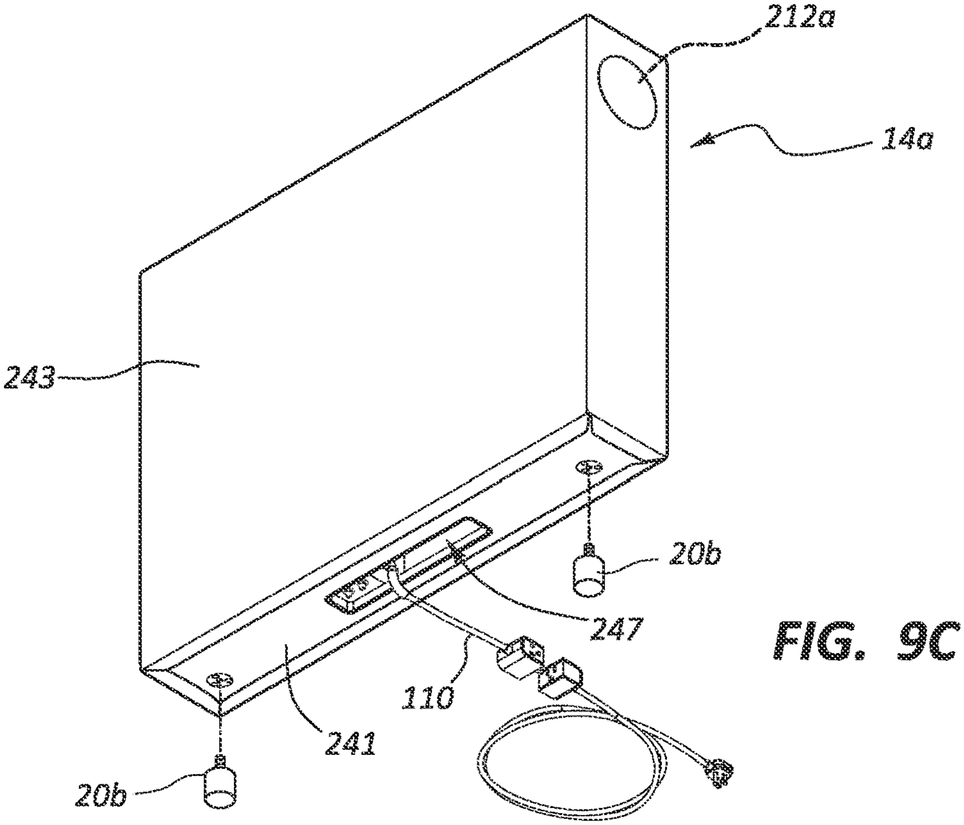

FIGS. 9A-9D demonstrate an example of the transverse member 14*a* of FIGS. 1A through FIG. 3 of the present invention, with the speakers mounted within the frame of the transverse member 14*a*. The electrical hub 100, which is selectively mounted within the transverse member 14*a*, is shown mounted within the transverse member 14*a*. Depictions of inner and outer covers 241, 243 of the transverse member 14*a* are shown in FIGS. 9B-9C. Covers 241, 243 are not depicted in FIGS. 9A and 9D.

FIGS. 9A-9D illustrate transverse member 14*a* having two speakers embedded therein. FIGS. 9A-D illustrates the mounting of front speaker 212*a* on and within the frame 270 of transverse member 14*a* and the rear, upwardly facing surround speaker 214*a* mounted on and within the frame 270 of transverse member 14*a*. FIG. 9A shows how front speakers and rear speakers 212*a-b*, 214*a-b* of FIG. 1 may be mounted to the framing 270 within transverse member 14*a*.

As shown in FIG. 9A, an exemplary mounting configuration for mounting surround sound speakers 214*a* and front speaker 212*a* to frame 270, is shown. For example, speaker 212*a* is screwed onto, bolted or otherwise secured to plywood, other wood, or other material of the frame 270 of the transverse member 14*a*, as shown. The frame 270 of the transverse member 14*a* is comprised of vertical and horizontally oriented members that define and create an internal speaker cavity within frame 270. Frame is covered on one or more exterior surfaces thereof by a cushioning material 272, e.g., a polyurethane foam material for providing cushioning to frame 270.

Holes 274, 276 are formed through the frame 270 and cushioning material 272 through which the sound of respective speakers 212*a*, 214*a* is emitted. A layer of polyurethane or other foam is typically present around the top, sides and front and back faces of frame 270 of transverse member 14*a*. Holes 274, 276 extend through such foam and frame 270 through which respective speakers 212*a*, 214*a* adjacent the respective holes 274, 276 emit sound.

An inner fabric cover 241 extends over the foam 272 and frame 270 of transverse member 14 and connects on the bottom of frame 270, as illustrated in FIGS. 9B-9C. In one embodiment, such fabric extends over the holes 274, 276, protecting the respective speakers 212*a*, 214*a*. An outer removable upholstery fabric cover 243 is selectively placed over the inner cover 243. The frequencies generated by the speakers are tuned such that the sound emitted from the speakers 212*a-b* is tuned to compensate for the sound passing through the inner and outer covers 241, 243, which covers are typically not acoustically transparent materials.

In another embodiment, a fabric inner cover may be mounted within the holes of the polyurethane or other foam material and/or the plywood frame member, after which the speakers are secured to the frame member. The outer upholstery fabric cover then extends over the transverse member, including the speakers 212*a*, 214*a*, hiding the speakers from view.

Rear surround speaker 214*a* can be mounted in the same or similar manner as speaker 212*a*, or in a different manner. For example, speaker 214*a* can be secured to a plywood or other frame member of transverse member 14*a* and mounted adjacent a hole in the frame member. A hole is also provided through the polyurethane or other foam around the top surface of transverse member 14*a* through which surround speaker 214*a* is mounted. Inner and outer fabric covers similarly extend over and/or about rear surround speaker 214*a*.

In one embodiment, the transverse member frame 270 is surrounded entirely by cushioning material 272, except possibly on the bottom surface of frame 270 and possibly within the cavity 26 where the coupler 15 and hub 100 are mounted.

The front speaker 212*a* and rear surround speaker 214*a* of FIGS. 9A-9D are mounted within compartments within the frame 270 of transverse member 14*a* and are coupled to the frame 270, e.g., with screws or bolts. Holes 274, 276 in the frame 270 and foam 272 correspond to the inner diameter of the respective speaker cone. As indicated, the interior cover 241 can either be covering the outer portion of the holes 274 to thereby cover the speakers, or can tucked into the holes created in the frame and foam that house the speakers.

The speakers 212*a*, 214*a* of FIGS. 9A-9D of the speaker-containing transverse members 14*a* are thus each positioned within the frame 270 thereof with the drivers of the speakers screwed or bolted to the frame 270 and with the inner diameter of the cones of the speakers 212*a*, 214*a* placed adjacent respective circular holes through the frame and adjacent foam.

The holes in the outer foam covering may be covered by an inner cover 241 (FIG. 9B) which covers the transverse member frame and/or by an outer cover 243 (e.g., washable) that is selectively purchased by a user according to color, fabric, etc. and which selectively is placed over the inner cover 241. The speakers 212*a*-214*a* are tuned in order to emit sound in a high quality manner through the upholstery fabrics of the covers 241, 243. For example, frequencies that are preferentially absorbed by the fabric covers (altering the loudness of a given frequency as it passes through the fabric cover) may be boosted to compensate for loss as such frequency passes through the cover(s). Relatively higher frequencies are typically more drastically attenuated by such fabric passage than relatively lower frequencies, such that the tuning may comprise preferentially boosting higher frequencies (as compared to little or no boosting of lower frequencies), in order to provide a “flat” frequency response across the frequency spectrum as heard on the other side of the fabric (i.e., at the listener’s ears).

The drivers of transverse members 14*a* may optionally be covered by a metal or plastic mesh or caging material mounted within the holes within the cushioning material and/or frame, for additional protection beyond that provided by the fabric covers.

The front-facing speaker 212*a* of FIGS. 9A-9D is shown positioned adjacent the front face 234 of transverse member 14*a*. Front speaker 212*a* is shown as being positioned near the top of the front face 234. Upwardly facing rear surround speaker 214*a* is shown as being embedded adjacent a top surface 236 of transverse member 14*a*. Surround speaker 214*a* is shown as being positioned within transverse member 14 near a rear end of upper surface 236 of member 14*a*.

The structure and positioning and tuning of speakers 212a, 214a is strategically useful to the sound and fidelity of the speakers as the speakers are covered by one or more covers 241, 243.

Such placement is advantageous as it positions speaker 212a, 214a well above the floor on which the couch assembly 200 is placed, while also positioning rear surround speaker 214a near to, and perhaps behind the ears of a user seated on couch 200. Such positioning is also advantageous as it helps to protect speakers 212a and 214a from damage that might otherwise occur if the speakers were near the floor.

For example, positioning speakers 212a, 214a closer to the floor surface might result in a user inadvertently kicking the speaker, thereby damaging it. Positioning of surround speaker 214a at or near a rear end of the upper surface 236 of transverse member 14 is also advantageous as a user is less likely to spill a drink at this location or even position an arm or hand over the speaker, damaging the speaker and/or muffling sound generated thereby.

The interior furniture cavities of the base and transverse members of the present invention are utilized to potentially enhance the audio quality by resonance and positioning. The volume of the transverse member itself (or an enclosure within such space) may be used as the speaker enclosure, creating the desired resonance. Speakers are tuned for speaker output through the fabric covers covering the frames of the speakers, which is highly useful.

Removable, outer cover 243 may selectively be mounted on transverse member frame 270 (and the at least partially surrounding foam 272) and/or on interior cover 241 through the use of a two part attachment assembly, such as VELCRO, or other two part attachment assembly.

The inner and outer covers 241, 243 may be comprised of a variety of different upholstery fabrics, such fabrics comprising fibers, such as polyester fibers, or other fibers. The fabric of covers 241, 243 may be woven or non-woven. Typically, such fabrics are not acoustically transparent, e.g., they affect sound waves at one or more frequencies from 20 Hz to 20 kHz by attenuating (or boosting) any such frequency more than 3 dB (i.e., ±more than 3 dB). For example, such upholstery fabrics are relatively heavy fabrics, which may typically attenuate particularly the higher sound frequencies at more than 3 dB. As a result of such attenuation by the fabric, the sound generated at any such speaker hidden behind the upholstery fabric may be tuned to increase the volume of the attenuated frequencies to compensate for the attenuation that occurs as the sound passes through the fabric. For example, if the fabric attenuates sounds at 2 kHz by 6 dB, the tuning may increase the volume of sounds at 2 kHz by 6 dB to compensate. There may typically be several frequencies which may be boosted to compensate for such fabric induced attenuation.

Examples of the upholstery materials for the inner and/or outer cover 243 include polyester, chenille, tweed, linen, velvet, leather, polyester linen, cotton, cotton blend, denim, twill, faux fur, leather, and the like, for example. Such materials can also be used for outer covers for base member 12a, and all of which are examples of upholstery fabrics, although a variety of different fabrics may be employed.

Examples of weights of upholstery fabrics that can be used as interior covers and/or outer covers for the bases and/or transverse members of the present invention include, for example: fabrics having weights in a range of approximately 50 grams per square meter (GSM) to approximately 1500 grams per square meter (GSM), for example, such as approximately 100 GSM to approximately 1000 GSM, or such as approximately 190 GSM to approximately 800 GSM, although a variety of different interior and exterior fabrics may be employed. The speakers of the present invention are adjusted and tuned in order to emit sound through such fabrics in a manner that attenuation due to such fabric is compensated for.

In one embodiment, the inner cover of base 12a and/or the inner cover of transverse member 14a are comprised of a thin cover comprising an approximately 90 percent polyester and approximately 10 percent cotton blend, for example.

In one embodiment, with respect to tuning the speakers through the upholstery fabric of covers 241, 243 through which the sound is emitted, the upholstery fabric used in transverse member 14a is in one embodiment not an acoustically transparent fabric, but rather is upholstery fabric configured to be employed in upholstery, chairs, couches and other furniture.

For this reason, the front speakers and the surround speakers can be tuned to accommodate for the dynamic that the sound generated from such speakers is required to pass through the upholstery fabric.

For example, relatively higher frequencies (e.g., 200 Hz or more, 400 Hz or more, 800 Hz or more, 2 kHz or more, 4 kHz or more, etc.) generated from such speakers are often affected by passage through such fabric, and may have some degree of attenuation associated therewith, which attenuation may increase with increasing frequency. As a result of this, the speaker can be tuned by boosting such higher frequencies before they pass through the fabric so that once the speaker sound passes through the fabric, it is approximately at a volume as it is intended to be heard and received by a listener (e.g., so that the overall tuned output is within ±3 dB of the un-attenuated "target" value).

As mentioned, examples of the upholstery materials for the inner and/or outer cover 243 include chenille, tweed, linen, velvets, leather, polyester linen, cotton, cotton blend, denim and others used in furniture upholstery, for example. Tuning of the frequencies of the speakers to provide the sound through such upholstery fabrics is a unique and novel aspect of the present invention.

Such positioning hides speakers 212a and 214a within transverse member 14 so as to not be readily seen by a user or other person, but also allows a high quality sound from the speakers.

Such hiding of the speakers is particularly advantageous in at least some embodiments. For example, many users dislike the appearance of speakers within a room in locations such as a bookshelf, or on stands located some distance from a couch, which is often typical.

The present configurations are advantageous in that they allow complete hiding of the speakers, sometimes even all of the speakers associated with a surround sound system.

Each of speakers 212a and/or 214a may be mounted within transverse member 14 in any manner desired. For example, they may each include a dedicated housing enclosure similar to that described above, with respect to the subwoofer assembly. Such a housing enclosure could be attached to the frame assembly within transverse member 14a. In another embodiment, the speaker driver associated with speakers 212a and/or 214a can simply be mounted to frame members internally disposed within transverse member 14a, employing the cavity associated with transverse member 14a for one or both of speakers 212a and/or 214a.

Figure 9D:
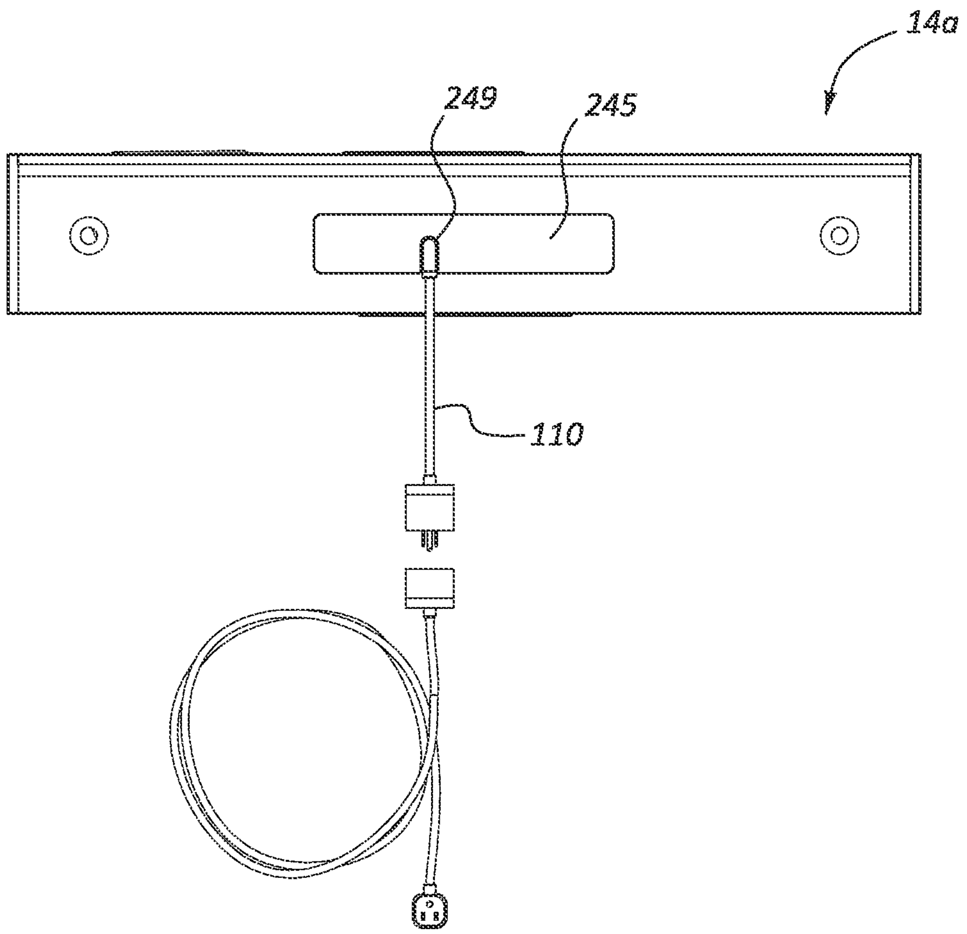

With regard to FIG. 9D, a hole cover 245 may be employed as a plug to cover electronics of the interior systems within the transverse member 14a as shown in FIG. 9D. For example, FIG. 9C illustrates hole or opening 247 in a bottom face of transverse member 14*a*, through which cord 110 passes. As shown in FIG. 9D, hole 247 is shown covered by hole covering 245. A relatively small slot 249 may be provided through covering 245, to permit cord 110 to extend therethrough.

As shown in FIG. 9A, wiring 218*a*, 218*b* provides power and/or signal to embedded speakers 212*a* and/or 214*b* as appropriate. Wire 218*a* provides at least part of an electrical connection between an amplifier 217 (see FIG. 15), which may be mounted in base 12*a* on, near, or within housing 228 for example, and front speaker 212*a*. It will be appreciated that cable or wiring 218*a-b* may be provided in a plurality of sections to preserve the modular nature of furniture assembly 200. For example, coupling between such wiring sections could be provided at or near the hub 100 disposed within transverse member 14.

For example, it will be appreciated that a first section of such wiring or cabling may extend from a base member 12*a* and amplifier 217 to a location of the base member 12*a* that is near or adjacent to the coupler 15 and/or hub 100.

This first section of wiring or cabling could be terminated at this location with an appropriate RCA or other type coupling jack. The transverse member 14*a* may similarly include another section of wiring 218*a* which extends from speaker 212*a* through transverse member 14 to another jack coupling at or near hub 100. Once the modular furniture assembly 200 has been assembled with transverse member 14*a* positioned adjacent to and coupled to base member 12*a*, a coupling or cabling can be extended between two such jacks (bridging wiring within transverse member 14*a* and base 12*a*), providing an effective, wired connection from amplifier 217 to speaker 212*a*.

A similar multi-section wiring or cabling configuration can similarly be provided between rear, surround speaker 214*a* and a jack at or near the hub 100 and from the amplifier 217 to a location at or near the hub 100, with a bridging coupling or wiring between wiring in base 12*a* with wiring in the transverse member 14*a*.

In another configuration, such internal wiring spanning the base members and the transverse members may not necessarily be required. For example, signals could be transmitted to the speakers from receiver 217 (e.g., an audio or home theater receiver) and/or transmitter 224 through wireless transmission.

In such embodiments, the signal may be transmitted wirelessly to speaker 212*a* and/or speaker 214*a*. In such embodiments, it may still be necessary to provide power to speaker 212*a* and/or 214*a*, e.g., through use of hub 100 Such wireless transmission of signals may eliminate the need for any wiring or electrical coupling for power or signals from base 12*a* to transverse member 14*a*, at least for speakers 212*a* and 214*a*.

Where jumper connections are desired for power and/or signal transmission, such may be achieved through any suitable configuration. For example, quick connect ports (e.g., RCA, banana plugs, or other) for such speaker wire or cable may be located on a bottom side of transverse member 14*a* (FIG. 9C) for connecting a jumper cable, for example, from the transverse member 14*a* to the base member 12*a*.

In one embodiment, an induction charger 172 (such as that in FIG. 6) is mounted on an upper surface of the frame 270 of the transverse member 14*a*, embedded within the foam 272 on top of the frame 270, for example, and located below the inner cover 241 (and possibly below a portion of foam) mounted on the frame 270. Induction charger 172 is electrically coupled to an interior outlet of the electrical hub 100.

Induction charger 172 can be mounted in an upper middle portion 278 of transverse member frame 270, for example, between the speakers 212*a*-214*a* and above the electrical hub 100. Charger 172 may be in the same top surface 236 as surround speaker 214*a*, positioned forwardly relative to speaker 214*a*, e.g., behind speaker 212*a* positioned in the front surface 234 of transverse member 14*a*.

Figure 10:
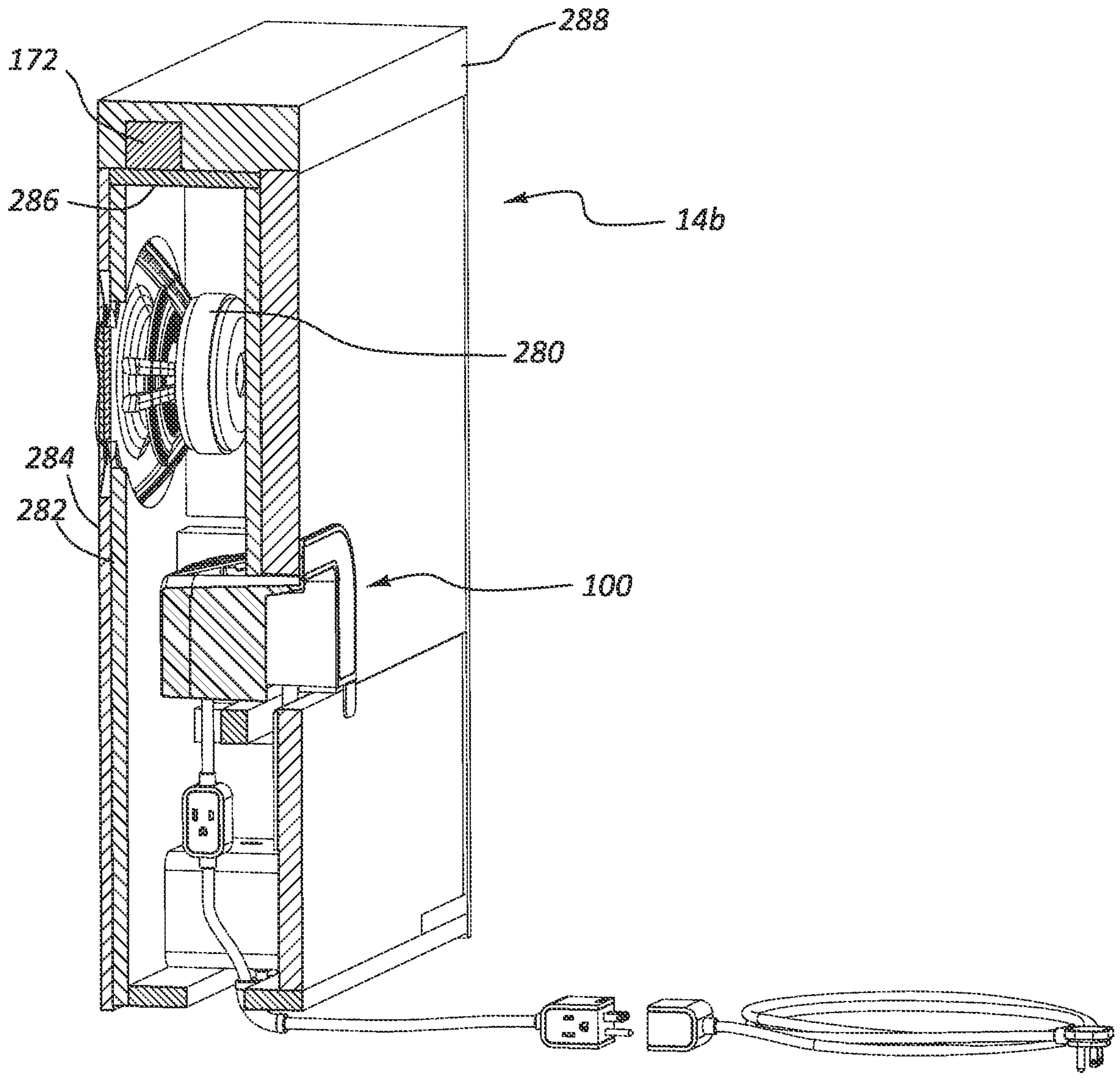
FIG. 10 shows a cutaway view of an alternative speaker-containing transverse member, wherein the speaker is in a different location from the transverse member of FIGS. 9A-9D.
Figure 11:
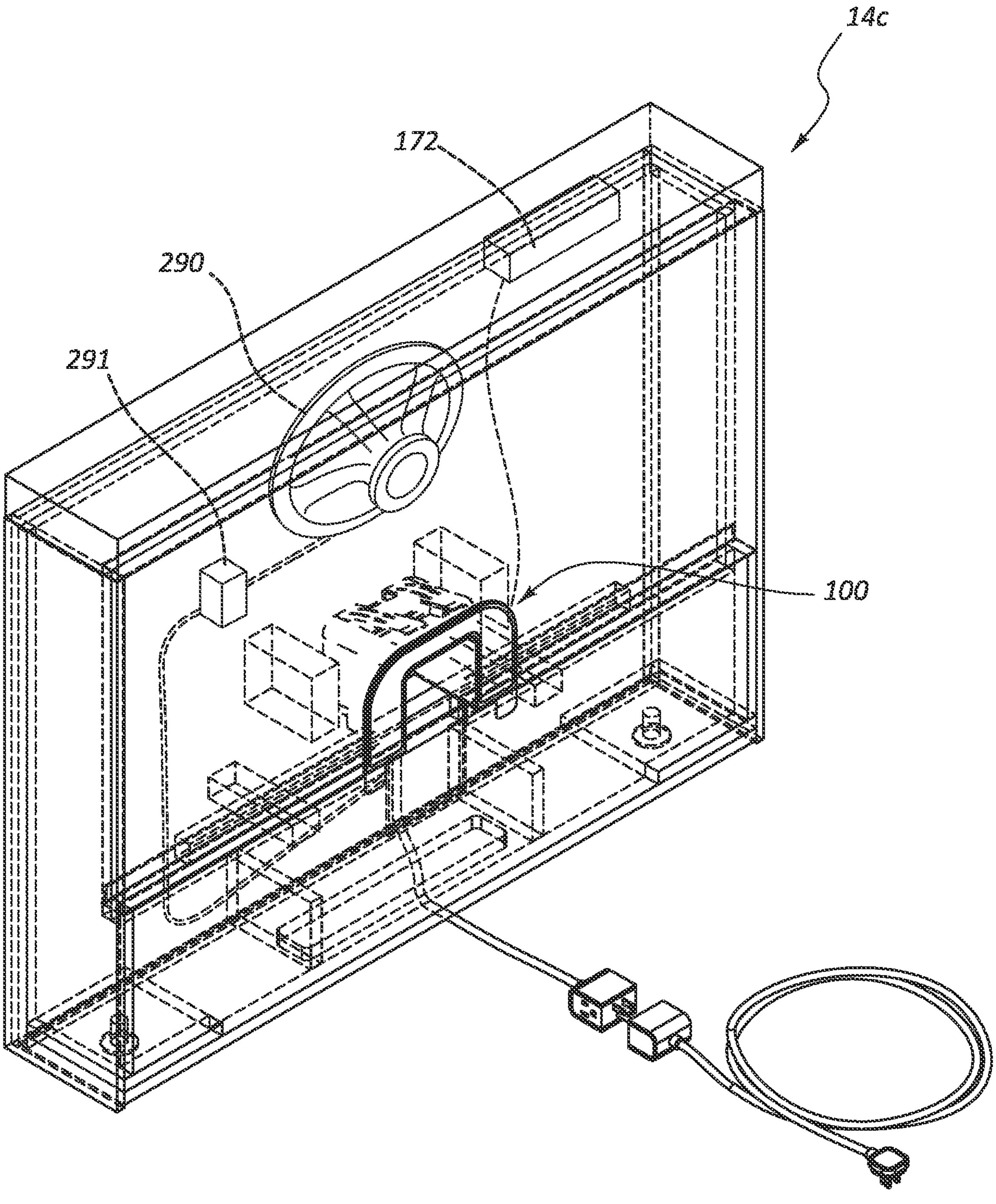
FIGS. 11-12 show alternate transverse members with alternate speaker locations.
Figure 12:
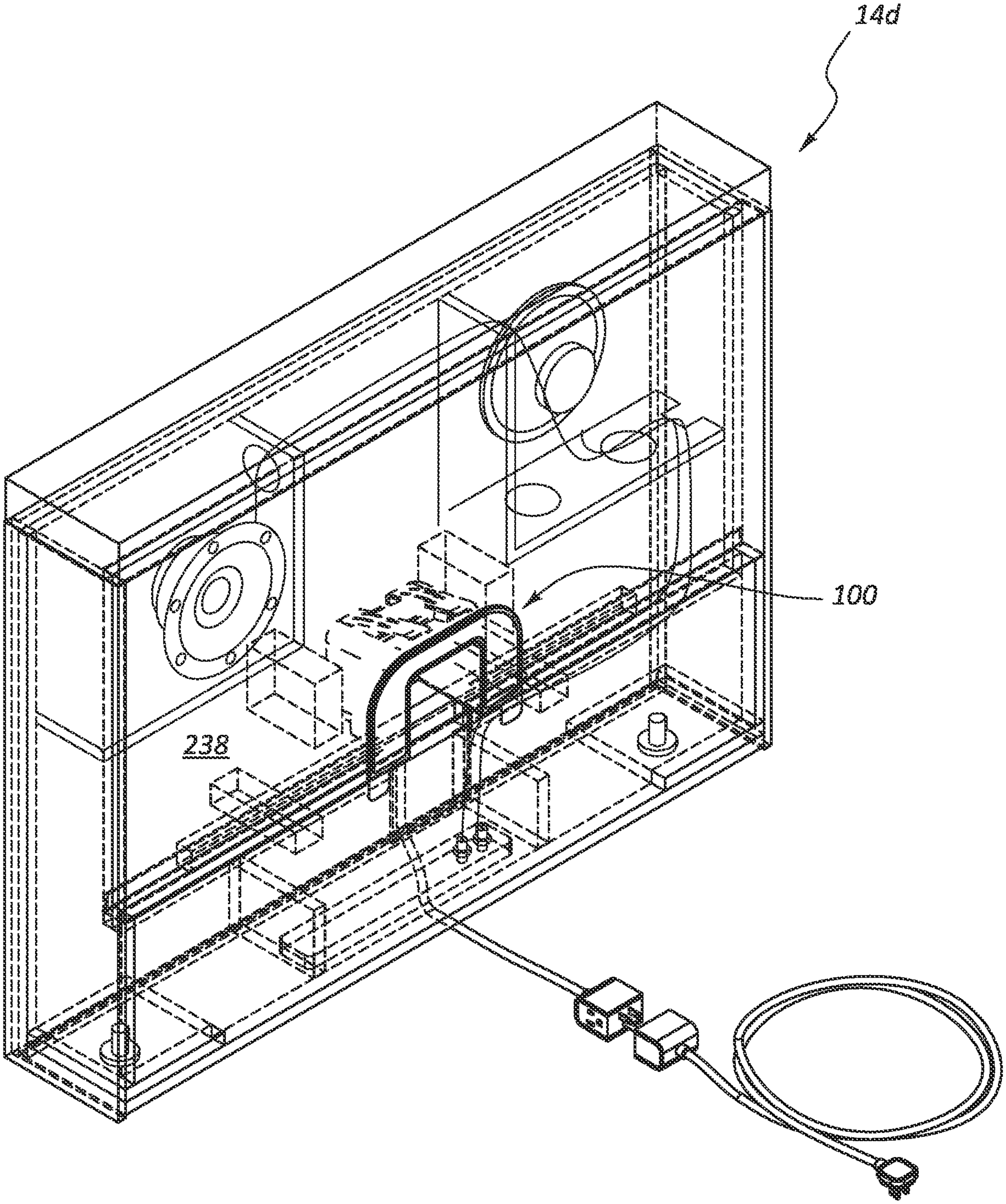

FIGS. 10-12 show alternate transverse members with speaker assemblies of the present invention. FIGS. 10, 11 and 12 illustrate differently configured transverse members 14*b*-14*d* in which the speakers embedded therein are differently positioned.

FIG. 10 shows a cutaway view of an alternative speaker-containing transverse member 14*b*, wherein the speaker 280 is pointing horizontally and away from the hub 100. Speaker 280 is coupled to the frame 282 (e.g., wood, plywood, fiberboard) of transverse member 14*a*, such that the speaker cone is adjacent a hole in the frame 282 and a corresponding hole in the foam cushioning material 284 adjacent the frame 282.

An induction charger 172 shown in FIG. 10 is mounted on an upper panel 286 of the frame 282 of the transverse member 14*b*, embedded within (or, optionally, adjacent) the cushioning material 288 on top of the upper panel 286 of the frame 284 of transverse member 14*b*, for example.

FIGS. 11-12 also show different speaker orientations for the transverse member speakers. It will thus be appreciated that numerous positioning possibilities are possible for positioning and orienting the speakers within transverse members 14*c-d*.

FIG. 11 shows another alternative which may include perhaps only a single speaker 290 within transverse member 14*c* which may be oriented and positioned in any desired orientation and position. Speaker 290 is electrically coupled to an amplifier 291 within the frame of the transverse member 14*c*. Thus, in some embodiments each speaker in each transverse member has its own associated amplifier mounted within the respective transverse member. In another embodiment, a single amplifier 217 for each speaker of the speaker system (all transverse members and base(s) is mounted within or on the housing 228 within base 12*a*. Where a dedicated amplifier 291 is provided for each speaker or speaker channel, the signal is transmitted through wiring as shown in FIG. 11 to amplifier 291 (and eventually speaker 290), or alternatively the signal is transmitted wirelessly, and power for amplifier 291 can be provided from hub 100 through appropriate wiring. Amplifier 291 sends an amplified signal to speaker 290.

An induction charger 172 is mounted on the upper portion of the frame of transverse member 14*c* in FIG. 11.

The speakers of FIG. 12 may be wireless speakers so as to receive signals through wireless transmission as described herein from audio receiver 217 and/or transmitter 224. Power for the speakers of FIG. 12 may be provided through a connection with hub 100.

It will thus be appreciated from FIGS. 9A-12 that numerous speaker placement and a number of speaker options are possible. For example, a stereo set up could be provided in which only left and right speakers are provided or a system including left and right speakers and a subwoofer, for example, a 2.1 system. While a single speaker for each channel (front left, front right, surround left, surround right) is principally shown and described, it will be appreciated that more than one speaker can be provided for any given channel (e.g., for front left, front right, left surround, right surround, subwoofer, center, etc.).

Figure 13A:
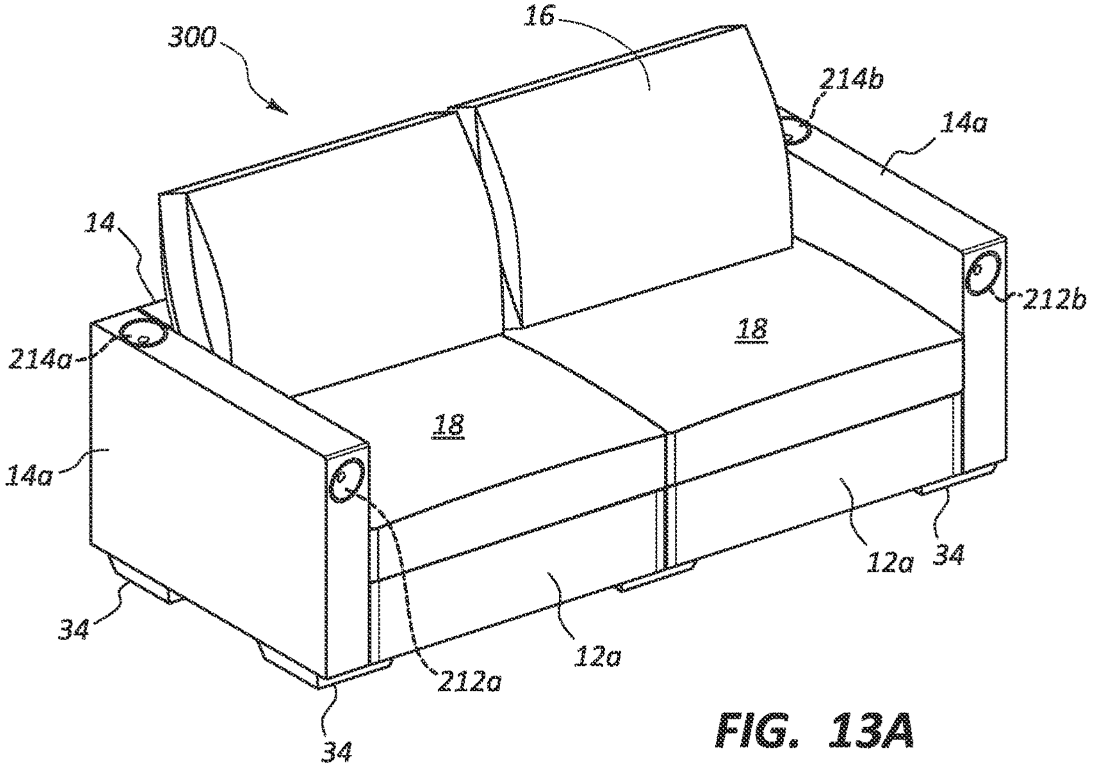
FIGS. 13A-B are perspective views of a sofa similar to that of FIG. 1*a* with audio speakers in the transverse members (armrests) thereof and subwoofer speakers in the bases thereof to form a surround sound speaker system, the speakers reflected in phantom lines.
Figure 13B:
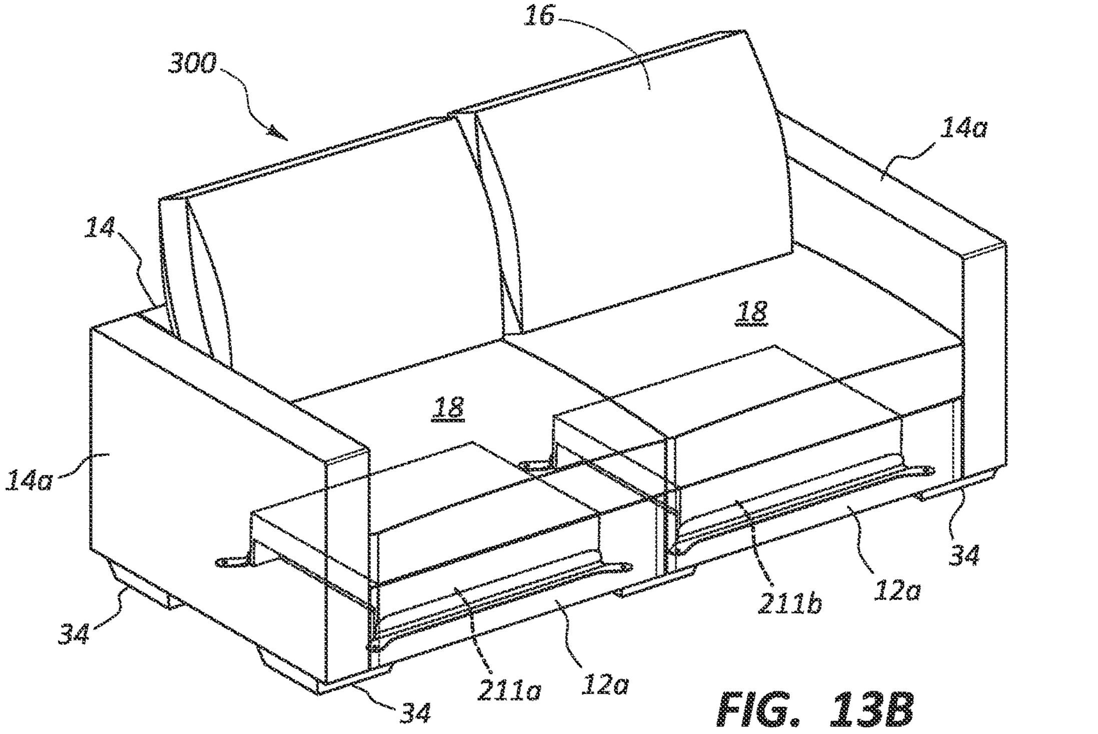
Figure 14:
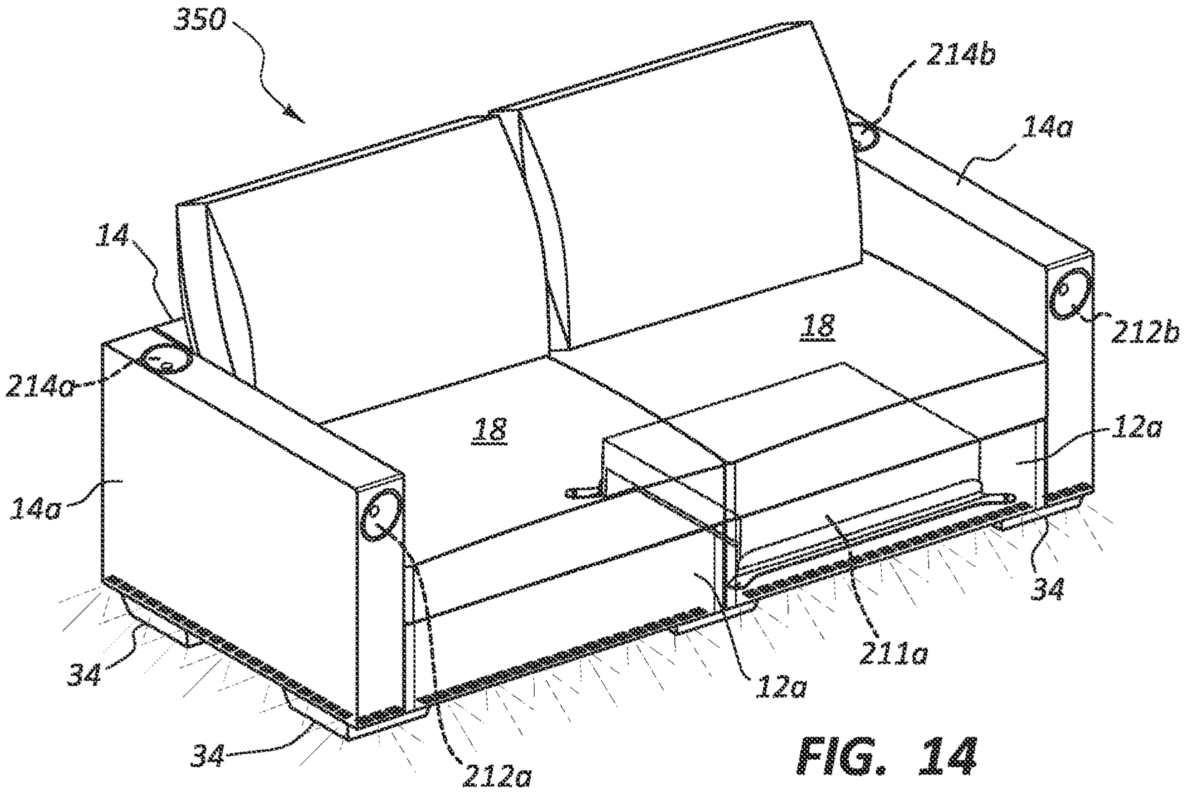
FIG. 14 shows a sofa similar to that of FIGS. 13A-13B. The sofa has night light motion sensors.

FIGS. 13A-14: Modular Sofas with Speakers

FIGS. 13A-13B are perspective views of a modular furniture system 300 of the present invention using the disclosure herein to form a sofa with audio speakers in the transverse members 14*a* (armrests) thereof and subwoofer speakers in the bases 12*a* thereof to form a surround sound speaker furniture system 300, the speakers reflected in phantom lines.

Front speakers 212*a-b* and rear, upwardly facing surround speakers 214*a-b* are each mounted in a respective transverse members 14*a*. As shown in FIG. 1B, surround speakers 214*a* and 214*b* are shown as being oriented upwards so that the sound directed therefrom may be directed towards the ceiling and reflected off the ceiling, the reflected sound potentially having the advantages of reflected sound, which may, in some embodiments, include improving the sound quality (e.g., creating a diffuse, surround sound).

Each of transverse member speakers 212*a*, 212*b*, 214*a*, 214*b* are positioned underneath the upholstery fabric of the covers 241, 243 (FIGS. 9A-9C) of the respective transverse member 14*a* in which the speaker is positioned. Each of these speakers may be tuned so that output from a given speaker accounts for transmission of the sound waves through the upholstery fabric associated with transverse member 14*a* before reaching the user seated on sofa 300.

Positioning of speakers 212*a*, 212*b*, 214*a*, and 214*b* is also advantageous as the speakers are positioned in transverse members 14*a* in a manner such that a user seated on sofa 300 typically will not obstruct sound emanating from any of these speakers.

The particular positioning and orientation of the speakers shown in FIGS. 13A-13B may advantageously create a realistic surround sound environment in which sound from front speakers 212*a* and 212*b* is intentionally reflected off a front surface, such as a front wall, television or similar structure, disposed in front of a seated viewer. Sound from rear surround speakers 214*a* and 214*b* is similarly directed upwardly toward the ceiling so as to be reflected back down toward a seated viewer sitting on sofa 300, the front and/or ceiling reflected sound potentially having the advantages of reflected sound, which may, in some embodiments, include improving the sound quality, creating a surround sound experience.

The speakers embedded in base member 12*a* and/or transverse member 14*a* can be switched or swapped as a user wishes to reconfigure the modular furniture assembly of sofa 300. For example, if a user wished to reconfigure sofa 300 so as to include more or less base members and/or more or less transverse members 14*a*, the user can simply disassemble that part of sofa 300 and include additional base members 12*a* and/or transverse members 14*a* (or remove such), as desired.

Because the speakers are positioned within such modular furniture assembly components, this provides great flexibility to a user in where the speakers can be positioned within a built furniture assembly. For example, any of the furniture assemblies shown in any of the applications already incorporated by reference can be modified to swap out any of the bases or transverse members with bases 12*a* including a subwoofer, or transverse members 14*a* including speakers, or any combination thereof. Such modularity of the furniture system thus allows the user extreme flexibility in where the speakers are provided, hidden within the furniture assembly. The modularity of the subwoofer assembly in base 12*a* can also allow a user to remove the assembly from one base, and install it in another base, if desired.

For example, the modularity of the system allows a user to place base members 12*a* and transverse members 14*a* in any place desired. Some base members 12 and some transverse members 14 may be provided which do not include any speakers positioned therein, allowing the user to use these component pieces in configuring any desired modular furniture assembly configuration they desire.

In order for an end user to set up sofa 300 (or system 200 or system 350), no tools are required because the speakers are already mounted within respective base members and transverse members, and wiring can be connected without the use of complicated tools. Therefore, the sofa 300 with its electronic assembly members is highly advantageous, efficient and useful.

FIG. 14 shows a furniture system 350 that is similar to sofa 300 of FIGS. 13A-13B. The sofa 350 has night light motion sensors (i.e., lighting which is motion activated) mounted on the underside of the base 12*a* and/or transverse members 14*a* thereof.

FIG. 14 thus illustrates another embodiment of a modular audio enhanced furniture system in the form of sofa 350 which includes motion activated night lights. For example, LEDs or other lights may be embedded or otherwise provided on or within the bottoms surfaces of the frames of base members 12*a* and/or transverse members 14*a* so as to illuminate all or a portion of a perimeter of sofa 350 when desired by a user. For example, such lighting may be motion activated so as to illuminate when a user approaches the sofa within any given distance.

Power for such lights may be provided through any of the hubs 100 associated with transverse members 14*a* as described herein. Such a configuration may provide a night light system which may illuminate an area around sofa 350 in an otherwise dark room, aiding a user in navigating through the room at night or otherwise.

Such lighting may also be desired in other environments where a user is using sofa 350, for example, while watching a movie or other program on a television or other display in a dimly lit room.

Modular furniture assembly 350 is highly useful in a variety of different settings and includes electronic devices embedded in leisure seating such as in upholstery couches, modular seating, sectionals and the furniture known as Sectionals. While illustrated with audio components in the furniture assembly in addition to the motion activated night light system, it will be appreciated that a furniture system without audio components could include the motion activated night light system.

FIG. 14 illustrates an embodiment that might be considered as a 4.1 or 4.2 speaker system, including a front left, a front right, a left surround, and a right surround speaker with a subwoofer speaker 210*a* embedded in at least one of the bases 12*a*. Where one subwoofer speaker 210*a* is included (thus one base 12*a*, and one regular base 12), a 4.1 system results. If both bases are bases 12*a* including subwoofer speakers 210*a*, a 4.2 system can result (e.g., particularly where the subwoofers produce independent sounds). The two subwoofer speakers may produce the same, or different sounds (e.g., 1 or 2 channels).

While no dedicated center channel speaker is illustrated in FIG. 14, it will be appreciated that a virtual center speaker can be provided through sound signals sent to front speakers 212*a* and 212*b* (i.e., a virtual center channel can be mimicked by the stereo of speakers 212*a* and 212*b*). In another embodiment, a dedicated center channel speaker can be positioned under or above the television, behind a perforated screen, or incorporated into a television, or other display device. A center rear channel can be similarly imitated using right and left surround speakers 214*a* and 214*b*, or mounted on a rear wall, as desired, to create 5.1 or 6.1 systems. 7.1 systems or other configurations (e.g., Dolby Atmos) could similarly be provided for.

As shown, sofa 350 includes speakers or other audio components embedded in leisure seating which includes upholstery couches, modular seating, etc. Sofa 350 provides excellent stereo or surround quality sound and provides a high fidelity surround sound experience.

The speakers are hidden from the view of the user and customers within the wooden framing portions of the base 12*a* and/or transverse member 14*a* and can be hidden under covers surrounding the wooden framing.

Wiring Diagram

Figure 15:
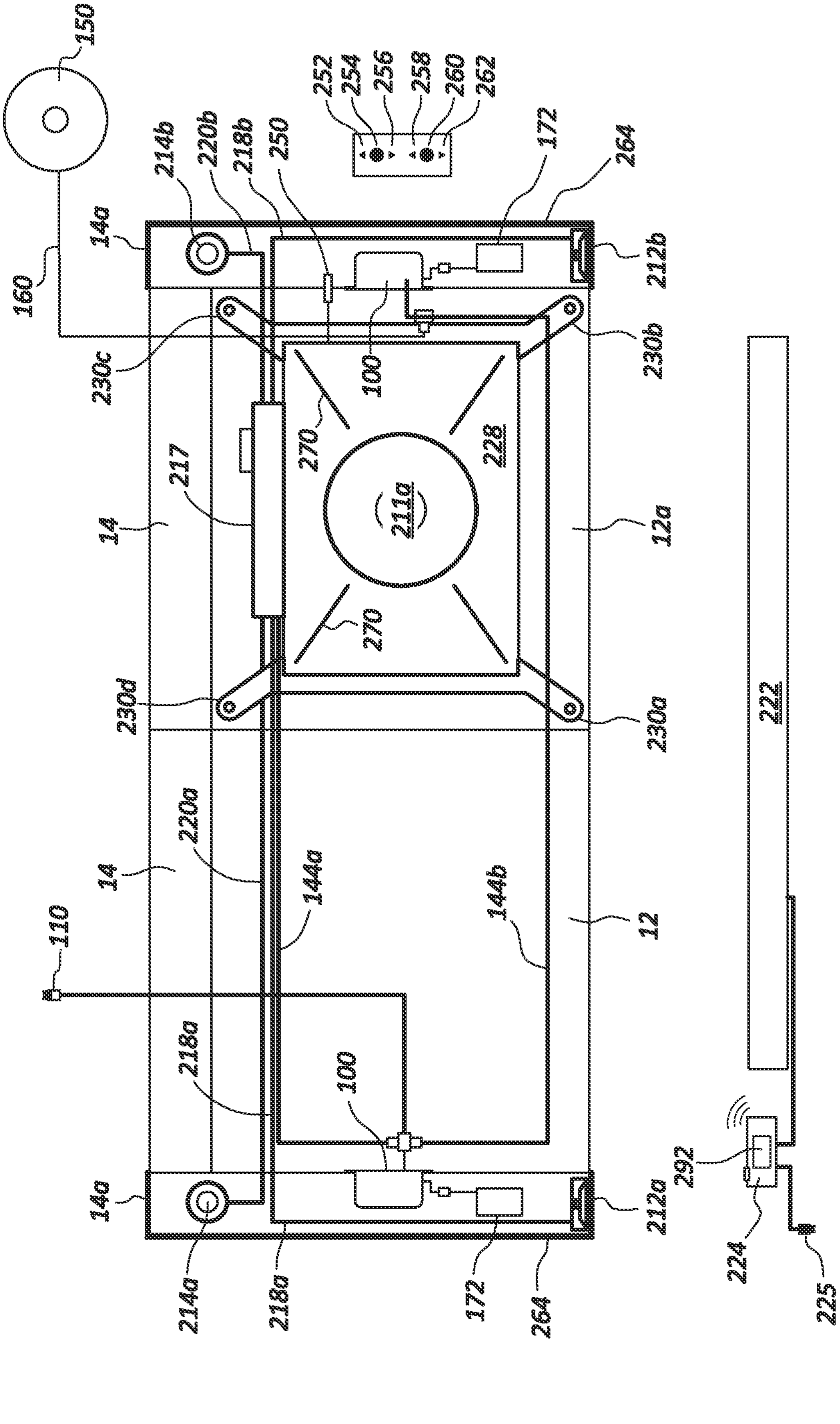
FIG. 15 shows an example of a wiring diagram for the sofa of FIG. 14.

FIG. 15 shows an example of a wiring diagram to be used in conjunction with the furniture system 300 or 350 in the form of the sofa of FIGS. 13A-13B or FIG. 14. A table identifying certain elements of the wiring diagram of FIG. 15 is shown below.

FIG. 15 Reference Numbers and Components

| Component | Reference Number |
|---|---|
| Base with subwoofer | 12a |
| Regular base or recliner seat | 12 |
| Transverse member with front and surround speaker | 14a |
| Regular transverse member | 14 |
| Electrical Hub | 100 |
| Hub power cord (e.g., 120 volt) | 110 |
| Power cord for amplifier/receiver 217 | 144a |
| Power cord tether for electrical Hub | 144b |
| Floor lamp | 150 |
| Power cord for floor lamp, connected to hub | 160 |
| Qi induction charger | 172 |
| Subwoofer driver | 211a |
| Front right speaker | 212a |
| Front left speaker | 212b |
| Right surround speaker | 214a |
| Left surround speaker | 214b |
| Multi-channel amplifier and/or audio receiver | 217 |
| Front right speaker wire/cable | 218a |
| Front Left speaker wire/cable | 218b |
| Right surround speaker wire/cable | 220a |
| Left surround speaker wire/cable | 220b |
| TV or other display | 222 |
| Wireless transmitter (e.g., 5.1) | 224 |
| Power cord into wall | 225 |
| Subwoofer enclosure | 228 |
| Mounting brackets | 230a-b |
| Tethered Remote | 250 |
| Volume up function on remote | 252 |
| Mute function on remote | 254 |
| Volume down function on remote | 256 |
| Bass volume up function on remote | 258 |
| Bass mute function on remote | 260 |
| Bass volume down function on remote | 262 |
| Low power LED nightlight from Hub | 264 |

FIG. 15 illustrates an exemplary wiring diagram for a modular furniture assembly, including a surround sound system positioned therein, such as that shown in FIGS. 1A-1B, 13A-13B, and 14. As shown in FIG. 15, wiring may be provided within the modular furniture assembly to provide signals and/or power to each of speakers 212*a*, 212*b*, 214*a* and 214*b*.

In the illustrated configuration, amplifier 217 is disposed within base member 12*a*. Amplifier 217 may be a multi-channel amplifier and/or an audio receiver including such an amplifier and is illustrated as being disposed within base member 12*a*, for example, adjacent to subwoofer 210*a*, e.g., mounted on or within housing 228.

As further shown in FIG. 15, wiring 218*a* and 218*b* may provide audio signals from amplifier 217 to front right speaker 212*a* and front left speaker 212*b*. In the illustrated configuration, the signal sent through wiring 218*a* and 218*b* is already amplified as shown.

In an alternative configuration, a signal may be sent from an audio receiver 217 to front right and front left speakers 212*a* in an 212*b* in an unamplified configuration where amplification occurs at the speaker 212*a* or 212*b*. Unamplified signals can be sent through a wired or wireless connection, as desired.

FIG. 15 further shows wiring 220*a* and 220*b* extending from amplifier 217 to right surround speaker 214*a* and wiring 220*b* extending from amplifier 217 to left surround speaker 214*b*. Power for amplifier 217 is provided through electrical connections shown in FIG. 15, for example. For example, power from plug 110 (FIG. 5) may connect to hub 100 and amplifier 217 is in turn plugged into an outlet associated with hub 100, providing power thereto.

In one embodiment, amplifier 217 amplifies at least the subwoofer speaker. In another embodiment, amplifier 217 amplifies the subwoofer speaker and the other speakers, e.g., the transverse member speakers. In another embodiment, the subwoofer may include its own internal amplifier, and amplifier 217 may amplify the other speakers (e.g., speakers 212*a*, 212*b*, 214*a*, 214*b*) in the furniture assembly. In yet another embodiment, amplifier 217 amplifies the subwoofer speaker and each of transverse member speakers has its own amplifier associated with that speaker.

FIG. 15 shows how additional components may also be powered by hub 100 and/or additional hubs that are present within any of transverse members 14/14*a*. For example, FIG. 15 shows power being provided from a hub in the right transverse member 14*a* to the qi (induction) charger 172.

Figure 15A:
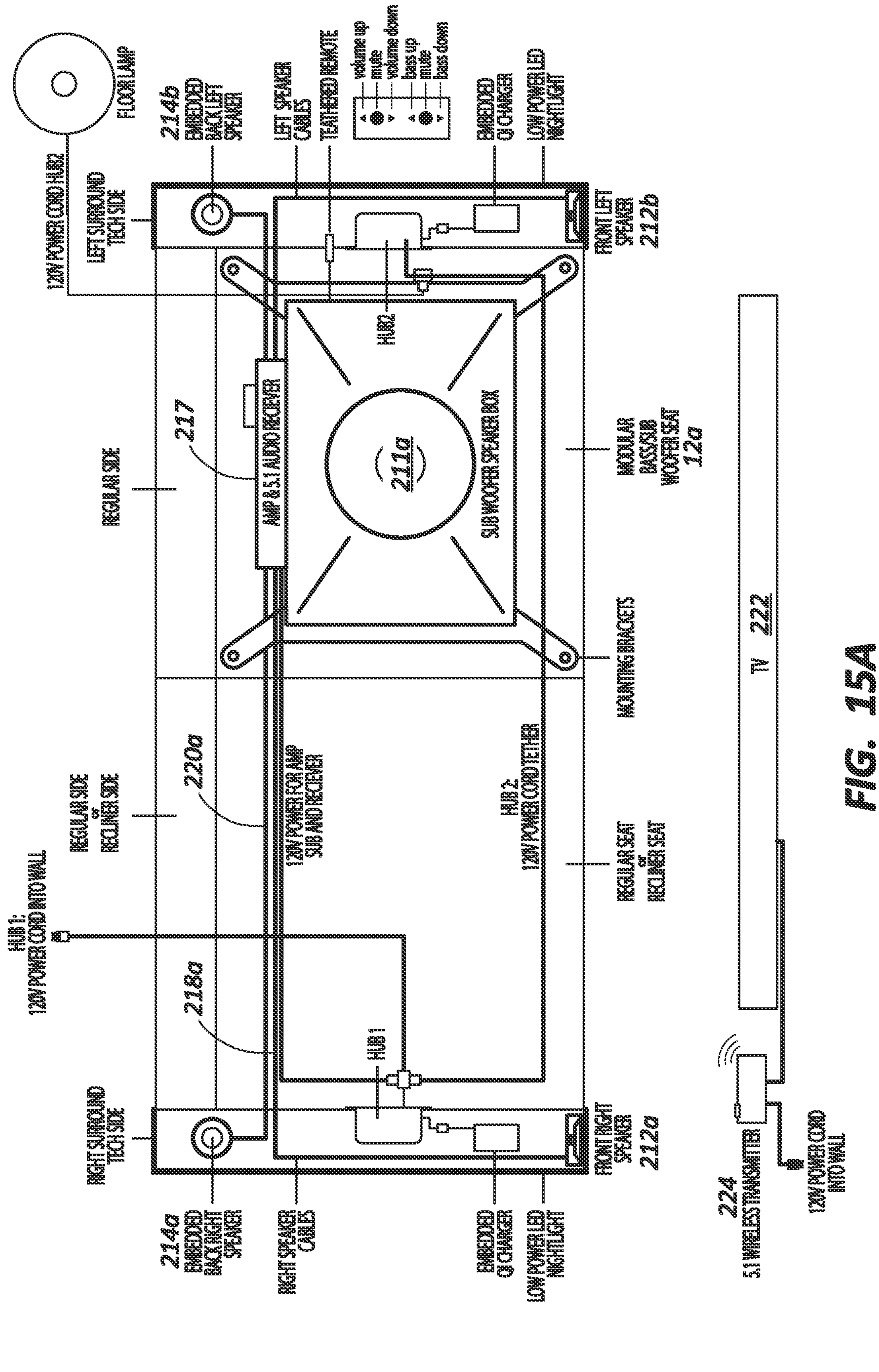
FIG. 15A is another version of the wiring diagram of FIG. 15 with text descriptions for certain elements identified in the wiring diagram.

FIG. 15 further shows power from a second hub in left transverse member 14*a* to another qi charger, as well as to a floor lamp 150. Additional components can be plugged into or otherwise powered by either of such hubs. For example, FIGS. 15-15A show a tethered remote 250 that may be used to provide control over volume (252, 256), the ability to mute (254), the ability to adjust specific frequencies, for example, base up (258) or base down (262), or bass mute (260).

As shown in FIG. 15, one or more of base members 12 may further include a recliner seat whereby power for such recliner could be provided by any of the shown hubs.

FIG. 15 further shows a television 222 or other display. Such a display is positioned or mounted on a front wall in front of sofa 300, 350, allowing a user seated on the sofa to watch television while listening to surround sound provided through the speakers associated with sofa 300 or 350.

In one embodiment, a transmitter 224 is provided at the TV 222, such as a wireless controller transmitting signals for audio through a wireless transmitter to the speaker system of sofa 300 or 350.

For example, as further shown in FIG. 15, it is possible to provide the signals to amplifier or receiver 217 (or wireless speakers 212*a*, 212*b*, 214*a*, 214*b* themselves) of sofa 300 or 350 through a wireless transmitter 224, for example, shown associated with television 222. Such a wireless transmitter 224 is plugged into the wall at 225 so as to be powered therefrom. Signals from wireless transmitter 224 are wirelessly transmitted to amplifier and/or audio receiver 217 in sofa 300 or 350. Wireless transmission of such audio signals and/or control signals can be through Blue-tooth, WiFi, IR, Wireless Speaker and Audio Technology (WISA) or other mechanisms. Receiver 217 can be used to receive communication from wireless controller/transmitter 224, or a smart phone or tablet app, or the like.

In one embodiment, a wired connection can be provided between a transmitter component 224, and amplifier or audio receiver 217, although wireless transmission as illustrated may be advantageous as no wire or cord is thus required between the location of transmitter 224 and amplifier or audio receiver 217 disposed within sofa 300 or 350.

The hubs 100 provide power to the electronic furniture assembly system of sofa 300 or 350, as well as all of the speakers, components and electronic devices associated with sofa 300 or 350.

As a result of the configuration of sofa 300 or 350, the various transverse members, bases and their associated speakers and electronic components can be removed and upgraded as other speaker systems or electronic components are available.

In one embodiment, the furniture system of the present invention also includes an audio receiver/sound bar and a bridge electrically coupled to the television in order to communicate sound to the speakers of the sofa 300 or 350.

The speakers mounted within the base and transverse member, in addition to providing invisibility from a user/customer, also provides an opportunity for high quality sound. The base and transverse member each provide a large enclosure volume within which the speaker sound can resonate to provide high quality sound while using no additional footprint other than that of the sofa itself.

As shown in FIG. 15, base 12*a* may further comprise support beams within subwoofer enclosure housing 228, the support beams being reflected at reference numbers 270 in FIG. 15. Support beams are mounted between the upper and lower portions of the enclosure housing 228 so as to provide support within a cavity 226 to prevent any damage to speaker 210*a*. In one embodiment, a receiver or amplifier 217 is mounted on or within the subwoofer housing 228 of base 12*a*, which has power in and amplified signal outputs.

FIG. 15A is another example of the wiring diagram of FIG. 15 with text descriptions for certain elements identified it in the wiring diagram.

Figure 16:
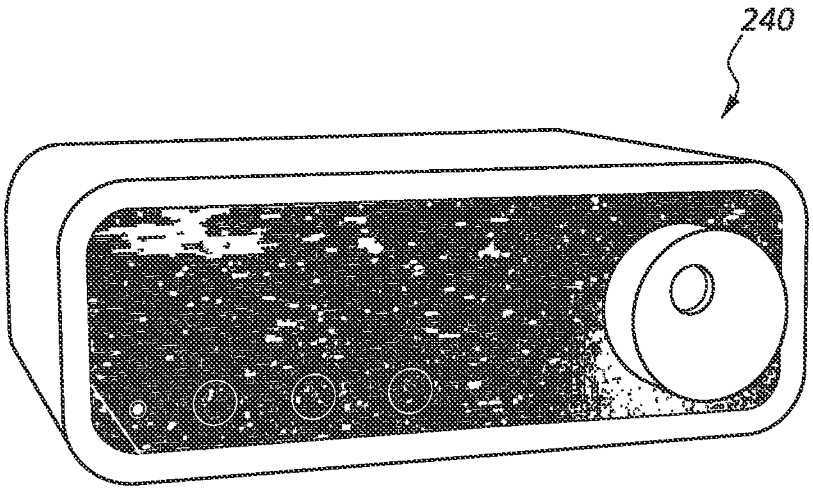
FIG. 16 is a perspective view of a controller or transmitter of the present invention.

FIG. 16: Controllers for Controlling Speakers and Other Components

FIG. 16 is a perspective view of a controller 240 of the present invention. Any of various control mechanisms and components can be provided with the surround sound systems described herein. FIG. 16 shows an exemplary control component 240. Such a component may include one or more knobs, dials, or other controls that a user may use to control various aspects of the sound or other environment.

For example, a user may control overall sound volume, sound volume of one or more of the speakers, frequency boosting (or attenuation) of one of more frequency bands associated with any of the speakers, or other controls that a user may desire to manipulate. Such a control component 240 may transmit signals or instructions through an electrical wired connection or wirelessly from a location that is remote from sofa 300 or 350, for example, adjacent television 222 or elsewhere.

A user may be able to pick up and move such a control component 240 anywhere desired. For example, they may pick it up and take it over to the couch where it may left, if desired, so as to allow control at that point.

In other embodiments, control of any of the desired parameters may be provided through a cellular phone app (smart phone app) or other software application that can be provided in any desired interface. For example, in the smartphone portable device, tablet, or other device accessible to the user which may wirelessly transmit control signals to the receiver 217 or other component, then implement any desired changes to parameters as instructed by a user. Receiver 217 may be capable of receiving and/or transmitting through WiFi, Blue-tooth, or other wireless system, so as to communicate with such an app, to communicate with transmitter 222, etc.

In some embodiments, the audio receiver and/or amplifier 217, which may be positioned within the base member 212*a*, may include some knobs and/or buttons for controlling any desired parameters thereon. For example, volume controls for each of the speakers could be provided thereon.

Such controls may allow a user to manipulate levels of the different speakers within the surround sound speaker system. For example, where a user wants to calibrate speaker levels of a given surround sound speaker or a given front speaker, or a given subwoofer, controls for increasing or decreasing the sound volume associated with any given individual speaker may thus be provided, allowing a user to make such calibrations or changes.

For example, depending upon the furniture configuration built by the user, a user may wish to boost or attenuate a right front speaker, a left front speaker, a right surround speaker, or a left surround speaker, as numerous furniture assembly possibilities are possible with the modular furniture assemblies.

For example, where a surround speaker or a front speaker may be further away from a given seating position as compared to another surround speaker or another front speaker, a user may wish to boost or decrease volume output from one or more such speakers to even out or calibrate sound volumes from the pair of front, the pair of surround speakers, or across all speakers at a given seating location. Controls as described herein may allow the user to do such.

The speakers and other electronic components of the present invention can be controlled through a variety of different control mechanisms, such as control mechanisms embedded within the sofa, e.g. within the base and/or transverse members or through a controller connected by an electrical cord to the base and/or transverse members or through a remote or wireless setting, such as through the use of a personal cellular phone (e.g., smart phone or tablet). The speakers and other electronics can thus be controlled wirelessly, e.g. through Blue-tooth, WiFi, through internet connections or other wireless connection means. In one embodiment of the present invention, there is no delay through the WISA. For example, sound and video may be correlated to ensure no lip synch problems between produced sound and images (e.g., sound and/or video may be intentionally delayed to ensure proper synchronization).

In one embodiment, a central transmitter such as controller 240 is employed, having a volume knob, wireless communication, ability to select and employ stereo, 4.1, 5.1 etc. with various input capabilities, including an auxiliary port in the jack.

Remote control for the speakers or other audio components or electronic components may be embedded within the furniture system 300 or 350, e.g. within the transverse member 14*a* or base 12*a*. Examples of control include wireless control and tethered control. Parameters that can be controlled include volume for the 2.0 system, 2.1 system, the 4.1 system, volume for the 5.1 system, etc., mute, volume level and intensity control.

As mentioned, in one embodiment, a software application is employed to control the electronic devices such as the speakers and other electronic components within sofa 300 or 350 or other devices in the present invention. The software application may be designed to control within the speakers and other electronic components (e.g., television, lamps, etc.) the volume, power, mute, balance, bass/treble, or other features of the system. The software application can also be used for the lights within the sofa, e.g. the tract lighting or LEDs or other lighting features, e.g., lighting power off and on, and can provide sound performance tracking, recliner settings, temperature settings, dimming/controlling lighting fixtures, television channels, and other user preferences.

In another embodiment, a software application may be used to control the speakers and other electrical components. Such software application may have a variety of different features and settings. In on embodiment, the software application controls speaker volume, TV volume, powers the speakers, power for the TV, mute, balance, bass/treble, lights on/off, sound performance tracking, recliner settings, temperature, diming/controlling of lamps and other lighting, TV channels, etc.

Figure 17:
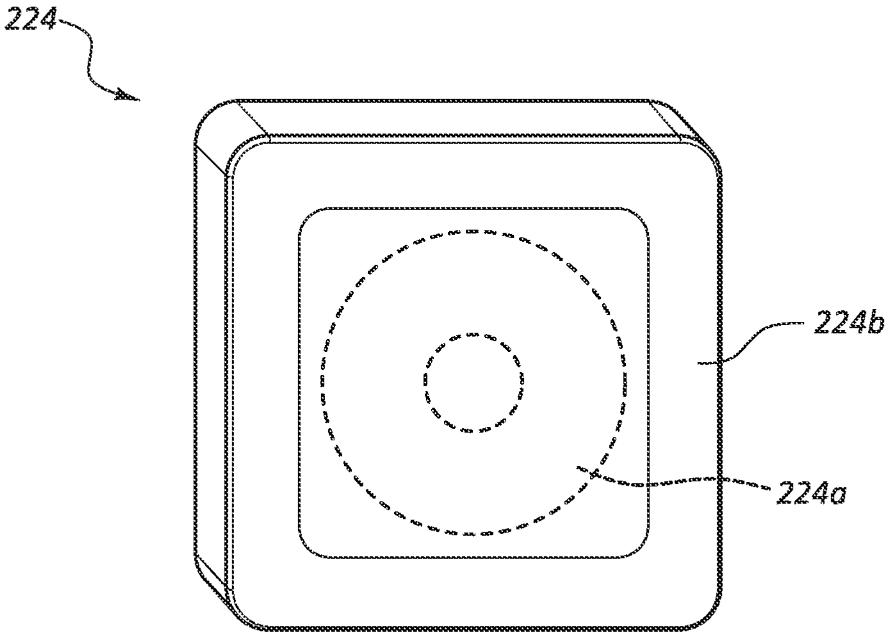
FIG. 17 is an example of a wall-mountable controller or transmitter of the present invention having a speaker (e.g., a center channel speaker).

FIG. 17: Transmitter with Speaker

FIG. 17 shows another example of a transmitter 224 of the present invention, which includes a speaker, for example a center channel speaker, incorporated therein. Transmitter 224 may serve similar functions as controller 240 of FIG. 16 and could be mounted below, or above or behind television or other display 222. In one embodiment, incorporating the center channel speaker 224*a* into the same housing 224*b* which houses the transmitter assembly of transmitter 224 simplifies the overall speaker system. Thus, in one embodiment of transmitter 224, the center channel is in the same housing 224*b* as the controller mechanism.

In another embodiment, transmitter 224, including a built-in channel speaker, can be configured to be wall mounted. For example, it may include mounting structure for such wall mounting.

In one embodiment of the present invention, the furniture assembly can be used as a bed having speakers and other electrical components embedded therein. For example, in one embodiment, base 12*a* can be used as a bed having speakers integrally mounted therein. Base 12*a* can be sized large enough to serve as a bed. For example, base 12*a* can be a stand-alone bed and/or can serve a box spring on which a cushion, such as cushion 18 can be mounted, the combination of base 12*a* and cushion 18 serving as a bed, wherein the base 12*a* and cushion 18 are configured to be large enough to serve as bed. A bed of the present invention having one or more speakers therein can thus be comprised of base 12*a* and/or base 12*a* and cushion 18. In another embodiment, multiple speakers can be placed within the bed. The present invention thus relates to a variety of different types of furniture having electronic components such as speakers, rechargers, power systems and other electrical components embedded therein.

FIGS. 18-48: Induction Charger

Figure 18:
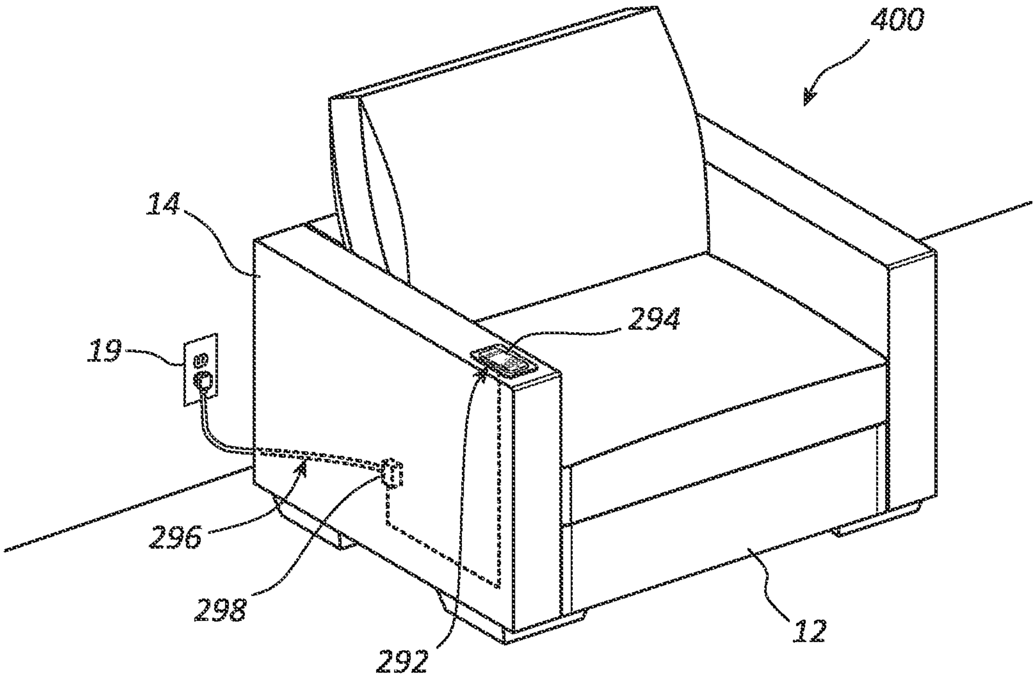
FIG. 18 illustrates a perspective view of an embodiment of a modular furniture assembly in the form of an armchair having an integrated induction charger.

FIG. 18 illustrates a perspective view of an embodiment of a furniture system 400 in the form of a chair having an induction charger 292 integrated within a transverse member 14. Induction charger 292 is represented in dotted lines in FIG. 18 to emphasize that induction charger 292 is disposed within transverse member 14 and, in at least one embodiment, hidden from view. The position of induction charger 292 within furniture system 400 may be different in one or more other embodiments, including in various other positions within the transverse member 14 within one or more other transverse members, or within a base 12 of furniture system 400. In any case, induction charger 292 is positioned such that a person sitting on furniture system 400 can conveniently place an electronic device 294, such as a phone or other chargeable device, over the induction charger, e.g., on transverse member 14, above induction charger 292 to recharge device 294 while sitting or otherwise lounging.

In at least one embodiment, as will be described in further detail with reference to subsequent figures, induction charger 292 is comprised of an induction coil and an electrical cord in electrical communication with the coil, to provide power thereto. The induction charger assembly includes the induction charger, as well as a housing (e.g., coil housing) and in at least some embodiments, a receptacle into which the housing that houses the induction charger is at least partially received. While an induction coil is mentioned by way of example, it will be appreciated that other induction structures (other than a coil) may be possible, and are within the scope of the present disclosure. In any case, the induction charger and induction charger assembly are configured to wirelessly charge device 294 by simply placing device 294 above or otherwise in close-enough proximity to induction charger 292, to effectuate inductive charging therebetween. In at least one embodiment, induction charger 292 resides within transverse member 14 so as to be hidden from view but close-enough to the surface of transverse member 14 or any covers thereof to effectively charge device 294 placed thereon.

Advantageously, illustrated induction charger 292 elastically or resiliently yields downward or otherwise toward or into transverse member 14 of furniture system 200 in response to loads, such as loads resulting from someone sitting or pressing on induction charger 292 or an object being placed thereon, to prevent induction charger 292 from being damaged, or felt (e.g., feeling a hard object embedded in the transverse member or other furniture component). Induction charger 292 can resiliently yield as such and still be positioned close enough to the outer surface of transverse member 14 to effectively charge electronic devices placed thereon, as a result of inclusion of a spring biasing mechanism of the system. The induction coil noted above may be any of various induction coils or other structures capable of wirelessly inducing current flow for charging a battery or electrical communication with other appropriate electrical components disposed within any number of electronic devices, including mobile phones, tables, laptops, and the like. The physics of how to achieve induction charging will be apparent to those of skill in that art, where the present application is rather directed to how to embed such components into a furniture system, so as to be hidden from view and hidden from being felt.

Induction charger 292 includes a wiring system 296 in electrical communication with an induction coil, providing power thereto. Wiring system 296 can be directly or indirectly plugged into wall outlet 19 or otherwise connected to any other type of power source to provide electrical power to the coil in coil housing 302. In an embodiment, power may come from hub 100, or from the audio system (e.g., from an amplifier, from a subwoofer or other speaker, or the like) that can also be embedded in the furniture system. It will be apparent that numerous possibilities exist for providing power to the induction charger. Wiring system 296 is also represented, in part, in dotted lines to illustrate that much or all of wiring system 296 is disposed within furniture system 400 and hidden from view. Wiring system 296 is illustrated disposed within transverse member 14 but can also be disposed within other furniture system components, including base 12 or both base 12 and transverse member 14.

In at least one embodiment, wiring system 296 also includes one or more junctions 298, such as an internal electrical outlet manifold, a DC converter, an electrical hub 100 as described herein, or another electrical outlet or hub, etc. In any case, electrical power from any suitable source is carried to one or more induction coils or other induction structures of induction charger 292. Electrical junction 298 may be disposed within furniture assembly 400 or outside furniture assembly 400. In at least one embodiment, an induction charger system of the present invention such as shown in FIG. 19 can include more than one induction charger for charging multiple electronic devices simultaneously, including two, three, four, or more induction chargers positioned throughout a furniture assembly.

Figure 19:
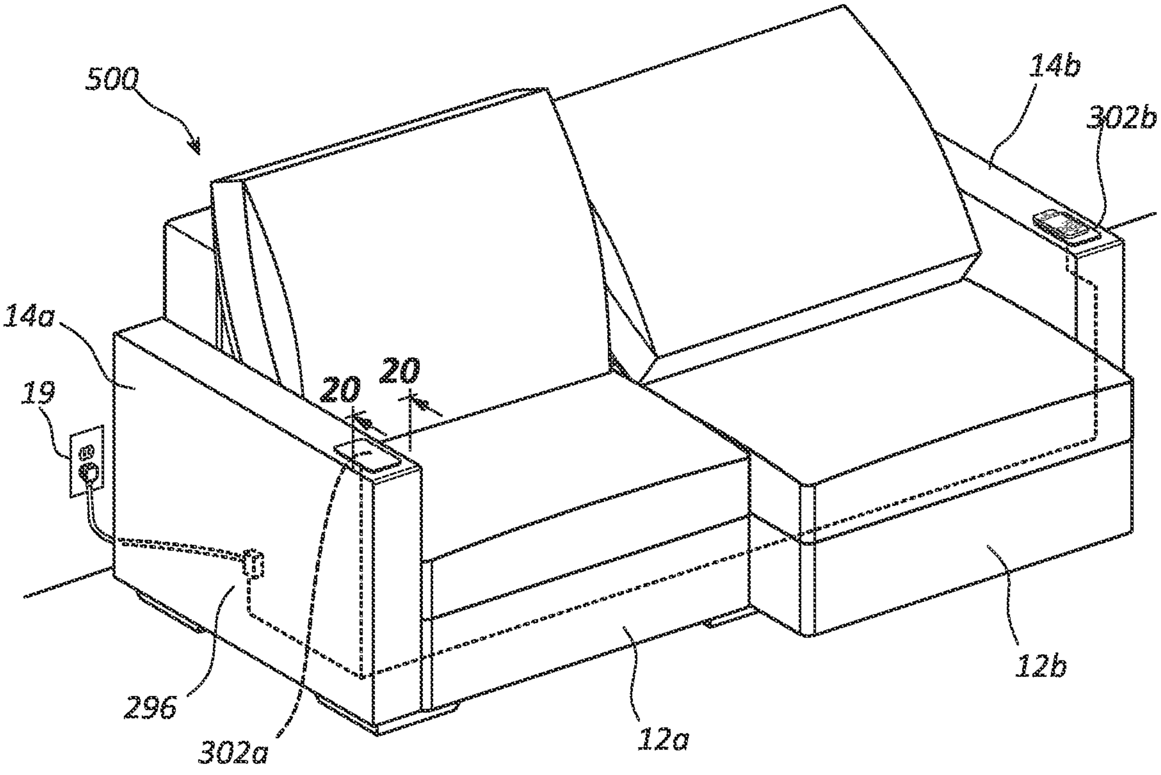
FIG. 19 illustrates a perspective view of an embodiment of a modular furniture assembly in the form of a couch having multiple integrated induction chargers.

Along these lines, as shown in FIG. 19, furniture assembly 500 includes a couch arrangement having two induction chargers 292*a*, 292*b* disposed in respective transverse members 14*a*, 14*b*. Wiring system 296 directly or indirectly (e.g., through hub 100) plugs into wall outlet 19 to provide electrical power through wires extending through transverse members 14*a*, 14*b* and bases 12*a*, 12*b*. In such a configuration, induction chargers 292*a*, 292*b* are conveniently positioned close to each end of furniture assembly 500 such that one can charge electrical devices regardless of where they sit on furniture system 500. In addition, furniture systems 400, 500 having induction chargers 292 integrated therein, as described in the present disclosure, can be modular such that bases 12 and transverse members 14 can be rearranged relative to one another. As such, induction chargers 292 described herein, which are integrated into transverse members 14 (or bases 12), are likewise rearrangeable in position so that a user can customize where the induction chargers 292*a*, 292*b* are disposed relative to the rest of furniture system 400, 500.

One will also note that induction chargers 292*a*, 292*b* are electrically connected via wiring system 296, which extends through the various components of furniture system 500, including both transverse members 14*a*, 14*b* and both bases 12*a*, 12*b*. The position and configuration of wires, hubs, and other electrical components of wiring system 296 shown in FIGS. 18 and 19 (indicated in dotted lines) are exemplary only and may be arranged differently in other embodiments. The arrangement of wires and other components associated with the induction charger described herein may depend on the arrangement of modular furniture components and their relative position to wall outlet 19 or other electrical power source. Electrical connections from one modular component (base or transverse member) to another may be made by quick connect electrical connections (selectively coupleable and uncoupleable by the user), from one component to the adjacent modular component.

Figure 20:
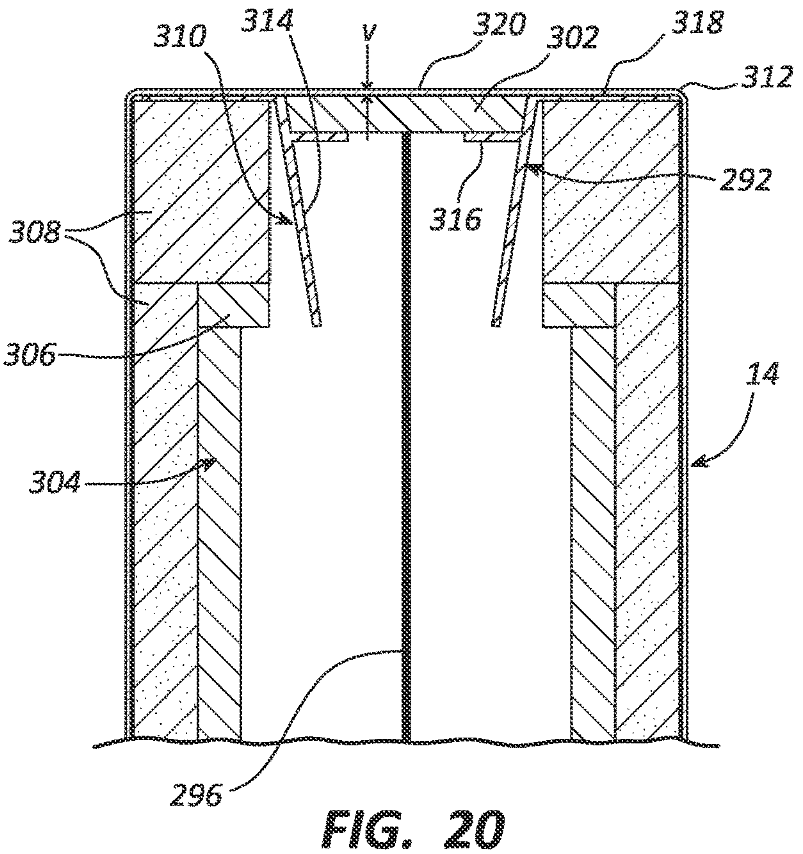
FIG. 20 illustrates a cross-sectional view of an embodiment of a component of a furniture system including an induction charger.

FIG. 20 illustrates a cross-sectional view of an embodiment of a furniture induction charger from the viewing plane 20-20 indicated in FIG. 19. In particular, FIG. 20 illustrates a cross-sectional view of induction charger 292 integrated into transverse member 14. In at least one embodiment transverse member 14 includes a frame 304 having an upper panel 306. Transverse member 14 also includes cushioning material 308, at least part of which is disposed on top of upper panel 306 of frame 304. In addition, in at least one embodiment, a hole 310 extends through upper panel 306 and cushioning material 308. Transverse member 14 of FIG. 20 also includes a cover 312 on (e.g., extending over) cushioning material 308. In at least one embodiment, cover 312 is an inner cover of transverse member 14. Both inner and outer covers can be included (e.g., where the outer cover is specifically selected by the user to provide a desired esthetic finish). In at least one embodiment, cover 312 is an inner cover, and outer cover, or both inner and outer covers of transverse member 14.

In at least one embodiment, the induction charger assembly includes a housing 314 with the induction coil of the induction charger within a coil housing 302. The coil and coil housing 302 can be within housing 314. In an embodiment, a single housing may be provided. In the illustrated embodiment of FIG. 20, housing 314 includes a shelf 316 on which induction coil housing 302 sits. In the illustrated embodiment, cover 312 of transverse member 14 extends over induction coil housing 302 to hold housing 302 down against shelf 316 to secure induction coil housing 302 relative to housing 314. In an embodiment, the coil housing 302 may be integral with any remaining housing 314 of the induction charger assembly. In another embodiment, the housings 302, 314 could be separate. Alternatively, or additionally, induction coil housing 302 can be adhered, or otherwise more permanently fixed, to shelf 316 or otherwise on or within housing 314.

Housing 314 is shown as also including an outwardly extending flange 318 extending between cover 312 and cushioning material 308. In this way, flange 318 is secured to cushioning material 308 by being sandwiched between cover 312 and cushioning material 308. Alternatively, or additionally, in at least one embodiment, flange 318 is more permanently secured to cushioning material 308 and/or cover 312 via adhesives, integral molding, a fastener, or the like. In any case, flange 318 secures housing 314 within transverse member 14 within hole 310 such that the induction charger assembly is also secured at least partially within hole 310.

In the illustrated embodiment of FIG. 20, a thickness of cushioning material 308 is disposed between flange 318 and upper panel 306 of frame 304. Cushioning material 308 thus supports housing 314 and associated induction coil housing 302 such that induction coil housing 302 is biased up against cover 312. In this way, when an electronic device is placed over induction coil housing 302 on a top surface 320 of transverse member 14, induction coil housing 302 is only separated from the electronic device by the thickness of cover 312. The thickness of cover 312, and thus the vertical distance between induction coil housing 302 and top surface 320 of transverse member 14 is small enough to allow inductive electrical coupling between the induction coil within housing 302 and an electronic device placed above induction coil housing 302 on top surface 320 transverse member 14. In addition to the thickness of cover 312, the vertical distance between induction coil housing 302 and an electronic device placed on top of transverse member 14 may also include additional covers or material layers, including additional padded layers and/or outer covers extending over cover 312.

That said, the distance between induction coil housing 302 and surface 320 where the electronic device can be positioned for inductive charging is typically a relatively short distance, but may be a minimum distance that better allows hiding the induction charger within the transverse member or base. In at least one embodiment, for example, the induction charger (e.g., the coil thereof) is disposed such that a vertical distance V from coil housing 302 to top surface 320 of transverse member 14 is at least 10 mm, at least 12 mm, or at least 15 mm, such as 10-50 mm, 12-45 mm, or 15-30 mm. It will be apparent thought that distances of less than 10 mm, or even less than 7 mm (e.g., 1 mm to 5 mm) can also be used, in some embodiments. Distances of at least 10 mm can be advantageous in that they can help in ensuring that the induction charger components are not only hidden from sight within the furniture assembly, but are also not readily discerned by feel, either (e.g., by compressing upholstery or foam, where a user may tactilely discern that a "hard" object is embedded therein).

As noted above, cushioning material 308 disposed between flange 318 and upper panel 306 of frame 304 biases flange 318, and therefore housing 314 and induction coil housing 302, upward toward cover 312. In addition, cushioning material 308 disposed between flange 318 and upper panel 306 of frame 304 acts as a spring biasing mechanism to allow induction charger 292 to resiliently spring downward toward or through upper panel 306 of frame 304 when acted upon by an external force.

Figure 21:
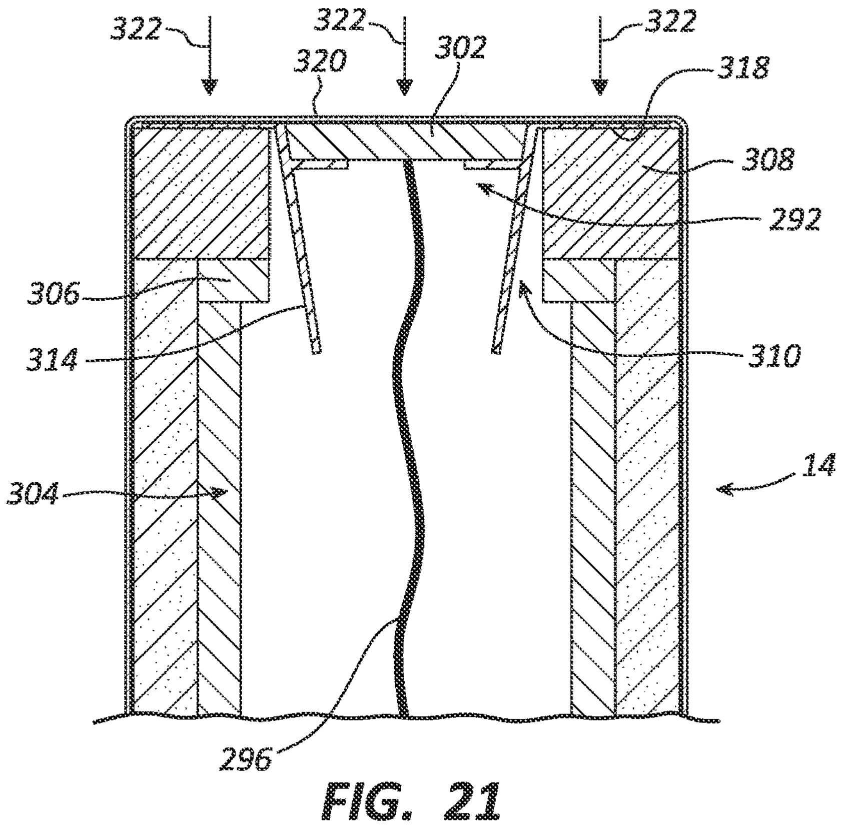
FIG. 21 illustrates a cross-sectional view showing the induction charger of FIG. 20 being compressed down during use.

Along these lines, FIG. 21 illustrates a cross-sectional view showing the induction charger 292 (and cushioning material 308) of FIG. 20 being compressed downward during use. Arrows 322 indicate a downward direction of a force, such as a force from someone sitting or placing an object of sufficient mass on top of transverse member 14, to cause such compression. When such a force acts on induction charger 292, the cushioning material 308 compresses downward, like a spring, and induction charger 292 travels downward therewith. In doing so, in at least one embodiment, housing 314 travels down towards hole 310. In an embodiment, such travel may include travel at least partially through hole 310 in upper panel 306 of frame 304. When the force is removed, cushioning material 308 disposed on top of upper panel 306 of frame 304 resiliently or elastically returns to substantially the same configuration shown in FIG. 20, as the spring biasing mechanism biases the induction charger relative to the frame of the transverse member, such that in the absence of an applied force, the induction charger is biased away (e.g., upward) from the frame of the transverse member.

Because flange 318 is secured between cover 312 and cushioning material 308, housing 314 and induction coil housing 302 elastically return to position along with cushioning material 308. In this way, induction coil housing 302 remains biased against cover 312 for use in charging an electronic device placed thereon while being protected from being damaged when a significant downward force is on top of transverse member 14 directly over induction charger 292. That is, most if not all force pressing downward on induction charger 292 is absorbed as compression of cushioning material 308, and induction coil housing 302 and housing 314 translates downward through hole 310, instead of breaking.

In either case, whether a force is acting downward on induction charger 292 or not, housing 314, including the depth of shelf 316, thickness of flange 318, and thickness of induction coil housing 302, are such that a top surface of induction coil housing 302 (or housing 314) is substantially flush with a top surface of flange 318. Thus, no edges or uneven contours of induction charger 292 are visually detectable through cover 312.

In this way, advantageously, induction charger 292 is hidden from view to improve the aesthetic appearance of any furniture system into which induction charger 292 is integrated. Wire 296 or other electrical cord for providing power to induction coil of induction charger 292 is also hidden within frame 304 of transverse member 14, as shown in FIGS. 20 and 21. In at least one embodiment, as shown, wire 296 hangs down from induction coil housing 302 and is flexible enough to accommodate the changing vertical position of induction coil housing 302 as forces press down as shown in FIG. 21.

Figure 22:
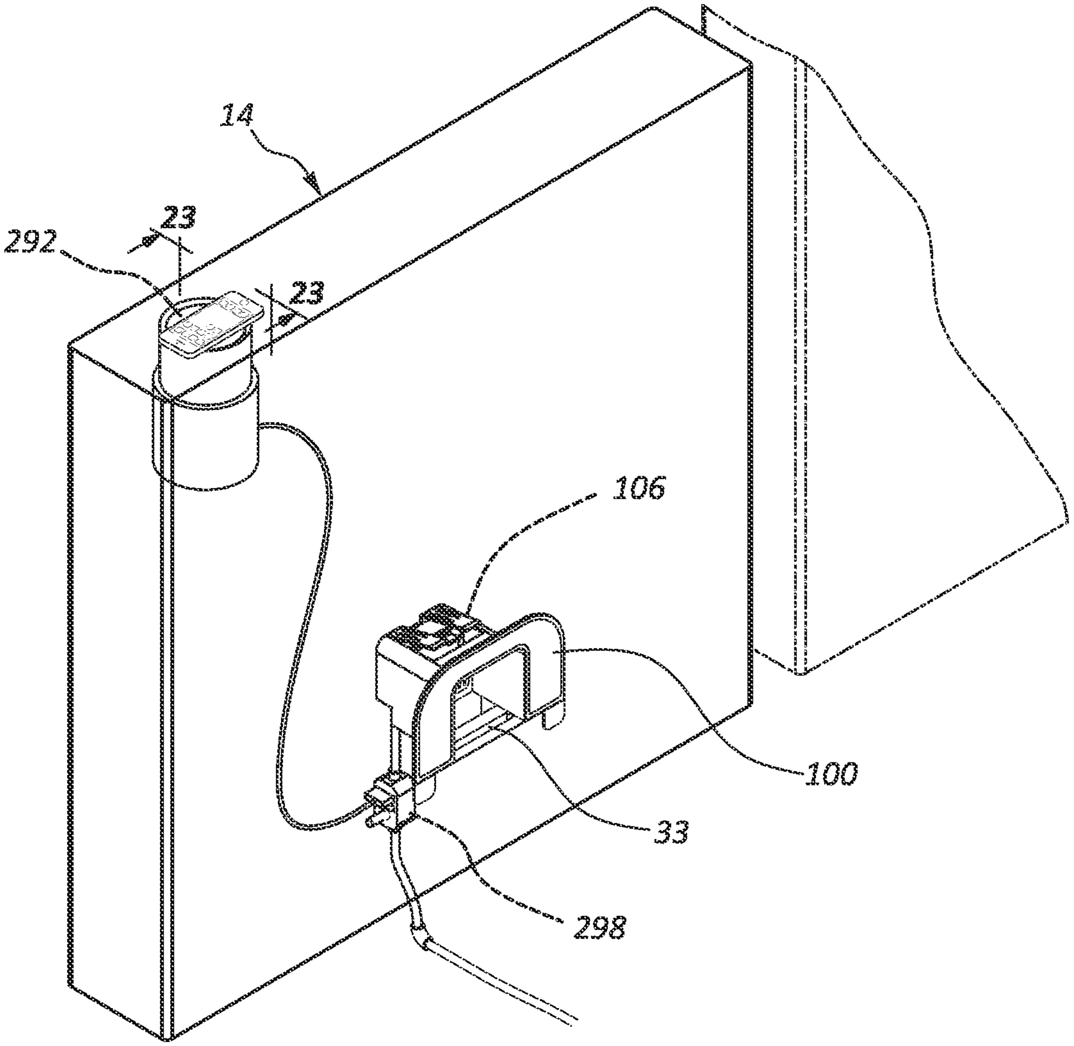
FIG. 22 illustrates a perspective view of another embodiment of an induction charger disposed within a transverse member of a modular furniture system, including an electronic hub for powering the induction charger.

As illustrated in subsequent figures described herein, a number of configurations and spring biasing mechanisms may be employed to achieve the aforementioned advantages of movably securing induction charger 292 to or within transverse member 14 to avoid damage and maintain effective charging functionality. For example, FIG. 22 illustrates a perspective view of another embodiment of a furniture induction charger 292 disposed within a transverse member 14. In addition, FIG. 22 illustrates an electrical hub 100, such as those described herein, through which electrical power to induction charger 292 can be routed, where hub 100 receives power from an external power source. Internal electrical outlet 298 may also be positioned within transverse member 14 to provide additional outlets to other electrical devices or induction chargers 292 positioned elsewhere within the furniture system of which transverse member 14 is a part. Such outlets 298 may be low voltage (e.g., typically about 12V), or full voltage (e.g., 110 or 220 V), depending on need. FIG. 22 also illustrates a cellular phone or other portable electronic device placed on top of transverse member 14 above induction charger 292, for charging.

Figure 23:
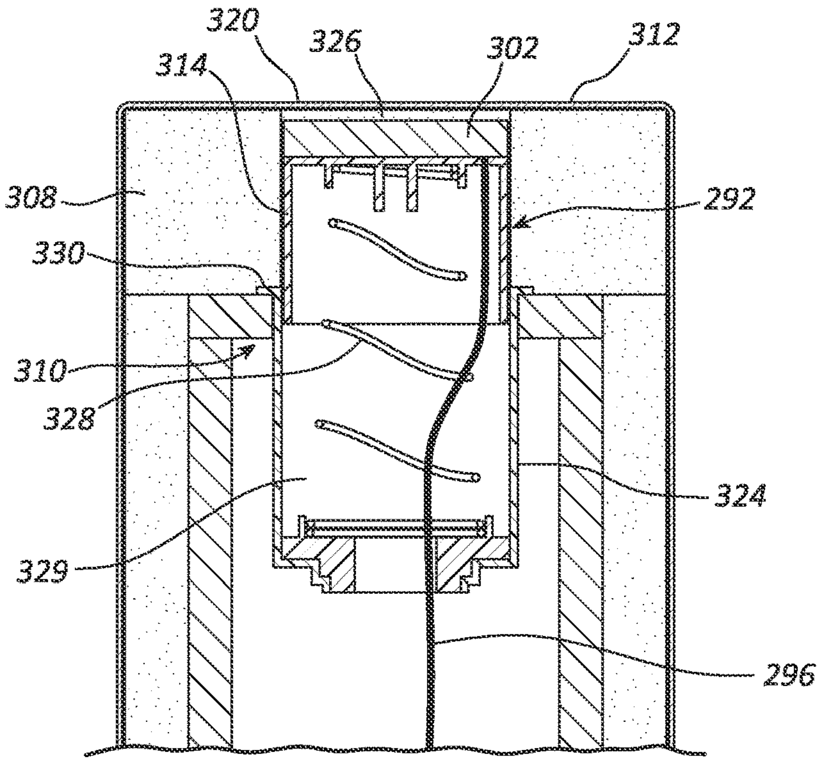
FIG. 23 illustrates a cross-sectional view of the furniture system including an induction charger illustrated in FIG. 22.

FIG. 23 illustrates a cross-sectional view through the furniture system including an induction charger illustrated in FIG. 22 taken along plane 23-23 as indicated in FIG. 22. In the illustrated embodiment of FIG. 23, induction charger 292 includes a housing 314, receptacle 324, and induction coil housed within coil housing 302. The induction coil housing is shown seated on top of, or within, housing 314. Induction coil housing 302 can be secured to housing 314 in similar ways as described in other embodiments. For example, induction coil housing 302 is shown sandwiched between housing 314 and cover 312 and/or one or more other layers, such as a padded layer 326 disposed on top of induction coil housing 302. In at least one embodiment, induction coil housing 302 can additionally or alternatively be adhered to housing 314.

Padded layer 326 is added to provide a cushioning layer on top of induction coil housing 302 for added protection and also to provide an improved aesthetic transition between the top surface of induction coil housing 302 and surrounding cushioning material 308 so that induction charger 292 is not visible from outside cover 312. As noted above, the induction coil is strong enough to charge an electronic device placed on the top surface 320 of transverse member 14 through the vertical distance separating them, including, in this case, the thicknesses of padded layer 326 and cover 312. While layer 326 is shown as only extending the width of induction coil housing 302, in another embodiment, padded layer 326 may extend across a greater width, e.g., greater than that of coil housing 302, such as substantially the full width of the top of transverse member 14 (i.e., across substantially the entire width of top surface 320). Such a configuration may further aid in hiding the presence of induction coil housing 302, underlying cover 312 and padded layer 326.

Housing 314 can be secured, at least partially, within receptacle 324 via a spring 328 (e.g., a coiled spring). Spring 328 is attached to housing 314 at one end and to receptacle 324 at another end. Housing 314 is dimensioned such that the outside diameter (or width) of housing 314 fits within the inside diameter (or width) of receptacle 324. In this way, spring 328 biases housing 314, and thus induction coil housing 302 upward, toward cover 312. Additionally, housing 314, and thus induction coil housing 302, elastically yields downward into receptacle 324 when acted on by a force. While illustrated as cylindrical in shape in FIG. 22, it will be appreciated that other shapes are also possible for housing 314 and receptacle 324.

Figure 24:
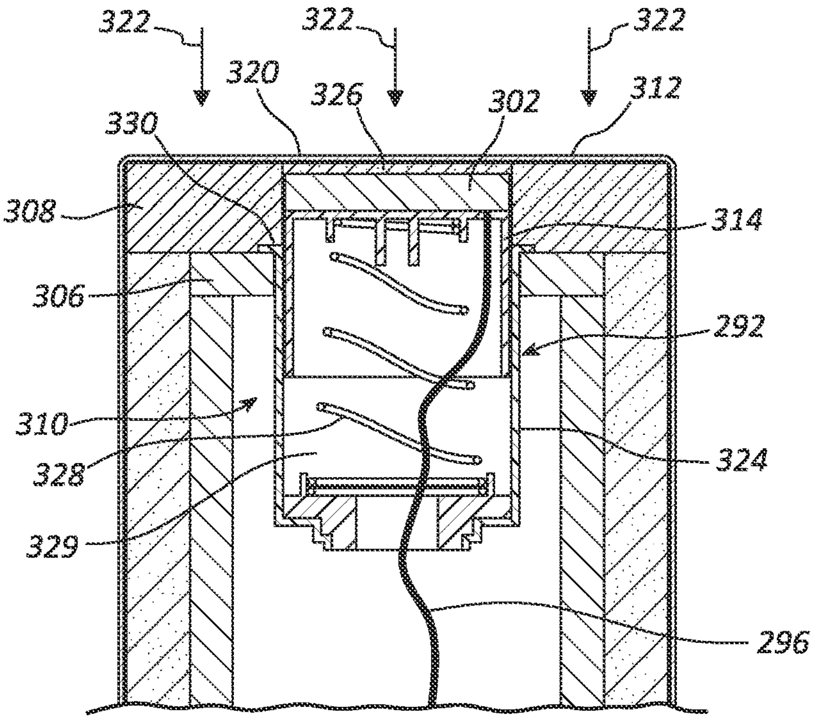
FIG. 24 illustrates a cross-sectional view showing the induction charger of FIGS. 22 and 23 being compressed down during use.

FIG. 24 illustrates a cross-sectional view showing the induction charger embedded in a furniture system of FIG. 23 being compressed downward in response to a force 322 during use. As shown, housing 314 yields downward into receptacle 324 so that spring 328 absorbs the majority, if not all, of force 322. When force 322 is removed, spring 328 returns to bias induction coil housing 302 and housing 314 towards cover 312 in the resting position, shown in FIG. 23.

In addition to, or alternatively to, the spring 328 situated within receptacle 324, at least one embodiment includes a gaseous or other hydraulic spring 329 (e.g., a gas or other hydraulic cylinder) disposed within and/or between receptacle 324 and housing 314. Hydraulic spring 329 may include any number of compressible gases or other fluids, that act as a spring to allow housing 314 to yield downward into receptacle 324 and return to a resting state with housing 314 biased upward, as described. Hydraulic spring 329 thus acts similar to spring 328.

Receptacle 324 is secured to frame 304 such that receptacle 324 does not move to any substantial degree when force 322 is applied. In at least one embodiment, as shown, receptacle 324 includes outwardly extending flange 330 that rests on upper panel 306 of frame 304 such that receptacle 324 extends through hole 310 in upper panel 306. Receptacle 324 may be permanently or removably secured to frame 304, either with or without flange 330, such as by adhesives, screws, bolts, or other fastener in one or more other embodiments. Additionally, in at least one embodiment, wire 296 extends through receptacle 324 and housing 314 to connect to induction coil housing 302 for powering the induction coil. In at least one embodiment, wire 296 is routed at least partially outside the one or more components of induction charger 292.

Figure 25:
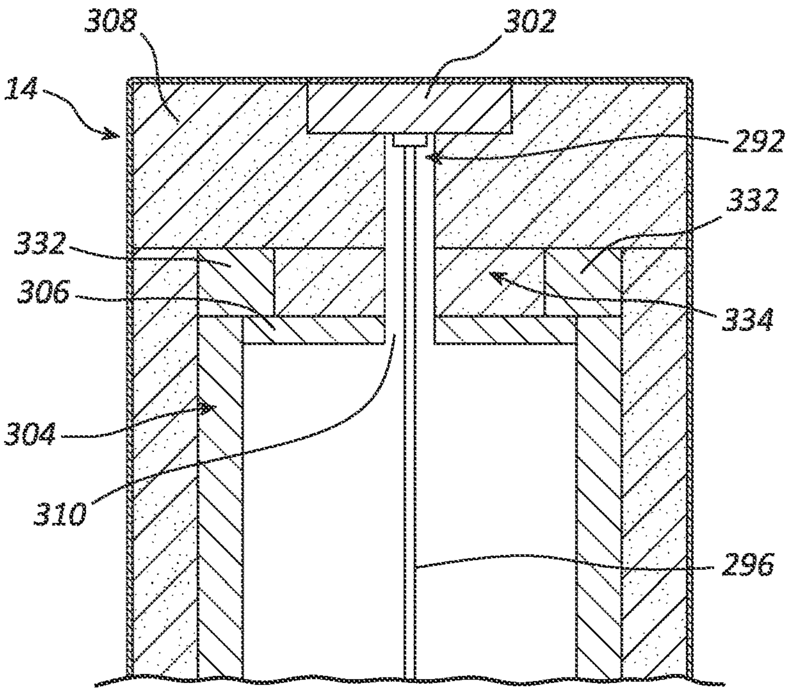
FIG. 25 illustrates a cross-sectional view of another embodiment of a furniture system including an induction charger.

FIG. 25 illustrates a cross-sectional view of another embodiment of a furniture induction charger 292 elastically secured within transverse member 14 to effectively position induction coil housing 302 near the surface of transverse member 14 while protecting the induction coil and its housing from damage when sat upon or otherwise acted upon by a force typical in a leisure seating furniture environment. For example, induction charger 292 shown in FIG. 25 includes induction coil housing 302 secured between cover 312 and cushioning material 308. Hole 310 is shown as extending through cushioning material and upper panel 306 of frame 304. In this embodiment, cushioning material 308 disposed between induction coil housing 302 and upper panel 306 act as a spring to allow induction coil housing 302 to elastically yield downward toward upper panel 306. In any embodiment, rather than a hole in panel 306 in which various structures of the induction charger assembly are mounted, mounting could be achieved along an edge of a given panel of frame 304, so that no hole may actually be present, etc.

Figure 26:
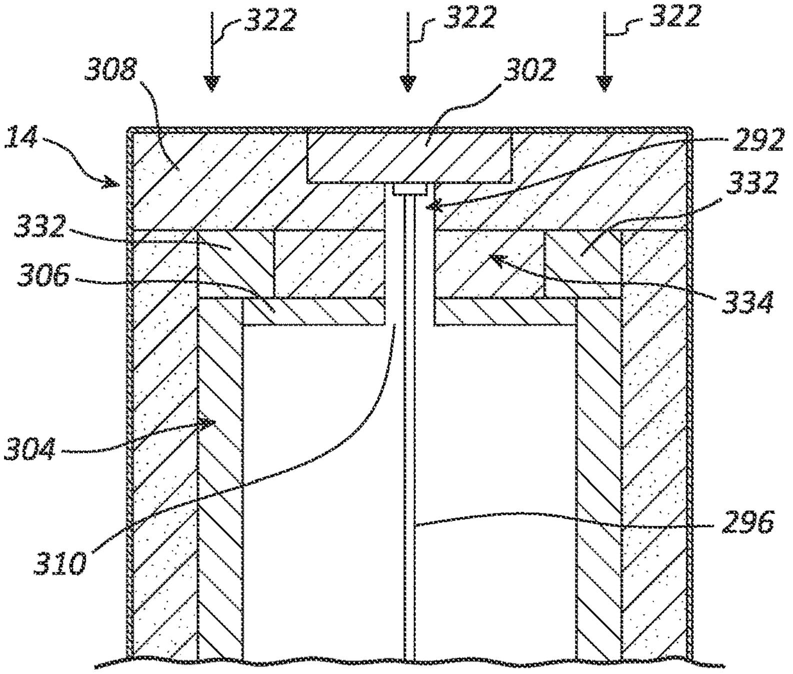
FIG. 26 illustrates a cross-section view showing the induction charger of FIG. 25 being compressed during use.

Frame protrusions 332 extend upward from frame 304 and positioned outward (e.g., radially outward) on either side of induction coil housing 302 to form pocket 334. In the illustrated embodiment, pocket 334 is filled with cushioning material 308 but one or more other embodiments may include pockets 334 without cushioning material disposed therein. In any case, pocket 334 is configured to receive induction coil housing 302 when pressed downward by force 322, as shown in FIG. 26. If force 322 presses further down on induction coil housing 302, induction coil housing 302 can yield all the way down into pocket 334, at which point force 322, if acting downward beyond the perimeter edges of induction coil housing 302, would only act on frame protrusions 332 disposed next to induction coil housing 302 while the coil and its housing 302 sat safely within pocket 334. In this way, the embodiment illustrated in FIGS. 25 and 26 provide protection to the induction coil and its housing while maintaining the induction coil and its housing 302 close to the top surface of transverse member 14. Again, in such an embodiment, cushioning material 308 acts as the spring.

Figure 27:
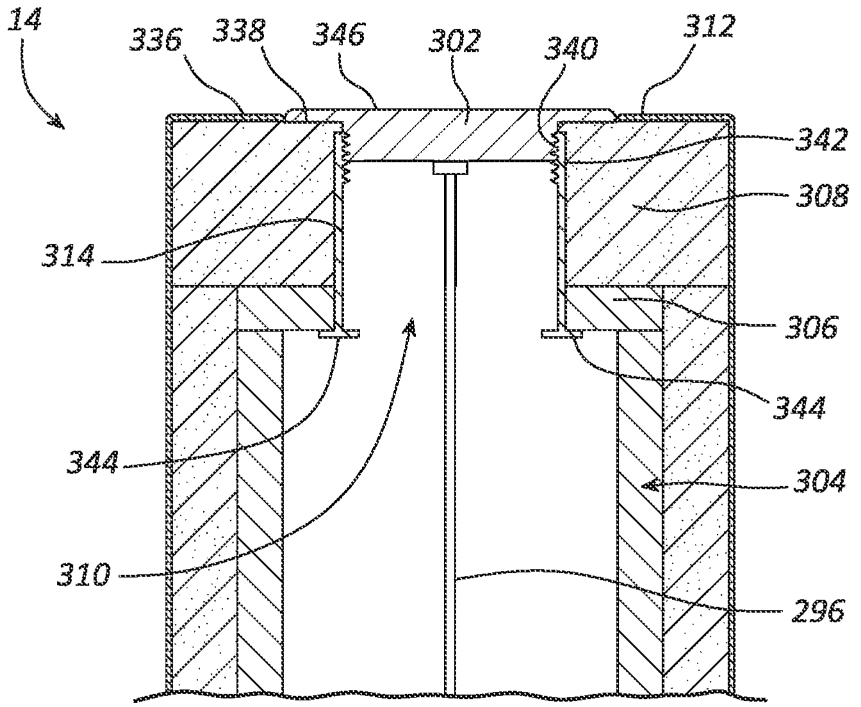
FIG. 27 illustrates a cross-sectional view of another embodiment of a furniture system including an induction charger.

Turning to another embodiment, FIG. 27 illustrates a cross-sectional view of a furniture induction charger 292 movably secured within transverse member 14. In the illustrated embodiment, cushioning material 308 acts as a spring biasing mechanism that biases induction coil housing 302 towards an upper surface 336 of cover 312 of transverse member 14. Induction coil housing 302 includes outwardly extending flange 338 that sits on top of cushioning material 308 such that induction coil housing 302 does not fall below cushioning material 308 into hole 310 that is shown as extending through cover 312, cushioning material 308, and upper panel 306 of frame 304. Additionally, induction coil housing 302 is shown as including a male threaded portion 340 that engages female threaded portion 342 of housing 314. The male-female threaded portions could also be reversed.

Housing 314 includes catch members 344 (stops) that extend underneath upper panel 306 of frame 304 to keep housing 314 from rising above upper panel 306. Thus, threadedly engaging induction coil housing 302 with housing 314 allows a user or manufacturer to adjust the height of the top surface 346 of induction coil housing 302 (including the position of the coil housed therein) so that the top surface 346 can be flush with top surface 336 of cover 312. Again, cushioning material 308 acts as a spring biasing mechanism to bias housing 314 and the connected induction coil housing 302 upward while flange 338 of induction coil housing 302 prevents induction coil housing 302 and housing 314 from falling downward through hole 310. In addition, wire 296 that provides power to the coil in housing 302 is shown passing through hole 310 and upper panel 306 and into the interior space of frame 304. While flanges 338 are shown extending a distance that is shorter than the full width of the top of the transverse member, in another embodiment, they can extend any distance, up to the full width of the top of the transverse member.

Figure 28:
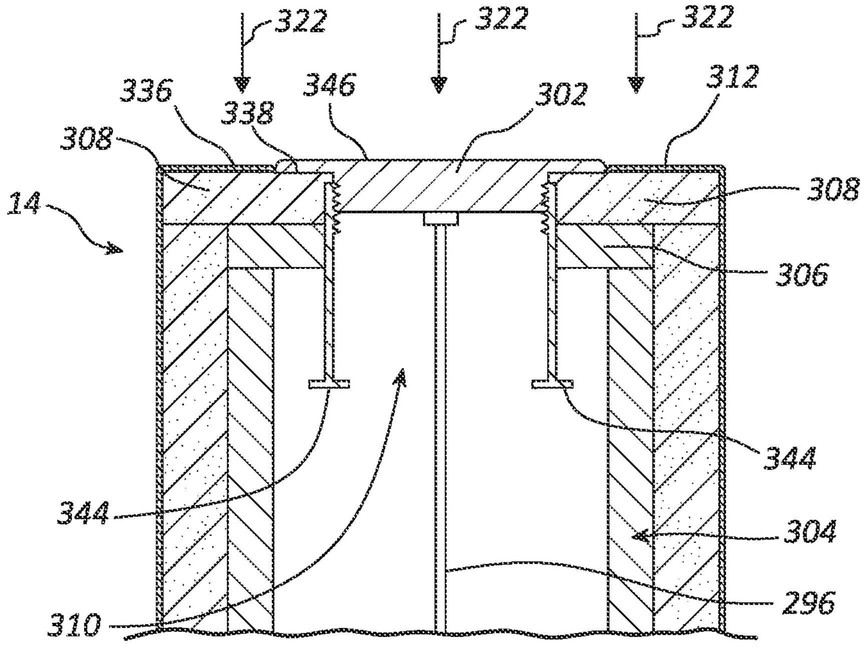
FIG. 28 illustrates a cross-section view showing the induction charger of FIG. 27 being compressed during use.

As seen in FIG. 28, when force 322 acts downwardly on induction coil housing 302, cushioning material 308 compresses downward and housing 314 and induction coil housing 302 threadedly engaged thereto also yield downward. When force 322 is removed, induction coil housing 302 and housing 314 elastically return to substantially the same resting configuration shown in FIG. 27.

In the illustrated embodiment of FIGS. 27 and 28, hole 310 extends through cover 312. Alternatively, in at least one embodiment, an additional outer cover may also extend over cover 312 and induction coil housing 302 to hide induction charger 292 from view. In such an embodiment, the outer cover may be removable to allow a user or manufacturer to access induction coil housing 302 in order to, among other things, adjust the height of top surface 346 of induction coil housing 302 to be flush with or below top surface 336 of cover 312, to replace an induction charger component needing replacement, etc. The user can remove any bulging or other protrusions caused by induction coil housing 302 or other structures of the induction charger 292 underneath an outer cover so that the induction charger 292 is not visually detectable through any such outer cover.

Figure 29:
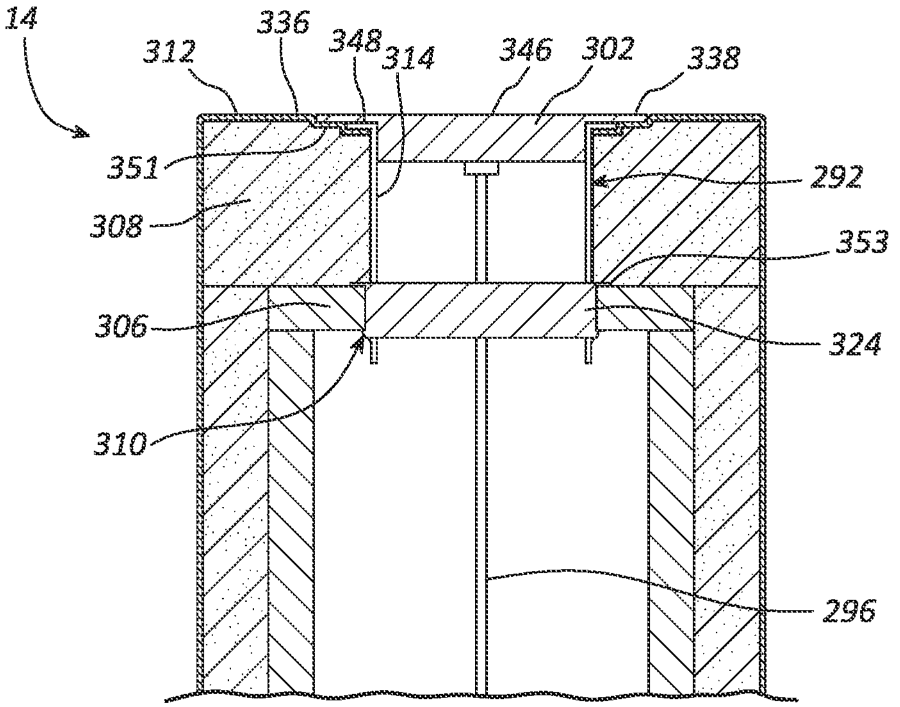
FIG. 29 illustrates a cross-sectional view of another embodiment of a furniture system including an induction charger.

FIG. 29 illustrates a cross-sectional view of another embodiment of a furniture induction charger 292 movably secured within transverse member 14. The illustrated embodiment of FIG. 29 is similar to that of FIG. 23 in that induction coil housing 302 is secured to housing 314, which is secured within or guided through receptacle 324 secured to upper panel 306 of frame 304. However, in the embodiment illustrated in FIG. 29, induction coil housing 302 includes flange 338 and housing 314 includes flange 348, both of which rest or are otherwise secured on cushioning material 308. In at least one embodiment, cover 312 extends between flange 348 and/or flange 338 and cushioning material 308. Cushioning material includes a stepped contour 351 that compliments the flanges 348, 338 so that upper surface 346 of induction coil housing 302 remains flush with upper surface 336 of cover 312.

Figure 30:
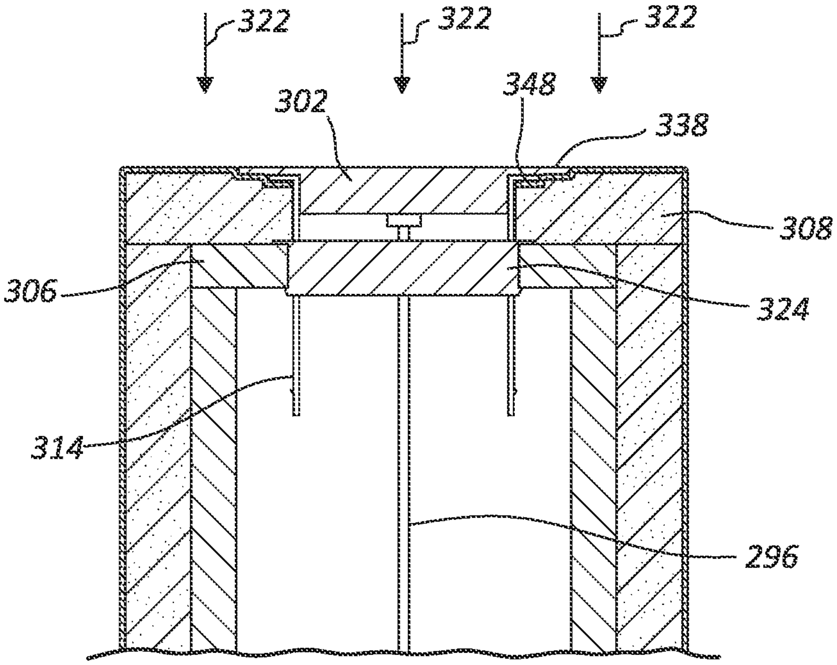
FIG. 30 illustrates a cross-section view showing the induction charger of FIG. 29 being compressed during use.

Receptacle 324 is secured to upper panel 306 of frame 304 through hole 310 at least in part via flange 353. In this way, as shown in FIG. 30, when force 322 acts downwardly on induction charger 292, housing 314 is guided downward through receptacle 324, with cushioning material 308 residing between flanges 348, 353 and upper panel 306 acting as a spring to elastically return housing 314 and coil housing 302 to a resting position, as shown in FIG. 29.

In at least one embodiment, flange 338 may be part of a separate compartment into which induction coil housing 302 may be snapped for easy installation and removal. For example, a compartment may comprise silicone or another elastomeric material integrated into cover 312 such that the compartment is flush with the upper surface 336 of cover 312. The compartment or flanges 338 thereof may partially overlap the upper surface 346 of induction coil housing 302 to help secure induction coil housing 302 within the compartment. In at least one embodiment, overlapping portions of the compartment are flexible, elastomeric, and/or resilient so that induction coil housing 302 can be selectively secured within such a compartment.

Figure 31A:
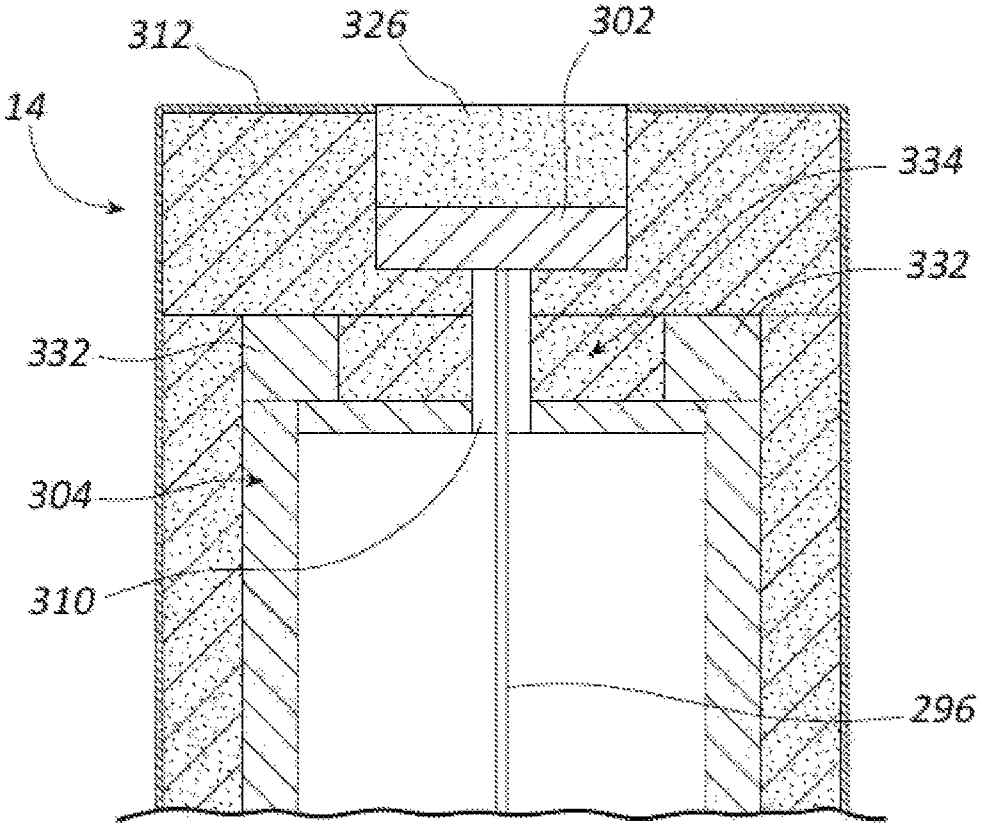
FIG. 31A illustrates a cross-sectional view of another embodiment of a furniture system including an induction charger.
Figure 32:
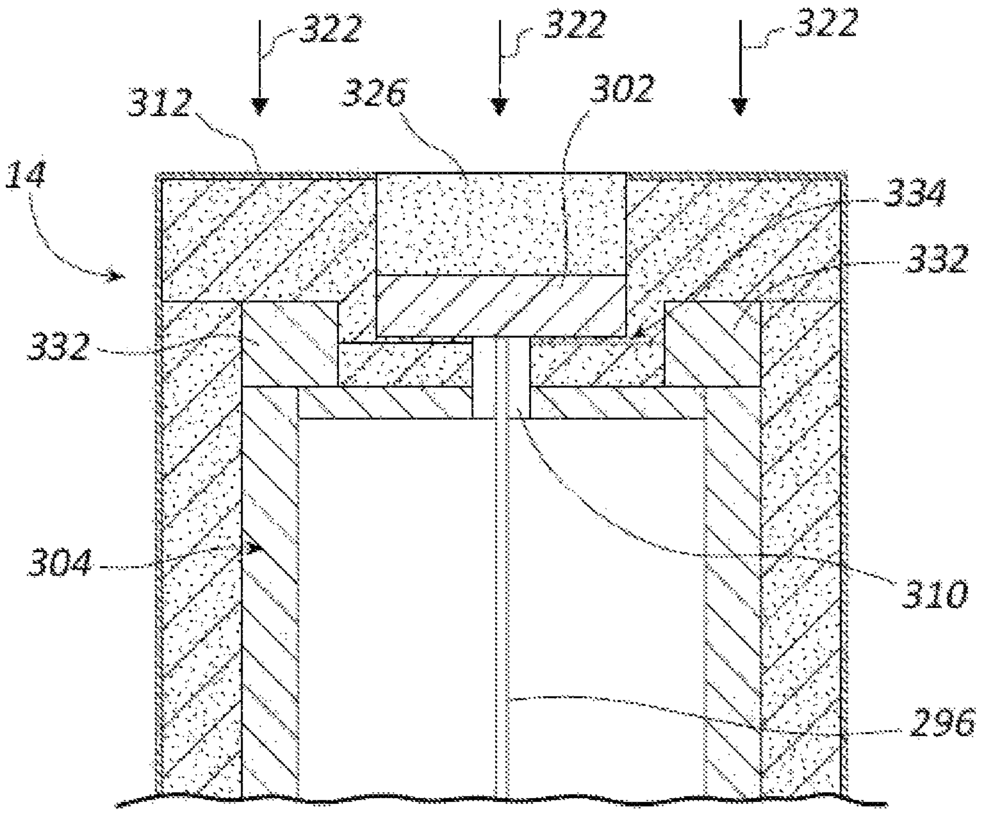
FIG. 32 illustrates a cross-section view showing the induction charger of FIG. 31A being compressed during use.

FIG. 31A illustrates a cross-sectional view of yet another embodiment of a furniture induction charger 292 elastically integrated within transverse member 14. The embodiment illustrated in FIG. 31A is similar to the embodiment illustrated in FIG. 25, in that frame protrusions 332 extend upward to form pocket 334 for receiving induction coil housing 302. However, the embodiment illustrated in FIG. 31A includes an additional padded layer 326 of cushioning material disposed on top of induction coil housing 302. In such an embodiment, induction coil housing 302 is strong enough to effectuate inductive coupling with an electronic device placed on top of padded layer 326 (or on a cover extending thereover). Padded layer 326 further protects the induction coil and its housing 302 as a force 322 presses downward, as shown in FIG. 32.

Figure 31B:
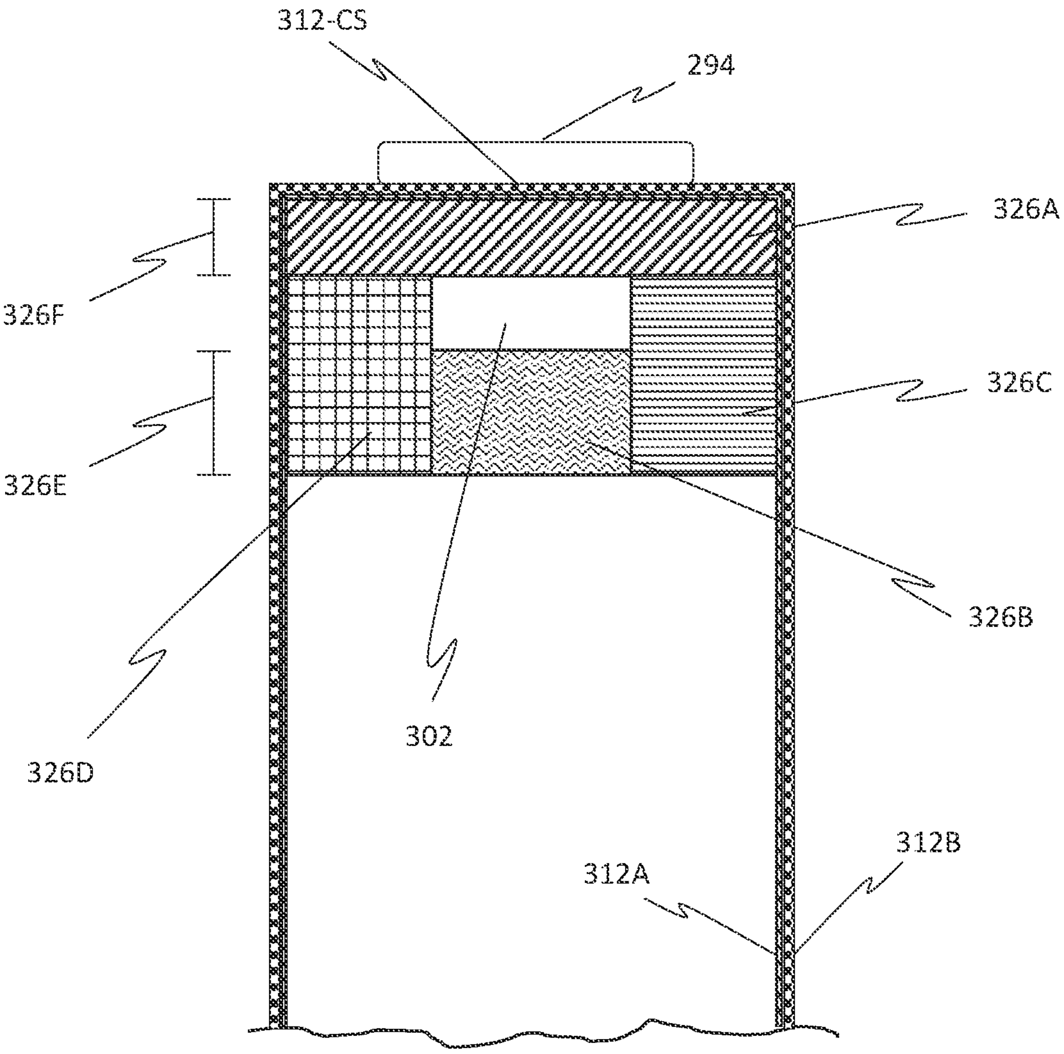
FIG. 31B illustrates how an induction charger can be positioned between different cushioning materials in an uncompressed state.
Figure 31C:
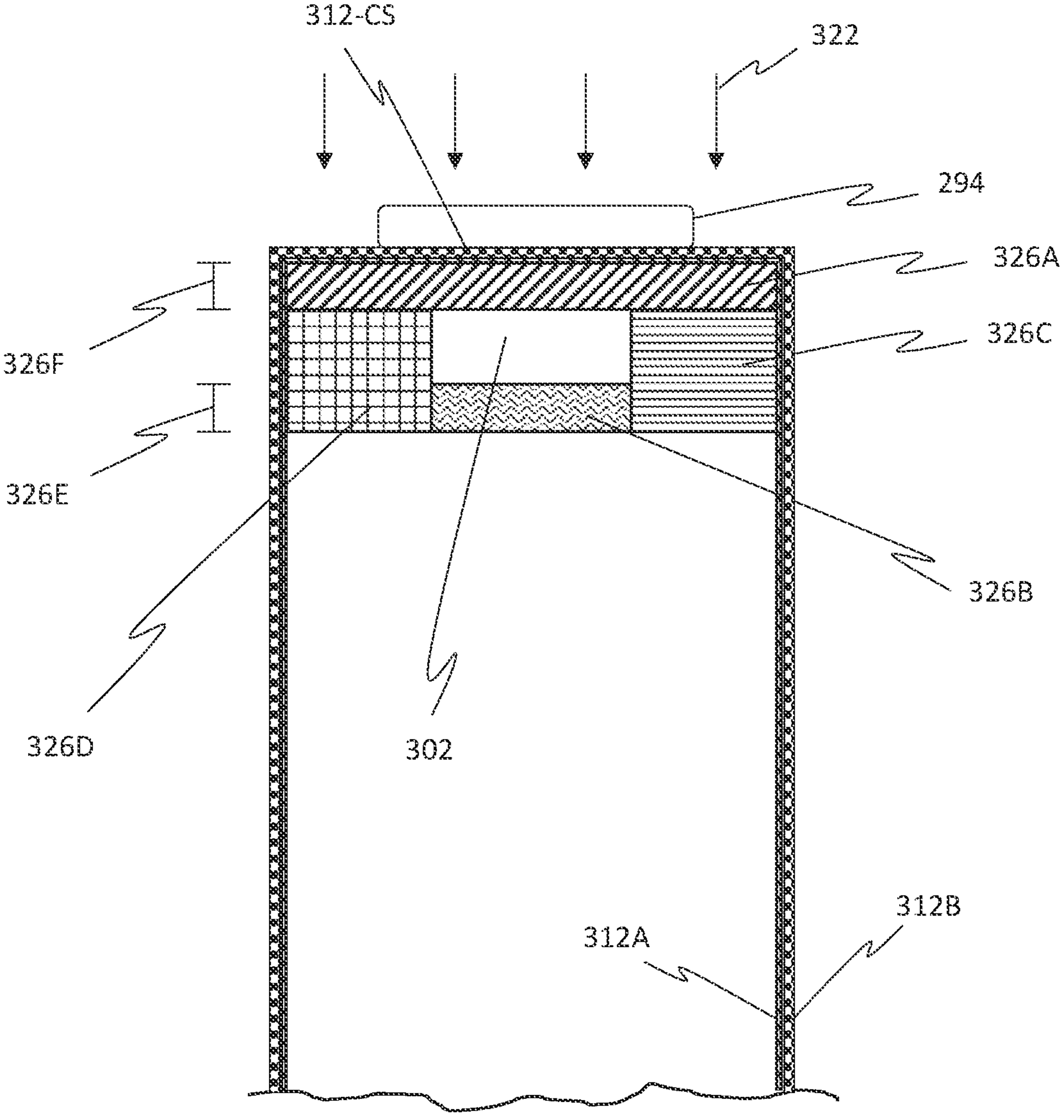
FIG. 31C illustrates how the induction charger can be positioned between different cushioning materials in a compressed state.

FIGS. 31B and 31C illustrate additional embodiments in which a furniture system has or provides an electrical charging system for charging an electrical device. As discussed previously, the furniture system includes a base comprising a base frame, where the base provides a seating surface. The system also includes a transverse member that provides at least one of a backrest or armrest. Here, the transverse member includes a transverse member frame. The system also includes an induction charger (as shown by induction coil housing 302). The charger can be at least partially secured to the base frame or the transverse member frame. The induction coil housing 302 provides induction charging to a device positioned adjacent to a "given surface" (e.g., inner cover 312A or outer cover 312B) of the base or transverse member. As used herein, the "given surface" is also referred to as a "charging surface" or a "charging location" and is illustrated in FIGS. 31B and 31C via the label 312-CS. The given surface or "charging surface" 312-CS is sufficiently near the induction coil housing 302 to enable an electronic device 294 to be charged by the induction charger via induction charging. In this configuration, the induction charger is hidden so as to not be seen or perhaps even felt (e.g., if a user sits or otherwise presses on the armrest in which the induction charger is positioned) by a user of the furniture system.

By way of additional clarification, the modular furniture assembly, in some implementations, includes an inner cover 312A and potentially (though not necessarily) an outer cover 312B. Either one of the inner cover 312A or the outer cover 312B may be the so-called "given surface" or "charging surface" 312-CS on which the electronic device 294 is disposed in order to be charged.

Notably, some embodiments include only a single cover (e.g., either cover 312A or 312B). Some embodiments include both the outer cover 312B and the inner cover 312A. The inner cover 312A and the outer cover 312B may comprise polyester, chenille, tweed, linen, velvet, leather, polyester linen, cotton, cotton blend, denim, twill, faux fur, or leather material. By way of example, the outer cover 312B may comprise a decorative upholstery fabric or similar decorative cover material. The inner cover 312A may provide less esthetic appeal, but may serve to cover and protect the components interior thereto. FIG. 31B shows how the electronic device 294 can be positioned or disposed on the outer cover 312B (if provided) or directly on the inner cover 312A (if no outer cover is provided). At this position, the electronic device 294 can be charged via induction from the induction charger. Accordingly, the "given surface" or "charging surface" 312-CS can refer to an outer surface of whichever cover is outermost. The phrase "outer surface" refers to a surface that is exposed to the environment as opposed to an "inner surface," which is a surface that is not exposed to the environment and which is internal to the modular furniture assembly.

Notice, the induction coil housing 302 is positioned between a first cushioning material 326A and a second cushioning material 326B. In some implementations, the first cushioning material 326A is included as a part of the charging surface 312-CS (e.g., the inner cover 312A) such as in a case where the first cushioning material 326A is an integral part of the charging surface 312-CS. For example, the charging surface 312-CS can be an integral outer skin or an outer surface of the first cushioning material 326A such that the first cushioning material 326A is integral with and non-separable from the charging surface 312-CS. In such a scenario, the first cushioning material 326A and charging surface 312-CS combination can operate as a removable lid or cover disposed over top of the induction charger. When the lid or cover is removed, the induction charger can be accessed. When the lid or cover is in place, then the induction charger is hidden from view.

Alternatively, the first cushioning material 326A is proximate to the charging surface 312-CS. In this implementation, the first cushioning material 326A is separate from the charging surface 312-CS and is below (or perhaps to a lateral side) the charging surface 312-CS. Being "proximate," in this scenario, means that the first cushioning material 326A is within at least 30 mm of the charging surface 312-CS. In some cases, the proximate range can be larger, such as within at least 40 mm, 50 mm, 60 mm, 70 mm, 80 mm, 90 mm, or perhaps even 100 mm. In an embodiment, the distance from the induction charger 302 to the charging surface 312-CS is within the operating range of the resonant or other type wireless charger". This distance may correlate closely to the thickness of the first cushioning material, as the total distance between these two structures can be the first cushioning material thickness plus any cover thickness.

Optionally, when the first cushioning material 326A is separate from but proximate to the charging surface 312-CS, then the charging surface 312-CS is or may include a cover member (e.g., inner cover 312A or outer cover 312B) that covers the first cushioning material 326A. By way of example, the charging surface 312-CS can be an outer surface of the outer cover 312B disposed on the base frame or the transverse member frame. Here, the outer cover 312B encompasses or is disposed around the inner cover 312A. Additionally, the inner cover 312A is underneath the outer cover 312B, and the first cushioning material 326A is adjacent to the inner cover 312A.

As another example, the charging surface 312-CS can be an outer surface of the inner cover 312A disposed on the base frame or the transverse member frame. In this regard, the first cushioning material 326A abuts the inner cover 312A, which can operate as the so-called "charging surface 312-CS" or the "given surface."

In some embodiments, the first cushioning material 326A and/or the second cushioning material 326B (or any other cushioning material mentioned herein) includes resilient foam padding that is compressible but that returns to a desired shape when uncompressed. The foam padding may include polyurethane foam, including, but not limited to, open cell foam and/or potentially even closed cell foam.

The first cushioning material 326A has a first depth 326F, and the second cushioning material 326B has a second depth 326E. These depths can vary, depending on the design. For instance, the depth range of the first depth 326F can correspond to the operating range of a "resonant wireless charger" model (i.e. a charging height operational range). There are standard chargers, as well as resonant type chargers that have a much longer Z (height) charging range, by comparison to the standard charger models. In an embodiment, the induction charger at 302 may be a resonant type wireless charger.

As an example, the depth 326F (i.e. the thickness of the foam above the charger) can be designed to be within a range between the charging height range lower limit of the charger plus some distance (e.g., 2 mm, 3 mm, 4 mm, 5 mm, 6 mm, etc.) and the charging height range upper limit minus some distance (e.g., 2 mm, 3 mm, 4 mm, 5 mm, 6 mm, etc.). For example, for a resonant wireless charger having a charging height range between 15-25 mm, the thickness of foam above the charger (i.e. depth 326F) can be between 10 mm and 25 mm, or between 12 mm and 22 mm, or between 15 mm and 20 mm. For a resonant wireless charger having a charging height range between 25-35 mm, the thickness of the foam above the charger (i.e. depth 326F) can be between 20 mm and 35 mm, or between 22 mm and 32 mm, or between 25 mm and 30 mm. If a longer distance charger is available, then the depth 326F can be modified to accommodate that longer distance as well. The depth of foam 326F can also be set based in part on the thickness of any cover (e.g., 312A and/or 312B) to be positioned between the first cushioning material and the charging location, as such total distance (from the induction charger 302 to the charging location will be within the height range limits of the particular induction charger 302.

As some additional examples, in some implementations, the first depth 326F is at least 10 millimeters (mm). Optionally, the first depth 326F may be about 15 mm. In some cases, the first depth 326F may be designed to be within a range spanning 10 mm up to 30 mm or even 35 mm, or any value therebetween. In some implementations, the first depth 326F is sufficiently deep so that the contours or edges of the induction charger are masked, hidden, or otherwise not observable from an outside view of the modular furniture assembly.

The second depth 326E may also be at least 10 mm. Optionally, the second depth 326E may be about 25 mm. Similar to the first depth 326F, however, the second depth 326E may be designed to be within a range spanning 10 mm up to 30 mm, with any value therebetween. The first depth 326F may be different from the second depth 326E or, alternatively, the first depth 326F may be the same as the second depth 326E. In some implementations, the first depth 326F is smaller than the second depth 326E while in other implementations the first depth 326F is larger than the second depth 326E.

When no force is applied to the charging surface 312-CS mentioned earlier, a combination of the first cushioning material 326A and the second cushioning material 326B (with the induction charger sandwiched therebetween) is in an uncompressed state. Alternatively, when a force 322 is applied to the charging surface 312-CS, the combination (i.e. the heights or depths of the combination of the first cushioning material 326A, the induction charger, and the second cushioning material 326B) is in a compressed state. When the combination is in the compressed state, a thickness of the combination in the compressed state is variable (e.g., as more force is applied, the thickness reduces whereas as less force is applied the thickness increases). Because the induction charger is resilient, its thickness does not change when the force is applied; instead, only the thicknesses or depths of the first cushioning material 326A and the second cushioning material 326B change.

A thickness of the combination in the compressed state can be less than 75% of the thickness of the combination when in the uncompressed state. For instance, if the thickness of the combination when in the uncompressed state is about 51 mm (e.g., the combination of the first depth 326F and the second depth 326E, with the induction charger sandwiched therebetween), then the thickness may be reduced, perhaps down to 26 mm, when in the compressed state. The thickness of the induction charger can be about 15 mm, so 15 mm out of the uncompressed 51 mm is that of the induction charger and 15 mm out of the compressed 26 mm is also that of the induction charger. Of course, different models of the induction charger may have different thicknesses, so 15 mm is just one example. Other example thicknesses of an induction charger range between about 10 mm and about 30 mm.

Optionally, the thickness of the combination when in the compressed state may be less than 50% or even less than 40% of the thickness of the combination when in the uncompressed state. In some implementations, the thickness of the combination can be between 30 mm and 60 mm when in the uncompressed state and between 15 mm and 40 mm when in the compressed state.

In some embodiments, the induction charger (i.e. the induction coil housing 302) is removably positioned within either the base frame or the transverse member frame. For example, when the inner cover 312A and the first cushioning material 326A are in the form of a removable lid, then the removable lid can be removed to provide access to the induction charger. Alternatively, the induction charger may be accessed in other ways, such as from an underneath position in which the second cushioning material 326B is removed.

Positioning the induction charger between the first cushioning material 326A and the second cushioning material 326B effectively operates to secure the induction charger in place. As a consequence, the induction charger is not permanently or even semi-permanently coupled to the base frame or the transverse member (e.g., perhaps there is no mechanical coupling, such as via use of a bolt and nut). Instead, the induction charger is secured in place from the force exerted on the induction charger from the first and second cushioning materials 326A and 326B.

In some embodiments, the first cushioning material 326A is disposed along a first side (e.g., top major planar face) of the induction charger; the second cushioning material 326B is disposed along a second side (e.g., bottom major planar face) of the induction charger; a third cushioning material 326C is disposed along a third side (e.g., perhaps a first lateral side) of the induction charger; and a fourth cushioning material 326D is disposed along a fourth side (e.g., perhaps a second lateral side) of the induction charger.

In some embodiments, the induction charger includes a flat surface that is parallel to the charging surface 312-CS. Typically, this flat surface is orientated perpendicularly to a gravity vector such that, when a mobile device (e.g., the electronic device 294) is positioned on the charging surface 312-CS, the device remains in place from gravity. Optionally, however, the charging surface 312-CS and the flat surface of the induction charger may be oriented in parallel to the gravity vector, such as extending along a vertical side of the backrest or armrest.

FIG. 31C shows how a width of the induction charger (i.e. the induction coil housing 302) is shorter than a width of the base frame. Optionally, the width of the induction charger may be some percentage value shorter than the width of the base frame. For example, the width of the induction charger may be 90%, 80%, 70%, 60%, 50%, 40%, 30%, 20%, or even 10% the width of the base frame. The width of the third cushioning material 326C, the induction charger (i.e. the induction coil housing 302), and the fourth cushioning material 326D spans the width of the base frame. These different widths may be fully customizable as well.

For example, the width of the third cushioning material 326C, the induction charger, and the fourth cushioning material 326D may each be 33% of the width of the base frame. In some implementations, the widths of the third cushioning material 326C, the induction charger, and the fourth cushioning material 326D may be 10%, 80%, and 10%, respectively. Other alternatives are available as well, such as any of the following, without limit (where the first percentage corresponds to the width of the third cushioning material 326C, the second percentage corresponds to the width of the induction charger, and the third percentage corresponds to the width of the fourth cushioning material 326D): a) 10%, 70%, 20% b) 10%, 60%, 30%, c) 10%, 50%, 40%, d) 10%, 40%, 50%, e) 10%, 30%, 60%, f) 10%, 20%, 70%, g) 10%, 10%, 80%, h) 20%, 70%, 10%, and so on an so forth, with variable values.

Accordingly, the disclosed "given surface" or "charging surface 312-CS" refers to an outer surface of either one of the inner cover 312A or the outer cover 312B. The electronic device 294 can be positioned on the charging surface 312-CS in order to be charged by the induction charger, which is proximate to the charging surface 312-CS and which is optionally positioned underneath the charging surface 312-CS by some depth measurement.

In this regard, FIGS. 31B and 31C illustrate a furniture system that provides an electrical charging system for charging an electrical device. In some embodiments, the furniture system comprises a base comprising a base frame, where the base provides a seating surface. The system also includes a transverse member providing at least one of a backrest or armrest. The transverse member comprises a transverse member frame. The system also includes a first cushioning material and a second cushioning material. The second cushioning material is mounted on the transverse member frame or the base frame. The system also includes an induction charger comprising an induction coil. Here, the induction coil is embedded between the first cushioning material and the second cushioning material so as to provide induction charging to an electrical device positioned adjacent to the first cushioning material. The induction charger is hidden so as to not be seen by a user of the furniture system. Also, the first cushioning material has a first depth, and the second cushioning material has a second depth.

In some embodiments, a charging surface is located adjacent to the induction charger. Consequently, the induction charger provides induction charging to the electrical device when the electrical device is positioned adjacent to the charging surface. The charging surface is optionally on or proximate to the first cushioning material. The charging surface is optionally on a cover mounted over the first cushioning material, such that the cover is also mounted over the induction charger. In some cases, the cover, which has the charging surface thereon, is an outer cover that covers an inner cover mounted on the first cushioning material. In some cases, the outer cover is selectively mounted on the inner cover.

In some embodiments, the furniture system further comprises an inner cover mounted on the first cushioning material and an outer cover selectively mounted on the inner cover. Consequently, the induction charger provides induction charging to the electrical device positioned adjacent to the outer cover. In some cases, the induction charger further includes an electrical cord in electrical communication with the induction coil. The electrical cord can be a pluggable cord that is plugged into an outlet. The electrical cord can be removable from the induction charger, or it can be an integrated part of the induction charger.

Optionally, the transverse member can include the transverse member frame, the first cushioning material, and the second cushioning material. In some implementations, the furniture system further comprises a cover mounted over the first cushioning material, such that the electrical device positioned on the cover is charged by the induction charger. The cover can be an outer cover that covers an inner cover mounted on the first cushioning material, and the outer cover can be selectively mounted on the inner cover. In some implementations, the second cushioning material is mounted on the transverse member frame. Optionally, positioning the induction charger between the first cushioning material and the second cushioning material secures the induction charger in place such that the induction charger is not permanently or semi-permanently coupled to the transverse member. As another option, the furniture system further comprises an inner cover mounted on the first cushioning material and an outer cover selectively mounted on the inner cover. Here, the induction charger provides induction charging to an electrical device positioned adjacent to the outer cover.

Optionally, the furniture system includes an outer cover that is selectively mounted over the first cushioning material. In some embodiments, the furniture system further comprises an inner cover mounted on the first cushioning material, and the outer cover selectively covers the inner cover.

As shown in FIG. 32, induction coil housing 302 yields downward into pocket 334 in response to force 322 and as a result of the bias provided by the spring biasing mechanism, resiliently returns to substantially the same position shown in FIG. 31A when force 322 is removed. In at least one embodiment, cushioning material 308 and padded layer 326 are separate pieces. In such an embodiment, padded layer 326 can be removed to provide access to induction charger 292 for convenient servicing and replacement. Also, as noted above, a removable outer cover may extend over cover 312 to hide padded layer 326, which is exposed through a hole 310 that extends through cover 312. Also, of note, wire 296 passes through hole 310 and is routed through frame 304 of transverse member 14.

Figure 33:
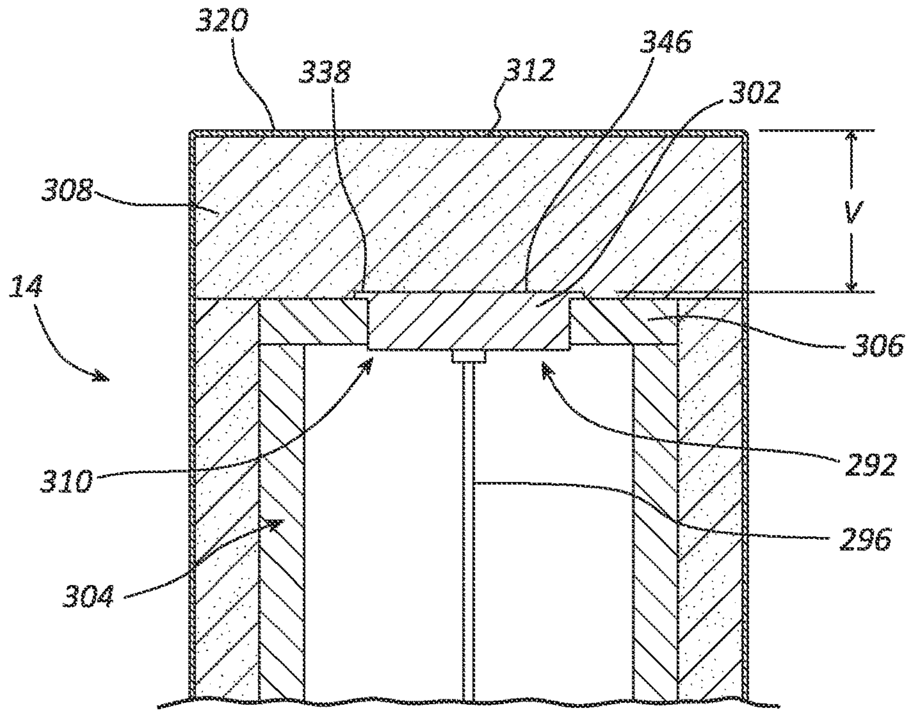
FIG. 33 illustrates a cross-sectional view of another embodiment of a furniture system including an induction charger.

FIG. 33 illustrates a cross-sectional view of another embodiment of a furniture induction charger 292 integrated into a transverse member 14. In the illustrated embodiment, induction coil housing 302 includes outwardly extending flange 338 that sits on top of upper panel 306 of frame 304 such that induction coil housing 302 is disposed at least partially within hole 310 that extends through upper panel 306. In addition, cushioning material 308 is disposed on top of upper panel 306 and extends across and above induction coil housing 308. Advantageously, cushioning material 308 protects induction coil housing 302 from any forces acting on top of transverse member 14.

Figure 34:
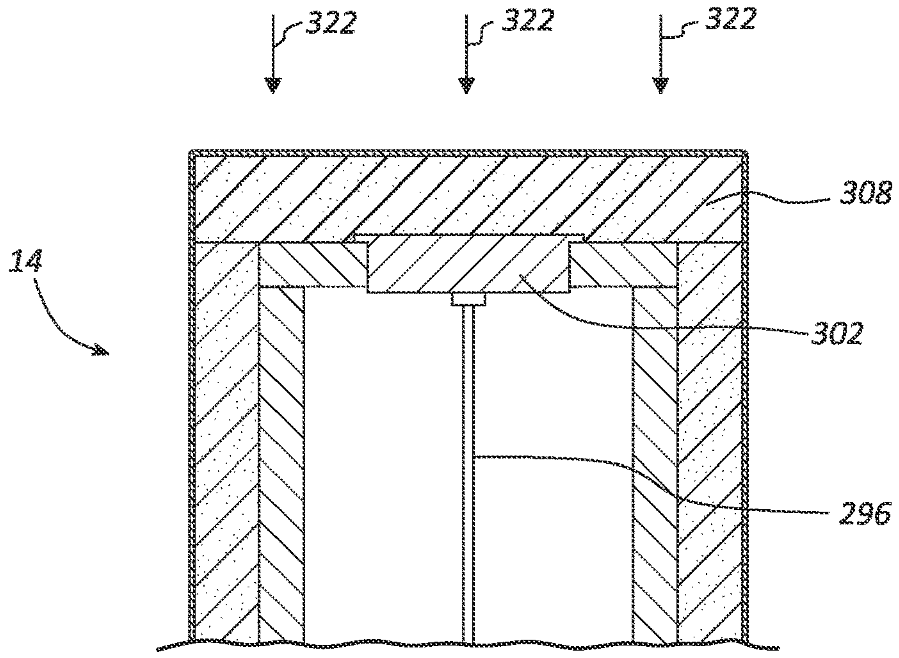
FIG. 34 illustrates a cross-section view showing the induction charger of FIG. 33 being compressed during use.

For example, as shown in FIG. 34, force 322 acting on transverse member 14 compresses cushioning material 308. In such a scenario, cushioning material 308 absorbs most if not all of force 322 so that force 322 does not impact induction coil housing 302 in a way that might cause damage. In the illustrated embodiment of FIGS. 33 and 34, the induction coil within housing 302 is capable of forming an inductive connection with an electronic device placed on upper surface 336 of cover 312, or other outer cover that may be positioned above cover 312. Thus, induction charger 292 is capable of forming an inductive connection with an electronic device placed on the top surface 320 of transverse member 14.

In the illustrated embodiment, the vertical distance V between the top surface 346 of induction coil housing 302 includes the thickness of cushioning material 308 and cover 312. In addition, and as noted above, vertical distance V may vary in one or more other embodiments, including the thickness of addition cover layer(s), such as one or more outer covers extending over cover 312, and/or various thicknesses and number of padded layers disposed above induction coil housing 302.

Figure 35:
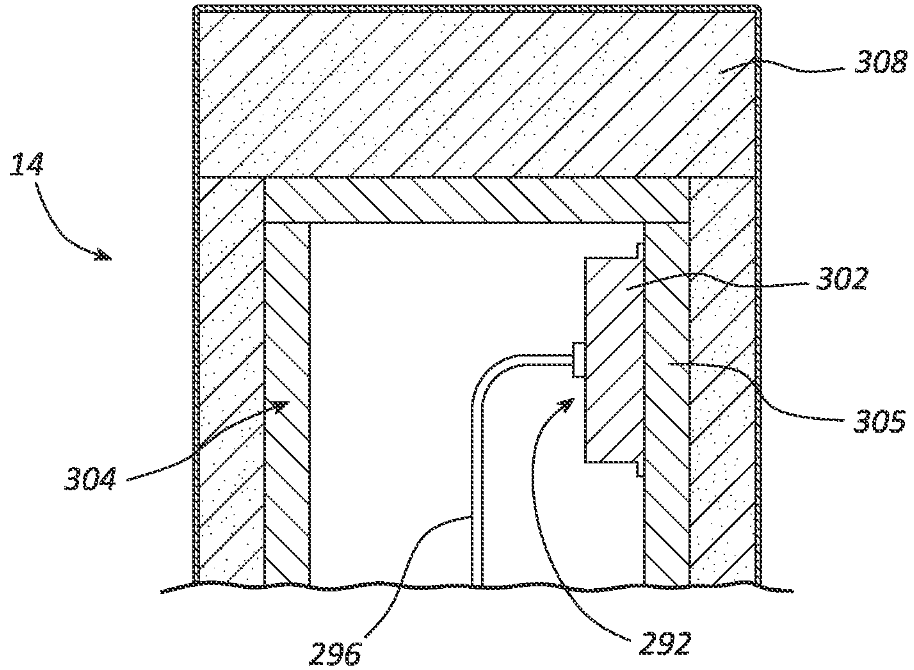
FIG. 35 illustrates a cross-sectional view of another embodiment of a furniture system including an induction charger.
Figure 36:
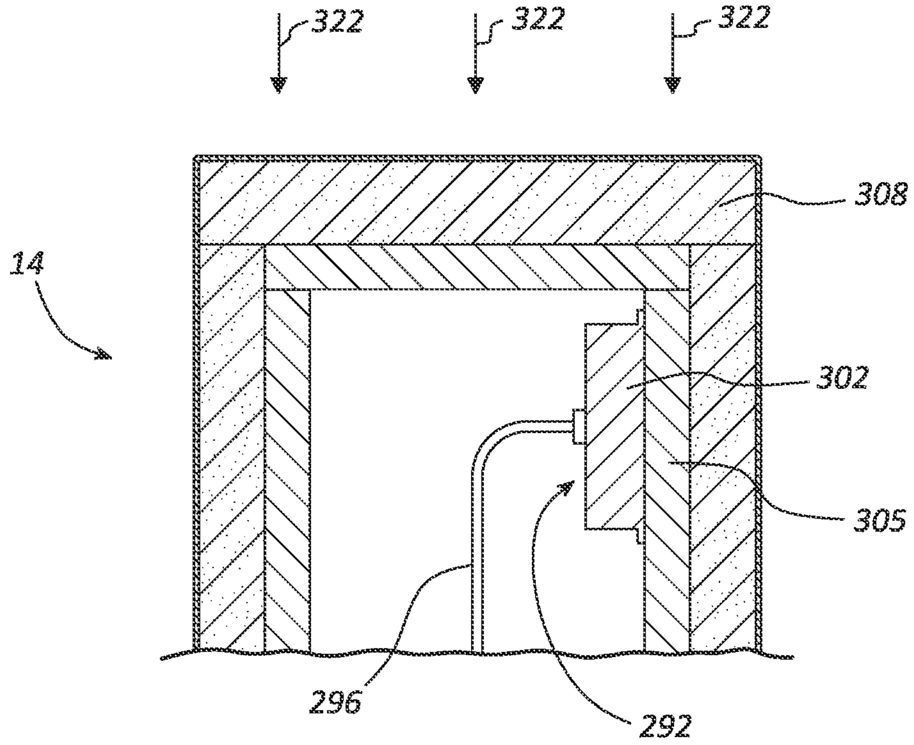
FIG. 36 illustrates a cross-section view showing the induction charger of FIG. 35 being compressed during use.

FIG. 35 illustrates a cross-sectional view of another embodiment of a furniture induction charger 292 integrated within a transverse member 14. The embodiment illustrated in FIG. 35 is similar to that shown in FIGS. 33 and 34, except that in FIG. 35, induction coil housing 302 is secured to a vertical member 305 of frame 304. In such an embodiment, force 322 acting downward on transverse member 14, as shown in FIG. 36, compresses cushioning material 308 and does not affect induction coil housing 302. Rather, cushioning material 308 and frame 304 absorb force 322.

In addition, in such an embodiment, transverse member 14 may be equipped with components configured to secure an electronic device vertically on the outside of transverse member 14, adjacent to coil housing 302 of induction charger 292. For example, such placement may be possible where the electronic device is "wedged" in place between the transverse member including induction charger 292 and an adjoining upholstered surface of e.g., another component of the furniture assembly (e.g., a base or another transverse member, e.g., as shown and described below in conjunction with FIGS. 47A-47B). In another embodiment, a "cradle" or other structure could be provided (not shown) to receive and hold the electronic device to be charged on the outside of the transverse member, opposite induction charger 292. Additionally, or alternatively, in at least one embodiment, induction charger 292 can be secured to vertical member 305 of frame 304 but oriented upward so that the induction coil is configured to charge an electronic device positioned on top of transverse member 14.

Figure 37:
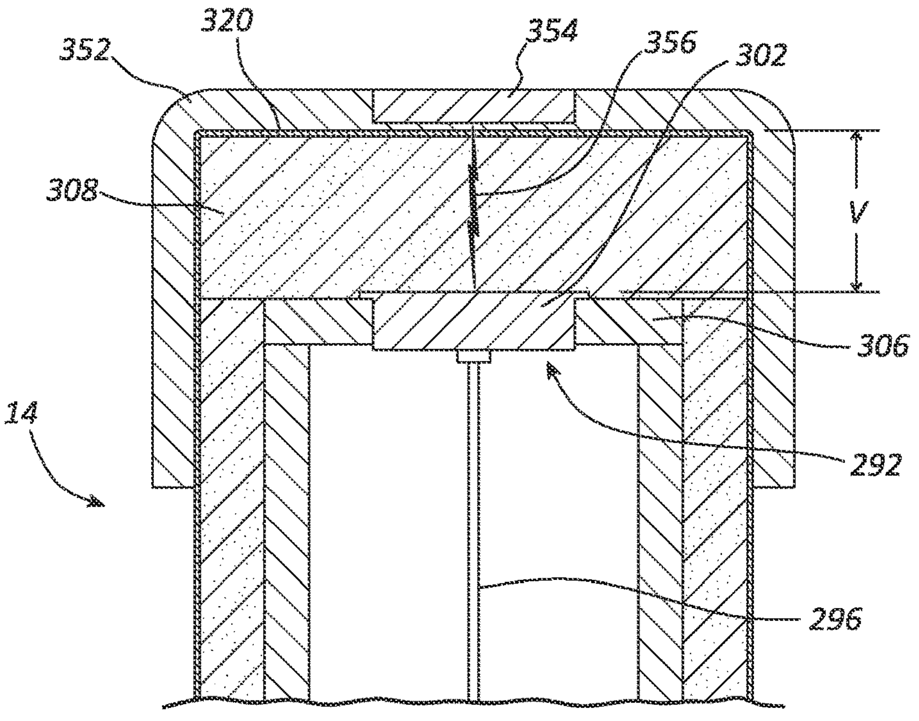
FIG. 37 illustrates a cross-sectional view of another embodiment of a furniture system including an induction charger.

FIG. 37 illustrates a cross-sectional view of another embodiment of a furniture induction charger 292 embedded within transverse member 14. The embodiment is similar to that shown in FIG. 33, in that induction coil housing 302 is disposed within upper panel 306 underneath a portion of cushioning material 308. However, in embodiments where the induction coil is not sufficiently suited to charge an electronic device placed on top surface 320 of transverse member 14, due to a vertical distance V that is too large, an additional component may be placed above such an induction coil (e.g., in coil housing 302) to amplify the generated inductive charging field. Vertical distance V may be too large for some induction coils when, for example, vertical distance V is greater than about 15 mm, or 20 mm or 25 mm, or 40 mm, or 50 mm.

For example, in at least one embodiment shown in FIG. 37, a U-shaped cuff 352 is placed over transverse member 14. In one or more other embodiments, cuff 352 may be other shapes, so long as cuff 352 is able to be placed over transverse member 14. In at least one embodiment, cuff 352 is permanently (fixedly) secured over transverse member 14. In another embodiment, cuff 352 is removably secured over transverse member 14. In any case, cuff 352 can house an extender 354 that magnifies or extends the electrical inductive charging field produced by the induction coil in housing 302. In such an embodiment, with extender 354 disposed above the induction coil in housing 302, electric field 356 is relayed by extender 354 and amplified through vertical distance V. In this way, an electronic device to be charged can be placed on top of extender 354 so that the induction coil in housing 302, which is integrated within transverse member 14, is effective through vertical distance V, even when vertical distance V is as large as 45 mm, 50 mm, or greater.

Figure 38:
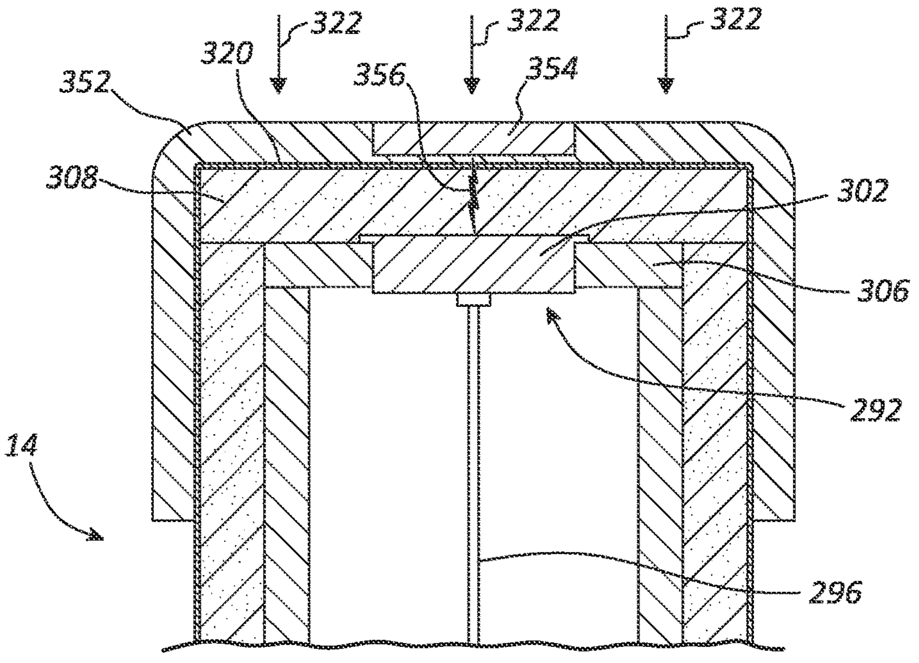
FIG. 38 illustrates a cross-section view showing the induction charger of FIG. 37 being compressed during use.

As shown in FIG. 38, when force 322 presses down onto transverse member 14, cushioning material 308 disposed on top of induction coil housing 302 and upper panel 306 compresses to absorb force 322. In the illustrated embodiment, cuff 352 and extender 356 may also absorb some of force 322. As such, cuff 352 can be formed from durable materials (e.g., wood, rigid plastic, metal, etc.) resistant to such forces. Also, extender 354 can be formed from durable materials capable of absorbing force 322 without damaging essential electronic components therein.

Figure 39:
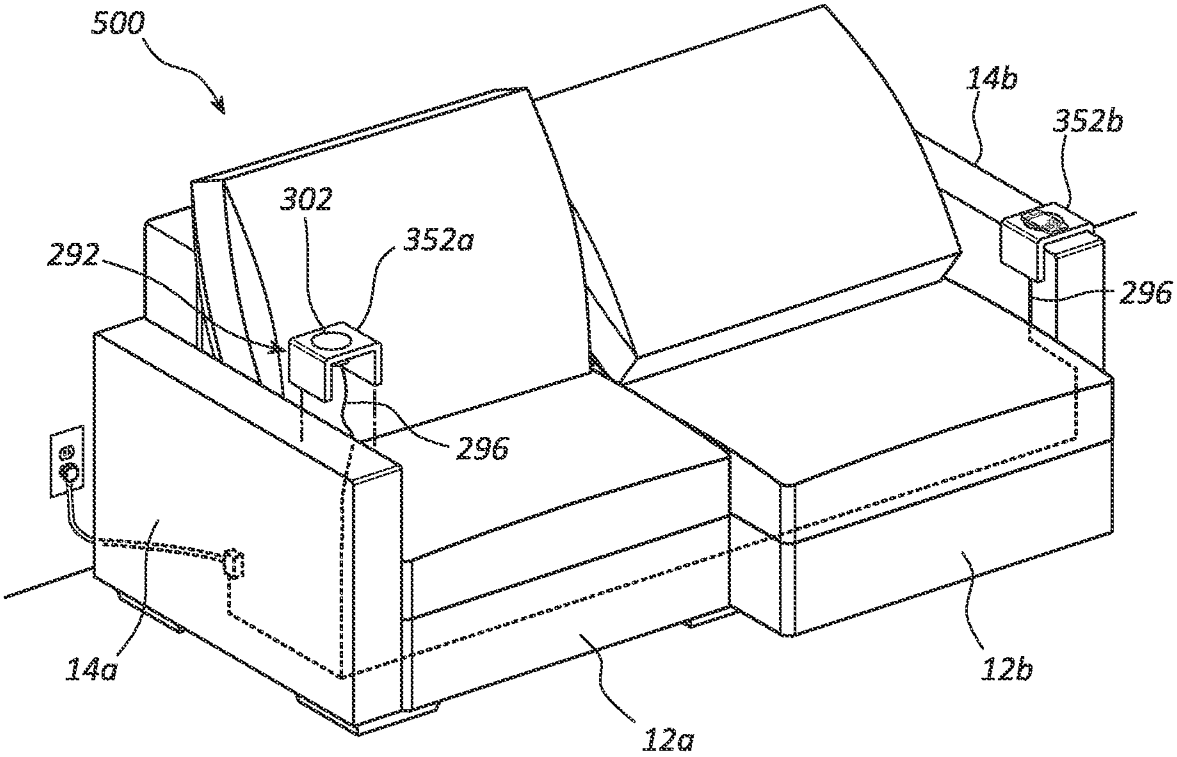
FIG. 39 illustrates a perspective view of another embodiment of a modular furniture system including an induction charger.

FIG. 39 illustrates a perspective view of another embodiment of a furniture induction charger 292 integrated within a modular furniture system 500. In the illustrated embodiment, cuffs 352*a*, 352*b* can be placed over transverse members 14*a*, 14*b*. In FIG. 39, cuff 352*a* is shown in an exploded view to illustrate that cuff 352*a* may be removable and can be lifted off transverse member 14*a*. Alternatively, or additionally, cuff 352*b* is shown situated over transverse member 14*b*, such that cuff 352*b* is in the resting position on top of transverse member 14*b*.

Figure 40:
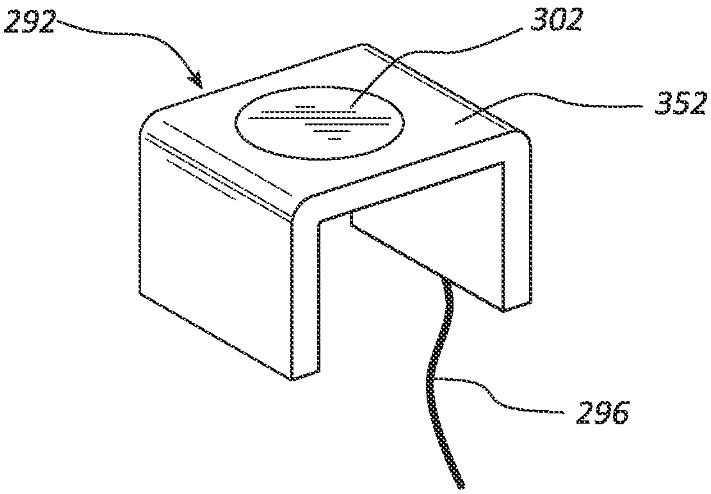
FIG. 40 illustrates a perspective view of a portion of the furniture system illustrated in FIG. 39.

FIG. 40 illustrates cuff 352 isolated from modular furniture system 500 shown in FIG. 39. Referring to both FIGS. 39 and 40, in at least one embodiment, cuff 352 houses an induction coil, at 302, such that the induction coil is not integrated into transverse member 14. Rather, in the illustrated embodiment, the induction coil housing 302 is integrated into cuff 352, and can be selectively placed over any transverse member 14*a*, 14*b* of a furniture system, such as modular furniture system 500, and at any position along the top of transverse members 14*a*, 14*b*. In another embodiment, as shown and described in conjunction with FIGS. 37-38, it may simply be an extender 354 positioned in cuff 352, rather than an induction coil (e.g., where the induction coil housing 302 does reside within transverse member 14)

Figure 41:
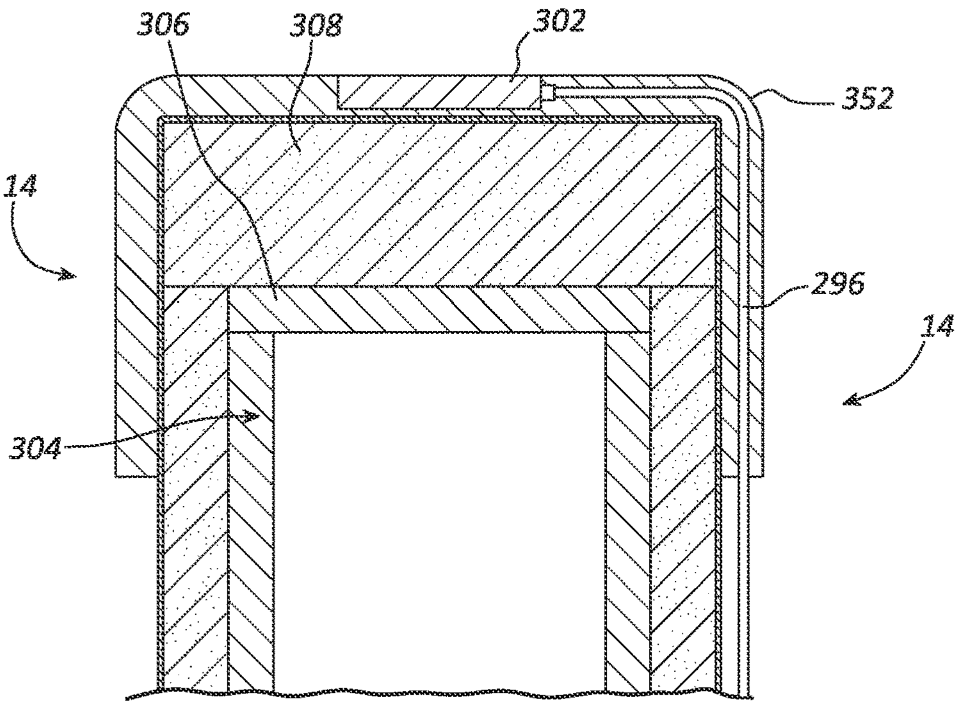
FIG. 41 illustrates a cross-sectional view of the furniture system including an induction charger illustrated in FIG. 39.

As shown in the cross-sectional view the embodiment of FIG. 41, wire 296 is shown routed through cuff 352 and may extend adjacent transverse members 14*a*, 14*b* and/or adjacent bases 12*a*, 12*b*, or even be disposed inside such furniture components, as shown in FIG. 39. Referring again to FIG. 41, cuff 352 housing an induction coil housing 302 therein is advantageously placed on top of transverse member 14 such that induction coil of housing 302 is positioned optimally for an electronic device to be placed thereon for charging. The top surface of cuff 352 could include a cut-out therein, providing a "well" into which a cellular phone, other mobile phone or other portable electronic device could be received, for charging, to better prevent it from being pushed off the transverse member, or from otherwise falling therefrom.

Figure 42:
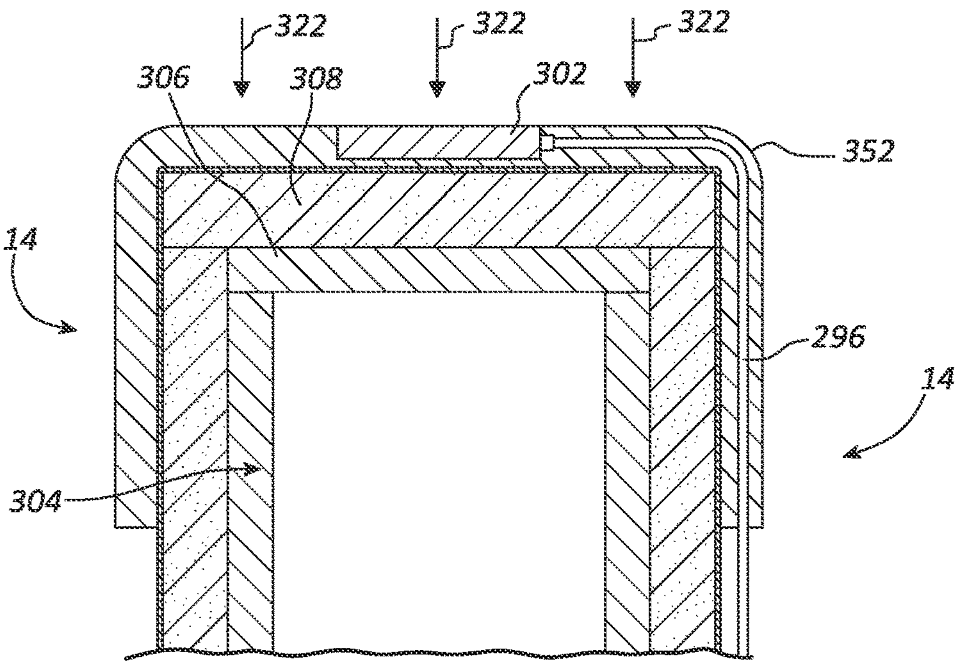
FIG. 42 illustrates a cross-section view showing the induction charger illustrated in FIG. 41 being compressed during use.

As shown in FIG. 42 transverse member 14 includes cushioning material 308 disposed between induction coil housing 302 in cuff 352 and upper panel 306 of frame 304 to absorb force 322 acting downward onto transverse member 14. Again, cushioning material 308 acts as a spring to return cuff 352 and associated induction coil housing 302 to a resting position shown in FIG. 41. Thus, in the embodiment illustrated in FIGS. 39 through 42, the induction coil including its housing 302 can be selectively placed anywhere on any of the transverse members of a furniture system while being protected from forces acting thereon, such as a person sitting on top of cuff 352 or other heavy objects being placed thereon. Induction coil housing 302 is also protected from damage due to forces acting downward thereon.

In addition to the various embodiment of induction charger 292 described herein, many of which are integrated into transverse member 14 to be hidden from view and protected from damage, certain other features of a modular furniture system 500 may be employed to provide quick and easy access to the various induction coils, or their housings 302 described herein. Such access features make it easy, for example, for a user or manufacturer to remove an induction coil and its housing 302 for repair or replacement as needed.

Figure 43:
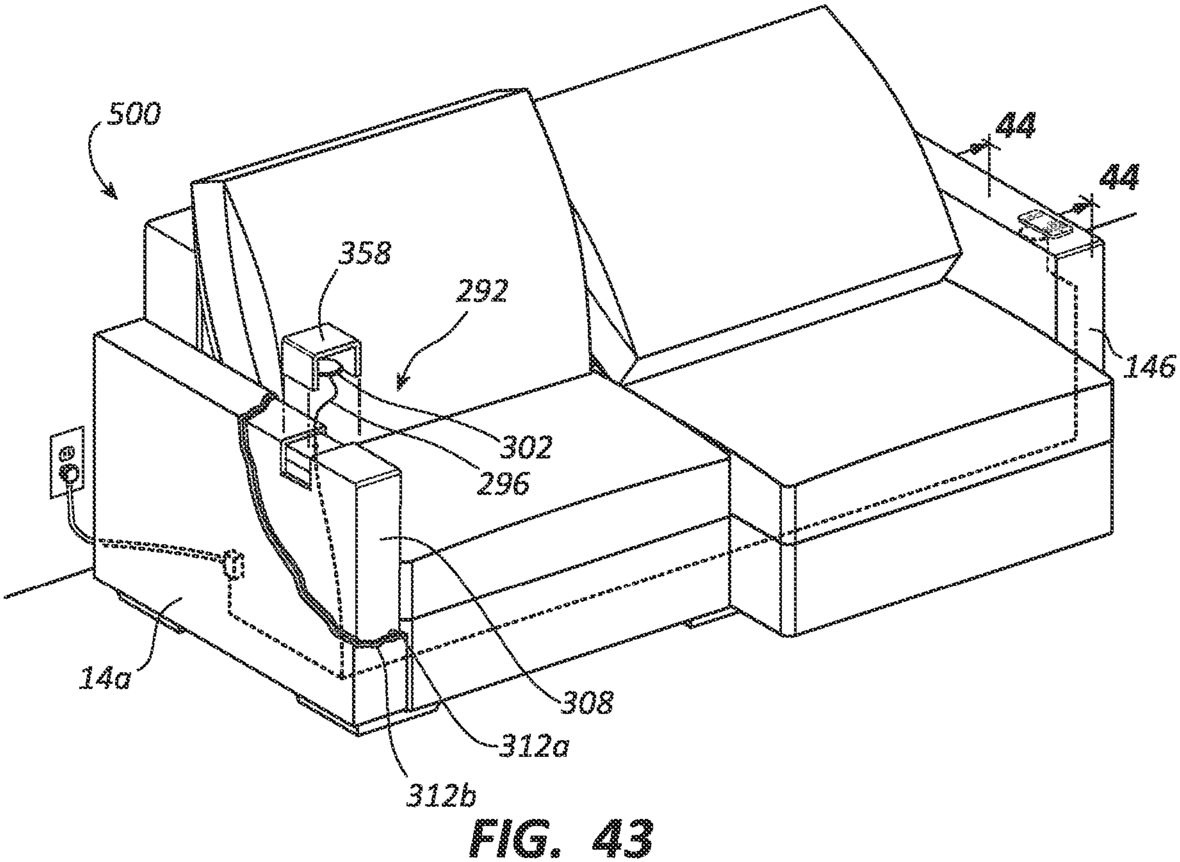
FIG. 43 illustrates another embodiment of a furniture system, in the form of a couch, having an integrated induction charger.

For example, FIG. 43 illustrates an embodiment of a modular furniture system 500, in the form of a couch, having an integrated furniture induction charger 292 and certain access features. Transverse member 14*a* is shown with portions of covers 312*a*, 312*b* cut away to illustrate inner layers of transverse member 14*a*, including cushioning material 308. Transverse member 14*a* includes a cutout portion 358 that is removable from surrounding cushioning material 308 to expose induction coil housing 302 disposed there beneath. One will appreciate that induction coil housing 302 may be any of the induction coil housings 302 described herein. Induction charger 292 shown in FIG. 43 is simplified to include only induction coil housing 302 and wire 296 for illustrative purposes.

In at least one embodiment, one or both of covers 312*a*, 312*b* are removable such that when needed, covers 312*a*, 312*b* can be removed or pulled back to expose cutout 358. Cutout 358 may be formed of material similar to surrounding cushioning material 308 of transverse member 14*a*, or cutout 358 may be formed of a dissimilar material. In any case, cutout 358 seamlessly integrates into surrounding cushioning material 308 such that when one or more covers 312*a*, 312*b* are applied over transverse member 14*a*, no seams or bulges are visible therethrough. Preferably, cutout 358 is formed using soft, padded, resilient material that acts to absorb any forces acting downward on top of transverse member 14*a* and over induction coil housing 302. In this way, cutout 358 protects the induction coil and its housing 302 from damage.

Figure 44:
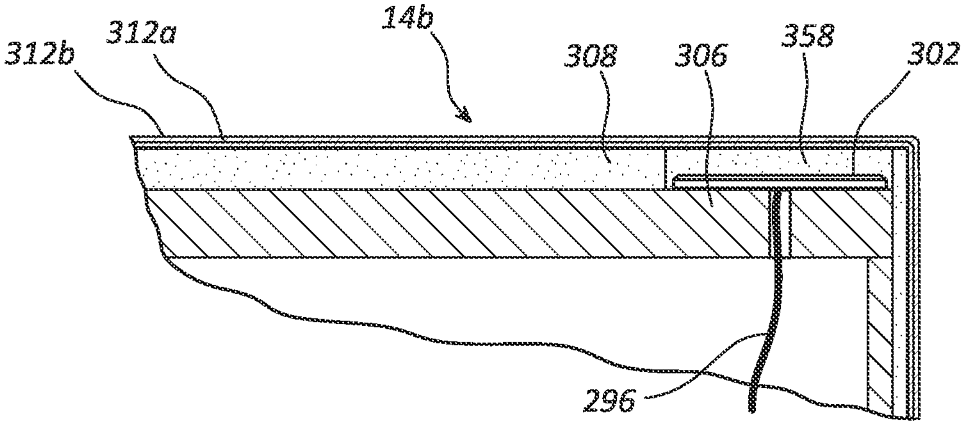
FIG. 44 illustrates a cross-sectional view of another embodiment of an induction charger integrated into a transverse member of a furniture system.

FIG. 44 illustrates a cross-sectional view of an induction charger 292 integrated into transverse member 14*b* of FIG. 43, with the viewing section taken along plane 44-44 indicated in FIG. 43. As seen, cutout 358 rests atop induction coil housing 302, which is integrated into or onto upper panel 306 of transverse member 14*b*, the cutout 358 being adjacent cushioning material 308, which is also disposed atop upper panel 306.

Figure 45:
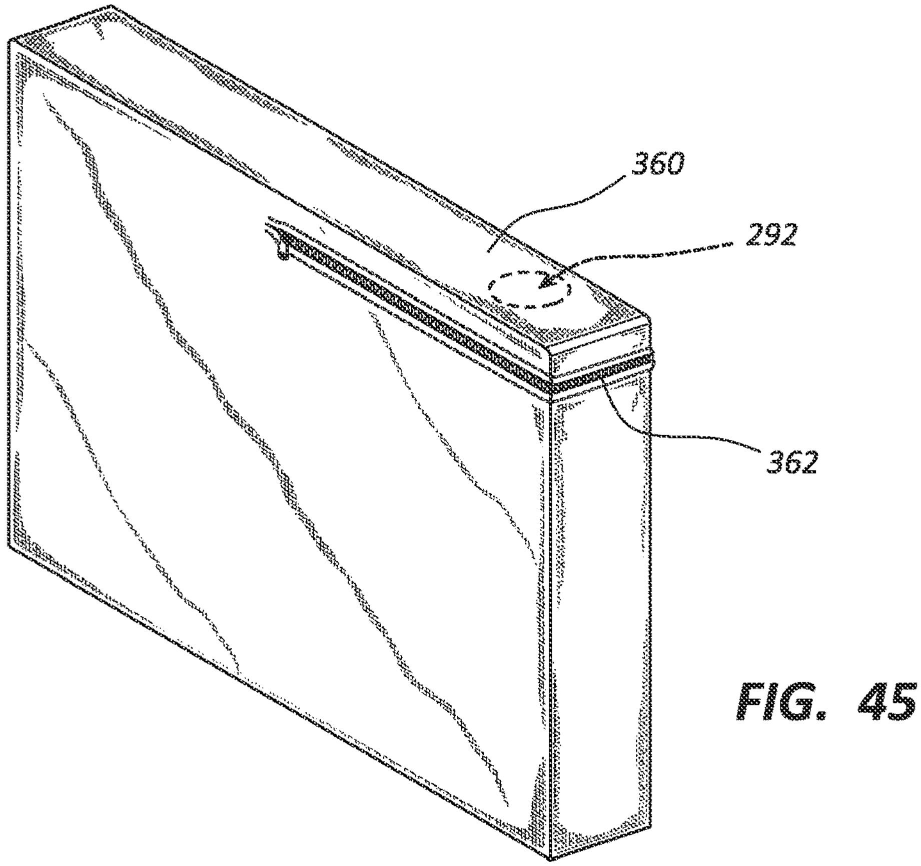
FIG. 45 illustrates an embodiment of a transverse member of a furniture system that provides easy access to an induction charger integrated therein.
Figure 46:
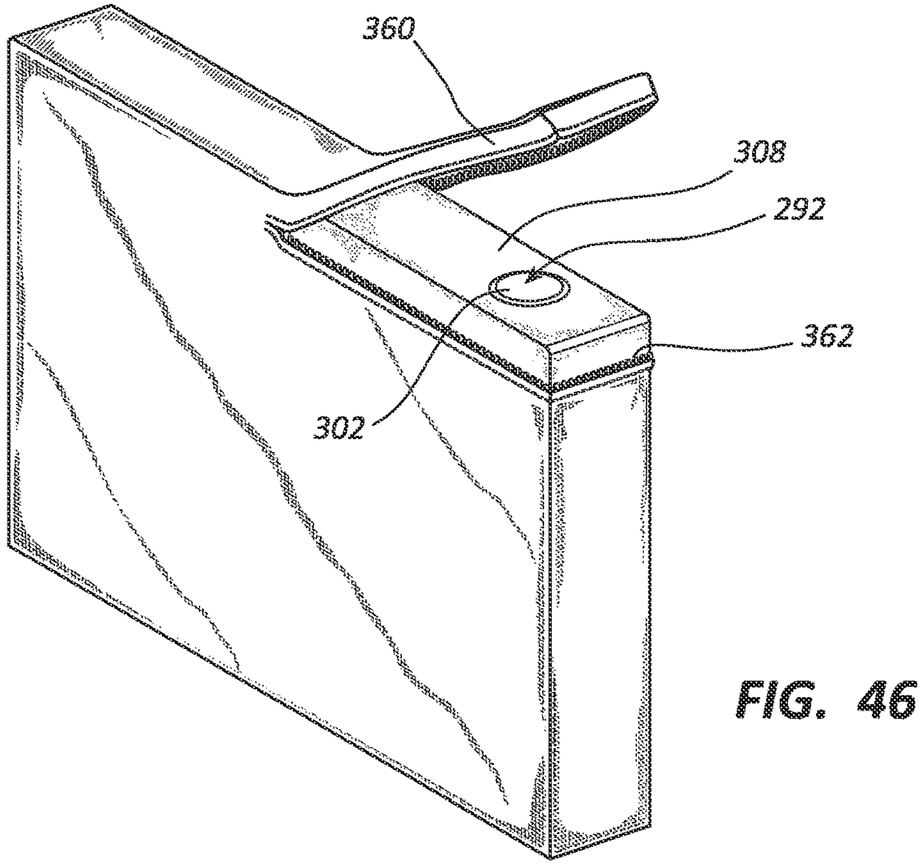
FIG. 46 illustrates an open configuration of the transverse member illustrated in FIG. 45.

Additionally, or alternatively, additional features can be added to provide easy access to induction charger 292. For example, FIGS. 45 and 46 illustrate an embodiment of a transverse member 14 that provides easy access to a furniture induction charger 292 integrated therein via a cover portion 360 that can be selectively opened and closed via a zipper 362. Cover portion 360 may also be selectively opened via other securement means, such as, but not limited to, hook-and-loop fasteners (Velcro), buttons, snaps, clips, and the like.

These access features may be combined with other access features illustrated in FIGS. 43 and 44 or employed separately with any induction charger described herein. In the illustrated embodiment of FIG. 46, cover portion 360 is unzipped and pulled up to reveal induction coil housing 302, which is exposed through cushioning material 308, as shown in previous embodiments described herein. Once cover portion 360 is lifted up and induction charger 292 revealed, induction charger 292 or components thereof (e.g., coil and coil housing 302) can be easily replaced or repaired as necessary. For example, an induction charger 292 or components thereof (e.g., the induction coil) may have a limited useful lifespan, e.g., 5-10 years, which term can be significantly shorter than the useful lifespan of the furniture component (e.g., base or transverse member) that it is embedded in, or the furniture system as a whole. Such built-in ability to access, retrieve and replace the induction charger (or a component thereof) advantageously allows a user (or servicer) to remove an induction charger or component thereof that is no longer functioning properly, and easily replace it, when needed. In an embodiment, the zippered or other selectively accessible opening can be provided in an inner cover, where a separate outer cover providing the esthetics desired by (e.g., and typically custom selected by) the user is positioned over the inner cover, hiding the zippered opening from view during typical use.

It will be appreciated that other mechanisms for selective fastening and providing selective access, other than a zipper, could be used, e.g., such as, but not limited to snaps, hook and loop (VELCRO) fasteners, buttons, clips, etc. By way of example, the inner cover 312*a* can include such a zipper or similar selectively accessible opening (i.e., such that cover 360 can be the inner cover 312*a*, where an outer cover 312*b* is provided thereover, hiding such zippered or other access location).

Figure 47A:
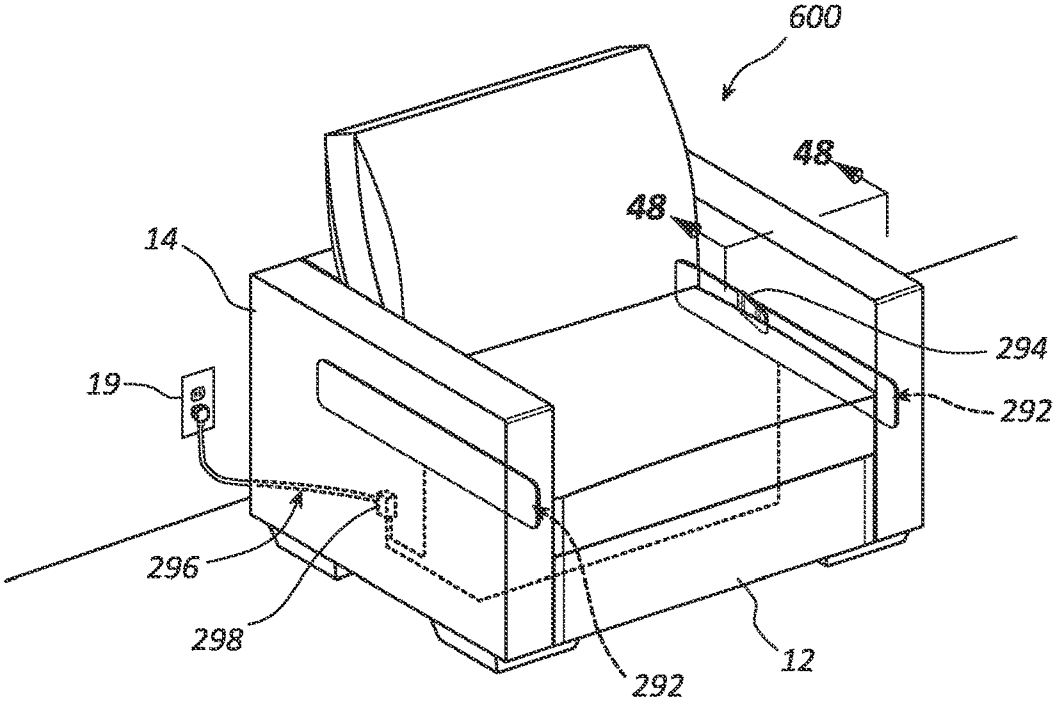
FIGS. 47A-47B illustrate another embodiment of a furniture system, having an integrated induction charger.
Figure 47B:
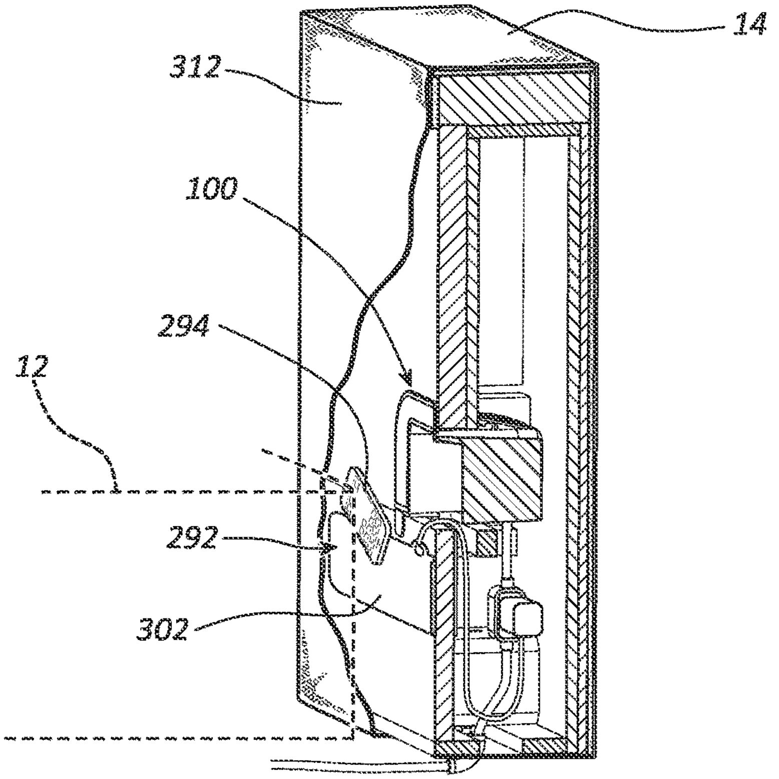

FIGS. 47A-47B illustrate another embodiment of how an induction charger can be incorporated into a furniture assembly, e.g., such as assembly 600 comprising one or more bases 12 and one or more transverse members 14. For example, each of base 12 and transverse member 14 can include a frame, with cushioning material (e.g., 308) disposed at least partially about the frame. Each of base 12 and transverse member 14 can include a cover (e.g., an upholstered fabric cover) extending over the frame and cushioning material of the base or transverse member, so that both the base(s) and transverse member(s) include upholstered surfaces. In an embodiment, the induction charger 292 can be positioned in at least one of the base or transverse member, hidden from view (e.g., in a hole in the frame and/or cushioning material). While in some embodiments such as that shown in FIGS. 20-21, it may be advantageous to position the induction charger 292 so that the device being charged is placed on a top surface of the transverse member for charging, this is not required. For example, FIGS. 47A-47B illustrate another configuration where the induction charger 292 can be positioned at another location (e.g., within the interior facing face) of transverse member 14. Various positionings may be possible, e.g., where an induction charging zone is provided at a location where the transverse member abuts another transverse member, or a base (or even at a base-base abutment location), allowing a user to place a device 294 to be inductively charged between the two abutting upholstered surfaces that abut one another. For example, FIG. 47A shows device 294 having been "wedged" into such space, between upholstered surfaces (or between an upholstered surface and a frame of a furniture component), where it is held in a friction fit between such surfaces, to inductively charge while in that position.

As shown in FIG. 47B, the induction coil and its housing 302 can be positioned behind cover 312 (e.g., an outer cover, and inner cover, or both), either above or below any provided cushioning material 308, as discussed herein. With positioning of the induction charging zone in a face of the transverse member 14 (e.g., the interior vertical face), there may be less concern of a user sitting thereon, etc. While FIG. 47B shows the induction coil housing 302 positioned within transverse member 14 it will be apparent that in another embodiment, the induction charger could be positioned in base 12. While transverse member 14 is shown as including an electrical hub 100 in the same transverse member 14 including the induction charger, it will be apparent that no hub 100 need be present.

Figure 48:
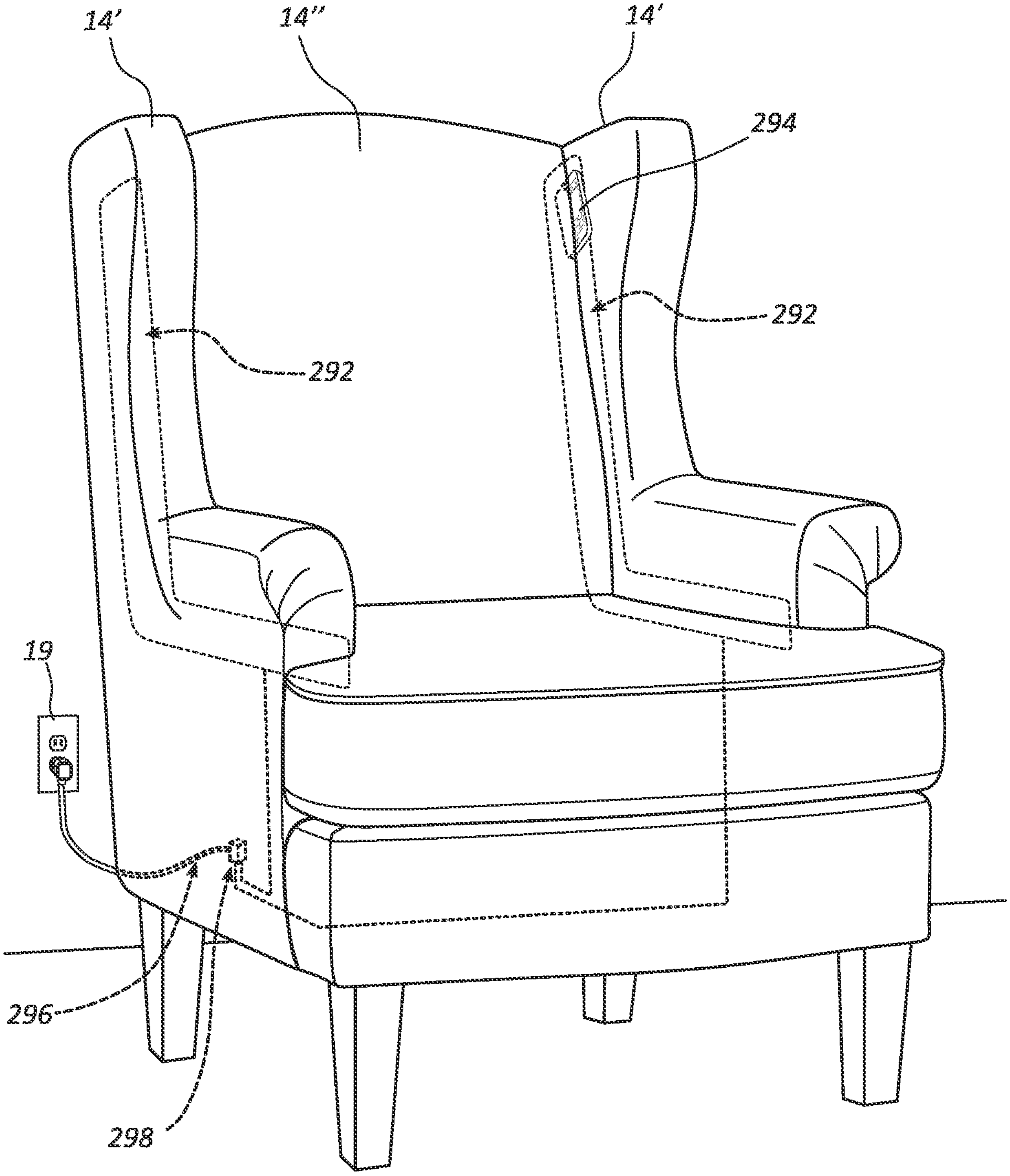
FIG. 48 illustrates another embodiment of a furniture system, having an integrated induction charger.

FIG. 48 illustrates another example of how the induction charger 292 can be positioned so as to provide an induction charging zone at a location where upholstered surfaces of adjacent furniture components abut one another (e.g., two abutting transverse members, e.g., 14' and 14" in FIG. 48). This allows the device 294 to be wirelessly charged to be "wedged" into such a cushioned space between two adjacent upholstered surfaces, e.g., held in place by a friction fit, where inductive charging can occur.

It will be apparent that the present induction chargers may be implemented in a wide variety of furniture assemblies, including e.g., modular furniture assemblies (e.g., including one or more bases, and one or more transverse members, coupleable to one another to form such modular furniture assemblies, e.g., where the components can be reconfigured to provide differently configured furniture assemblies. The systems may also be implemented in furniture systems (e.g., couches, other leisure seating, etc.) where the furniture may not necessarily be modular, but where the induction charger still provides benefits of invisibility to the eye and feel, as described herein. The systems may be implemented in various furniture systems that may include removable covers (e.g., removable upholstery covers) that can be selected by the user, e.g., swapped out etc., where the induction charger is hidden (e.g., to eye and/or touch) under the removable cover(s). In another embodiment, the charger may be embedded in any of various upholstered furniture systems, e.g., where the induction charger is hidden (to eye and/or feel) underneath the upholstery, whether such upholstery cover is removable or not. Such furniture systems may extend not only to leisure seating (e.g., couches, chairs, etc.) but also to beds, etc., that may similarly include cushioning, upholstery, etc.). For example, an induction charger may be provided in a furniture assembly that is a bed, according to any of the configurations described or illustrated herein (e.g., including, but not limited to retaining the device to be charged between upholstered surfaces, such as illustrated in FIGS. 47A-48). For example, an induction charger could be provided in a mattress or box spring. An induction charging zone could be provided to an electronic device that is selectively mounted (e.g., wedged or friction fitted) between the mattress and the box spring.

While not specifically illustrated, in any of the embodiments described herein, the exterior upholstered or other surface where inductive charging is available could be marked (i.e., marked inductive charging zone), to indicate to the user where the induction charger is disposed, hidden under the aesthetic covering layers of the furniture component into which it is mounted. In another embodiment, no such markings may be provided.

While many of the illustrated embodiments show the induction charger in a transverse member, it will be appreciated that any of the embodiments could be modified to position the induction charger in a base, or even another component of a furniture assembly, whether modular or not. It will be apparent that in any of the embodiments described herein, the furniture assembly into which the induction charger is incorporated can be a modular furniture assembly, e.g., such as any of those described in various of Applicant's previous patents and applications. In other embodiments, the furniture assembly need not be modular in nature.

As used herein, use of the term "between," particularly in the context of described numerical ranges, includes the endpoints described for such ranges. For example, description of a range between 15 mm and 20 mm includes both 15 mm and 20 mm.

Following are some further example embodiments of the invention. These are presented only by way of example and are not intended to limit the scope of the invention in any way.

Embodiment 1. A furniture system having an electrical charging system for charging an electrical device, the furniture system comprising a base having a frame, the base providing a seating surface; a transverse member providing at least one of a backrest or armrest, the transverse member comprising a frame; a first and second cushioning material, the second cushioning material being mounted on the transverse member frame or the base frame, and an induction charger comprising an induction coil, the induction coil embedded between the first and second cushioning materials so as to provide induction charging to an electrical device positioned adjacent to the first cushioning material, wherein the induction charger is hidden so as to not be seen or felt by a user of the furniture system, wherein a vertical distance from a top surface of the induction charger to the given surface of the base or transverse member is at least 10 mm.

Embodiment 2. The system of embodiment 1, or any other embodiments herein wherein the vertical distance is at least 12 mm.

Embodiment 3. The system of any of embodiments 1-2, or any other embodiments herein, wherein the vertical distance is at least 15 mm.

Embodiment 4. The system of any of embodiments 1-3, or any other embodiments herein, wherein the transverse member frame is at least partially covered by cushioning material, the transverse member further including an upholstery cover positioned over the cushioning material, the induction charger being hidden beneath the upholstery cover and the cushioning material of the transverse member.

Embodiment 5. The system of any of embodiments 1-4, or any other embodiments herein, wherein the transverse member frame is at least partially covered by cushioning material, the transverse member further including a cover positioned over the cushioning material, with a zippered opening providing access through the cover, the induction charger being hidden beneath the cover under the zippered opening of the transverse member, the induction charger being accessible for removal and/or replacement through the zippered opening.

Embodiment 6. The system of any of embodiments 1-5, or any other embodiments herein, wherein the furniture system is a modular furniture system.

Embodiment 7. The system of any of embodiments 1-6, or any other embodiments herein, wherein the furniture system is an upholstered furniture system.

Embodiment 8. The system of any of embodiments 1-7, or any other embodiments herein, wherein the furniture system includes removable covers for positioning over the base and transverse member, the induction charger being hidden beneath the removable cover.

Embodiment 9. A modular furniture system having an electrical charging system for charging an electrical device, the modular furniture system comprising a transverse member comprising a frame, the frame having a panel; an induction charger assembly; and a spring biasing mechanism for biasing the induction charger relative to the frame of the transverse member, such that, in the absence of a force, a portion of the induction charger is spring biased away from the frame of the transverse member.

Embodiment 10. The system of embodiment 9, or any other embodiments herein, wherein the panel of the frame is an upper panel, and wherein the portion of the induction charger that is spring biased away from the frame is spring biased above the upper panel.

Embodiment 11. The system of any of embodiments 9-10, or any other embodiments herein, wherein the spring biasing mechanism comprises a coil spring.

Embodiment 12. The system of any of embodiments 9-11 or any other embodiments herein, wherein the panel of the frame is an upper panel, the transverse member further comprising a cushioning material disposed on the upper panel of the frame, wherein the portion of the induction charger biased away from the frame is configured to move through the cushioning material.

Embodiment 13. The system of any of embodiments 9-12 or any other embodiments herein, further comprising a cushioning material disposed above the upper panel of the frame, wherein the induction charger is embedded within the cushioning material.

Embodiment 14. The system of any of embodiments 9-13 or any other embodiments herein, wherein the upper panel has a hole extending therethrough; and the induction charger is mounted within the hole and is selectively pushed downwardly relative to the upper panel of the frame when a downward force is exerted on the induction charger.

Embodiment 15. The system of any of embodiments 9-14 or any other embodiments herein, wherein the spring biasing mechanism comprises a cushioning material.

Embodiment 16. The system of embodiment 15 or any other embodiments herein, wherein the induction charger assembly comprises a housing, the housing having an outwardly extending flange; and an induction coil disposed within a housing, wherein the outwardly extending flange is secured to the cushioning material such that a portion of the cushioning material is disposed between the outwardly extending flange and the upper panel.

Embodiment 17. The system of any of embodiments 9-16 or any other embodiments herein, wherein the panel is an upper panel, and has a hole extending therethrough; and the induction charger assembly comprises a receptacle secured to the upper panel within the hole; an induction charger housing movably coupled to the receptacle such that the housing moves relative to the receptacle when a force is applied to the induction charger housing; and an induction coil within the induction charger housing.

Embodiment 18. The system of embodiment 17 or any other embodiments herein, wherein the induction charger assembly further comprises an electrical cord in electrical communication with the induction coil.

Embodiment 19. The system of embodiments 17 or any other embodiments herein, wherein the spring biasing mechanism comprises a coil spring.

Embodiment 20. The system of embodiment 17 or any other embodiments herein, wherein the spring biasing mechanism comprises a compressible fluid spring.

Embodiment 21. The system of any of embodiments 9-20 or any other embodiments herein, the transverse member further comprising a cover disposed over a cushioning material.

Embodiment 22. The system of embodiment 21 or any other embodiments herein, wherein the induction charger is hidden from view beneath a cover.

Embodiment 23. A furniture system having an electrical charging system for charging an electrical device, the furniture system comprising a transverse member having a frame that includes an upper panel; and an induction charger assembly coupled to the upper panel of the transverse member, the induction charger assembly comprising a receptacle mounted to the upper panel of the frame; an induction charger movably mounted within the receptacle; and a spring biasing mechanism that biases the induction charger with respect to the frame of the transverse member.

Embodiment 24. The system of embodiment 23 or any other embodiments herein, wherein the transverse member further comprises a cushioning material disposed on the upper panel of the frame, wherein the induction charger assembly is at least partially embedded within the cushioning material; and the spring biasing mechanism comprises a coil spring.

Embodiment 25. The system of any of embodiments 23-24 or any other embodiments herein, wherein the transverse member further comprises a cover disposed on the cushioning material; and the induction charger is biased such that a vertical distance from a top surface of the induction charger to an upper surface of the transverse member is at least 10 mm.

Embodiment 26. The system of embodiment 25 or any other embodiments herein, wherein the vertical distance is at least 12 mm.

Embodiment 27. The system of any of embodiments 23-26 or any other embodiments herein, wherein the induction charger is configured to elastically travel downwardly relative to the receptacle in response to a downward force on the induction charger.

Embodiment 28. The system of embodiments 25 or any other embodiments herein, wherein the cover comprises an access hole for accessing the induction charger.

Embodiment 29. The system of embodiment 27 or any other embodiments herein, wherein an upper surface of the cushioning material of the transverse member is flush with an upper surface of the induction charger in the absence of a downward pressing force on the induction charger.

Embodiment 30. A furniture system having an electrical charging system for charging an electrical device, the furniture system comprising a transverse member comprising a frame having an upper panel; a cushioning material disposed on the upper panel, wherein a hole extends through the upper panel and at least partially through the cushioning material; and a cover extending over the cushioning material; and an induction charger assembly connected to the transverse member, the induction charger assembly being disposed below the cover, and at least a portion of the induction charger assembly being disposed within the cushioning material, wherein the induction charger assembly comprises a receptacle coupled to the frame; an induction charger movably mounted within the receptacle; and a spring biasing mechanism configured to bias the induction charger relative to the receptacle; wherein the induction charger is configured to elastically move down within the receptacle when a force presses down on the induction charger.

Embodiment 31. The system of embodiment 30 or any other embodiments herein, wherein the spring comprises a coil spring.

Embodiment 32. The system of any of embodiments 30-31 or any other embodiments herein, wherein the induction charger comprises a housing movably secured at least partially within the receptacle via the spring biasing mechanism; and an induction coil in the housing, wherein the induction charger assembly further comprises an electrical cord in electrical communication with the induction coil.

Embodiment 33. The system of any of embodiments 30-32 or any other embodiments herein, wherein induction charger assembly is mounted on the upper panel of the frame.

Embodiment 34. A modular furniture system having an electrical charging system for charging an electrical device, the modular furniture system comprising a transverse member comprising a frame, the frame having a panel; an induction charger assembly; and a spring biasing mechanism for biasing the induction charger relative to the frame of the transverse member, such that, in the absence of a force, a portion of the induction charger is spring biased away from the frame of the transverse member; and wherein the spring biasing mechanism is a cushioning material disposed on the panel of the frame, wherein the induction charger is embedded within the cushioning material.

Embodiment 35. The system of embodiment 34 or any other embodiments herein, wherein the induction charger assembly comprises a housing, the housing having an outwardly extending flange; and an induction coil disposed within a housing, wherein the outwardly extending flange is secured to the cushioning material such that a portion of the cushioning material is disposed between the outwardly extending flange and the panel.

Embodiment 36. The system of any of embodiments 34-35 or any other embodiments herein, wherein the panel has a hole extending therethrough; and the induction charger assembly comprises a receptacle secured to the panel within the hole; an induction charger housing movably coupled to the receptacle such that the housing moves relative to the receptacle when a force is applied to the induction charger housing; and an induction coil within the induction charger housing.

Embodiment 37. The system of embodiment 36 or any other embodiments herein, the transverse member further comprising a cover disposed over the cushioning material.

Embodiment 38. The system of embodiment 37 or any other embodiments herein, wherein the induction charger is hidden from view beneath the cover.

Embodiment 39. An induction charger for use in a furniture system comprising a base providing a seating surface; and a transverse member providing at least one of an armrest or a backrest, wherein the base and transverse member each comprise a frame, with cushioning material disposed at least partially about the frame, wherein each of the base and transverse member include an upholstered cover extending thereover, such that both the base and transverse member have upholstered surfaces, the induction charger comprising an induction charger positioned within at least one of the base or transverse member such that the induction charger is hidden from view, under an upholstered cover of at least one of the base or transverse member, wherein the induction charger is seated within a hole formed into at least one of the frame or the cushioning material of the transverse member or the base which includes the induction charger, the induction charger being positioned at a location where the transverse member or the base abut another transverse member or base, such that the furniture system includes an induction charging zone at the location where such abutment occurs, allowing a user to place a device to be inductively charged between the two abutting upholstered surfaces.

Embodiment 40. The system of embodiment 39 or any other embodiments herein, wherein the induction charger comprises an induction coil in a induction charger housing.

Embodiment 41. The system of any of embodiments 39-40 or any other embodiments herein, wherein the induction charger is positioned within the transverse member.

Embodiment 42. The system of any of embodiments 39-41 or any other embodiments herein, wherein the abutting upholstered surfaces are configured to hold the device to be inductively charged therebetween in a friction fit.

Embodiment 43. The system of any of embodiments 39-42 or any other embodiments herein, wherein the furniture system is a modular furniture system, where the base and transverse member are selectively coupleable to one another.

Embodiment 44. The system of any of embodiments 39-43 or any other embodiments herein, wherein the device to be charged is a mobile phone.

Embodiment 45. A furniture system having an induction charging zone, the furniture system comprising: a base providing a seating surface; a transverse member providing at least one of an armrest or a backrest, wherein the base and transverse member each comprise a frame, with cushioning material disposed at least partially about the frame, wherein each of the base and transverse member include an upholstered cover extending thereover, such that both the base and transverse member have upholstered surfaces; and an induction charger positioned within at least one of the base or transverse member such that the induction charger is hidden from view, under an upholstered cover of at least one of the base or transverse member, wherein the induction charger is seated within a hole formed into at least one of the frame or the cushioning material of the transverse member or the base which includes the induction charger, the induction charger being positioned at a location where the transverse member or the base abut another transverse member or base, such that the furniture system includes an induction charging zone at the location where such abutment occurs, allowing a user to place a device to be inductively charged between the two abutting upholstered surfaces.

Embodiment 46. The system of embodiment 45 or any other embodiments herein, wherein the abutting upholstered surfaces are configured to hold the device to be inductively charged therebetween in a friction fit.

Embodiment 47. The system of any of embodiments 45-46 or any other embodiments herein, wherein the furniture system is a modular furniture system, where the base and transverse member are selectively coupleable to one another.

Embodiment 48. The system of any of embodiments 45-47 or any other embodiments herein, wherein the induction charging zone is formed by a mattress on top of a box spring such that the device to be charged is selectively mounted between the mattress and the box spring.

Embodiment 49. The system of any of embodiments 45-48 or any other embodiments herein, wherein the induction charging zone is formed by an armrest adjacent to a backrest, such that the device to be charged is selectively mounted between the armrest and the backrest.

Embodiment 50. A furniture system that provides an electrical charging system for charging an electrical device, the furniture system comprising a base comprising a base frame, the base providing a seating surface; a transverse member providing at least one of a backrest or armrest, the transverse member comprising a transverse member frame; a first cushioning material and a second cushioning material, the second cushioning material being mounted on the transverse member frame or the base frame; and an induction charger comprising an induction coil, the induction coil embedded between the first cushioning material and the second cushioning material so as to provide induction charging to an electrical device positioned adjacent to the first cushioning material, wherein the induction charger is hidden so as to not be seen by a user of the furniture system.

Embodiment 51. The furniture system of embodiment 50, wherein a charging surface is located adjacent to the induction charger such that the induction charger provides induction charging to the electrical device when the electrical device is positioned adjacent to the charging surface.

Embodiment 52. The furniture system of embodiment 51, wherein the charging surface is on or proximate to the first cushioning material.

Embodiment 53. The furniture system of embodiment 52, wherein the charging surface is on a cover mounted over the first cushioning material, such that the cover is also mounted over the induction charger.

Embodiment 54. The furniture system of embodiment 53, wherein the cover, which has the charging surface thereon, is an outer cover that covers an inner cover mounted on the first cushioning material.

Embodiment 55. The furniture system of embodiment 54, wherein the outer cover is selectively mounted on the inner cover.

Embodiment 56. The furniture system of embodiment 50, wherein the furniture system further comprises an inner cover mounted on the first cushioning material and an outer cover selectively mounted on the inner cover, such that the induction charger provides induction charging to the electrical device positioned adjacent to the outer cover.

Embodiment 57. The furniture system of embodiment 50, wherein the first cushioning material has a first depth, and the second cushioning material has a second depth, and wherein the second depth of the second cushioning material is at least 10 mm.

Embodiment 58. The furniture system of embodiment 50, wherein, when no force is applied to the charging surface, a combination of at least the first cushioning material and the second cushioning material is in an uncompressed state, wherein, when a force is applied to the charging surface, the combination is in a compressed state, and wherein, when the combination is in the compressed state, a thickness of the combination in the compressed state is variable and may be less than 75% of a thickness of the combination when in the uncompressed state.

Embodiment 59. The furniture system of embodiment 50, wherein the first cushioning material has a first depth, and the second cushioning material has a second depth, and wherein the first depth is different than the second depth.

Embodiment 60. The furniture system of embodiment 50, wherein the first cushioning material has a first depth, and the second cushioning material has a second depth, and wherein the first depth is the same as the second depth.

Embodiment 61. The furniture system of embodiment 50, wherein the first cushioning material has a charging surface on which the electrical device is placed.

Embodiment 62. The furniture system of embodiment 50, wherein the first cushioning material is separate from and abuts a cover that covers the first cushioning material.

Embodiment 63. The furniture system of embodiment 50, wherein the first cushioning material has a first depth, and the second cushioning material has a second depth, and wherein the first depth is smaller than the second depth.

Embodiment 64. The furniture system of embodiment 50, wherein the first cushioning material has a first depth, and the second cushioning material has a second depth, and wherein the first depth is larger than the second depth.

Embodiment 65. The furniture system of embodiment 50, wherein the first cushioning material comprises foam padding.

Embodiment 66. The furniture system of embodiment 65, wherein the second cushioning material also comprises foam padding.

Embodiment 67. The furniture system of embodiment 50, wherein the induction charger further comprises an electrical cord in electrical communication with the induction coil.

Embodiment 68. A furniture system that provides an electrical charging system for charging an electrical device, the furniture system comprising: a base comprising a base frame, the base providing a seating surface; a transverse member providing at least one of a backrest or armrest, the transverse member comprising a transverse member frame, a first cushioning material, and a second cushioning material; and an induction charger comprising an induction coil, the induction coil embedded between the first cushioning material and the second cushioning material so as to provide induction charging to an electrical device positioned adjacent to the first cushioning material, wherein the induction charger is hidden so as to not be seen by a user of the furniture system.

Embodiment 69. The furniture system of embodiment 68, wherein the furniture system further comprises a cover mounted over the first cushioning material, such that the electrical device positioned on the cover is charged by the induction charger.

Embodiment 70. The furniture system of embodiment 69, wherein the cover is an outer cover that covers an inner cover mounted on the first cushioning material, the outer cover being selectively mounted on the inner cover.

Embodiment 71. The furniture system of embodiment 68, wherein the second cushioning material is mounted on the transverse member frame.

Embodiment 72. The furniture system of embodiment 68, wherein positioning the induction charger between the first cushioning material and the second cushioning material secures the induction charger in place such that the induction charger is not permanently or semi-permanently coupled to the transverse member.

Embodiment 73. The furniture system of embodiment 68, wherein the furniture system further comprises an inner cover mounted on the first cushioning material and an outer cover selectively mounted on the inner cover, such that the induction charger provides induction charging to the electrical device positioned adjacent to the outer cover.

Embodiment 74. A furniture system that provides an electrical charging system for charging an electrical device, the furniture system comprising: a base comprising a base frame, the base providing a seating surface; a transverse member providing at least one of a backrest or armrest, the transverse member comprising a transverse member frame; a first cushioning material and a second cushioning material, the first cushioning material and the second cushioning material being mounted on the transverse member frame or the base frame; and an induction charger comprising an induction coil, the induction coil embedded between the first cushioning material and the second cushioning material so as to provide induction charging to an electrical device positioned adjacent to the first cushioning material, wherein the induction charger is hidden so as to not be seen by a user of the furniture system, and wherein the first cushioning material is disposed along a first side of the induction charger, the second cushioning material is disposed along a second side of the induction charger, a third cushioning material is disposed along a third side of the induction charger, and a fourth cushioning material is disposed along a fourth side of the induction charger.

Embodiment 75. The furniture system of embodiment 74, wherein a charging surface is located adjacent to the induction charger such that the induction charger provides induction charging to the electrical device when the electrical device is positioned adjacent to the charging surface.

Embodiment 76. The furniture system of embodiment 75, wherein the first cushioning material is separate from the charging surface.

Embodiment 77. The furniture system of embodiment 75, wherein the first cushioning material is integral with the charging surface.

Embodiment 78. The furniture system of embodiment 75, wherein the first cushioning material is below the charging surface.

Embodiment 79. The furniture system of embodiment 75, wherein the charging surface is on an outer cover comprising polyester, chenille, tweed, linen, velvet, leather, polyester linen, cotton, cotton blend, denim, twill, faux fur, or leather material.

Embodiment 80: The furniture system of embodiment 75, wherein the charging surface is on a cover that is selectively mounted over the first cushioning material.

Embodiment 81: The furniture system of embodiment 75, wherein the first cushioning material is positioned proximate to the charging surface, and wherein the first cushioning material is within at least 30 mm of the charging surface.

Embodiment 82: The furniture system of embodiment 75, wherein the charging surface is an outer surface of an outer cover mounted over the base frame or the transverse member frame.

Embodiment 83: The furniture system of embodiment 82, wherein an inner cover is underneath the outer cover, and wherein the first cushioning material is adjacent to the inner cover.

Embodiment 84: The furniture system of embodiment 75, wherein the first cushioning material forms a removable lid that, when removed from the furniture system, provides access to the induction charger.

Embodiment 85: A furniture system that provides an electrical charging system for charging an electrical device, the furniture system comprising: a base comprising a base frame, the base providing a seating surface; a transverse member providing at least one of a backrest or armrest, the transverse member comprising a transverse member frame, a first cushioning material, and a second cushioning material, the second cushioning material mounted on the transverse member frame; an outer cover that is selectively mounted over the first cushioning material; and an induction charger comprising an induction coil, the induction coil embedded between the first cushioning material and the second cushioning material so as to provide induction charging to an electrical device positioned on the outer cover, wherein the induction charger is hidden so as to not be seen by a user of the furniture system.

Embodiment 86: The furniture system of embodiment 85, wherein the furniture system further comprises an inner cover mounted on the first cushioning material, the outer cover selectively covering the inner cover.

Embodiment 87: The furniture system of embodiment 85, wherein a depth of the first cushioning material is dependent on a charging height operational range of the induction charger, and wherein the depth is at least 10 mm.

It will be appreciated that the scope of the present disclosure extends to rewriting any of the claims to depend from any other claim, to include multiple dependencies from any combination of other claims, and/or to combine multiple claims together. Such also extends to the embodiments as described in the Summary section, as well as the Detailed Description section. The scope of the present disclosure also extends to inserting and/or removing any combination of features from any claim or described embodiment, for insertion into another claim or embodiment, or drafting of a new claim including any combination of such features from any other claim(s) or embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A furniture system that provides an electrical charging system for charging an electrical device, the furniture system comprising:
   - a base comprising a base frame, the base providing a seating surface;
   - a transverse member forming a backrest or an armrest secured to the base, the transverse member comprising a transverse member frame, a first cushioning material, a second cushioning material, a third cushioning material, and a fourth cushioning material, the second cushioning material being disposed adjacent to the transverse member frame; and
   - an induction charger comprising an induction coil, the induction coil being disposed between the first cushioning material and the second cushioning material so that when the seating surface is horizontally disposed, at least a portion of the first cushioning material is vertically aligned with the induction coil and is disposed vertically above the induction coil and at least a portion of the second cushioning material is vertically aligned with the induction coil and is disposed vertically below the induction coil, the third cushioning material being disposed along a first side surface of a housing of the induction charger, and the fourth cushioning material being disposed along a second side surface of the housing, the induction coil being positioned so as to provide induction charging to an electrical device when the electrical device is positioned adjacent to the first cushioning material, wherein the induction charger is hidden so as to not be seen by a user of the furniture system.

2. The furniture system of claim 1, wherein a charging surface is located on or proximate to the first cushioning material such that the induction charger provides induction charging to the electrical device when the electrical device is positioned on the charging surface.

3. The furniture system of claim 2, wherein the transverse member further comprises an outer cover covering the first cushioning material, the second cushioning material, and the induction charger, the charging surface being disposed on or forming a portion of the outer cover.

4. The furniture system of claim 3, wherein the transverse member further comprises an inner cover that covers the first cushioning material, the second cushioning material and the induction charger, the inner cover being at least partially covered by the outer cover.

5. The furniture system of claim 3, wherein the outer cover is comprised of at least one of polyester, chenille, tweed, linen, velvet, leather, polyester linen, cotton, cotton blend, denim, twill, faux fur, or leather material.

6. The furniture system of claim 1, wherein the first cushioning material has a first depth and the second cushioning material has a second depth, the first depth being different than the second depth.

7. The furniture system of claim 6, wherein the second depth is greater than the first depth.

8. The furniture system of claim 1, wherein the first cushioning material and the second cushioning material each comprise a foam pad.

9. A furniture system that provides an electrical charging system for charging an electrical device, the furniture system comprising:
   - a base comprising a base frame, the base providing a seating surface;
   - a transverse member forming a backrest or an armrest secured to the base, the transverse member comprising a transverse member frame, a first cushioning material, a second cushioning material, an outer cover, and a charging surface being disposed on or forming a portion of the outer cover; and
   - an induction charger comprising an induction coil, the induction coil being disposed between the first cushioning material and the second cushioning material so as to provide induction charging to an electrical device when the electrical device is positioned on the charging surface, the outer cover covering the first cushioning material, the second cushioning material, and the induction coil so that the charging surface overlays the first cushioning material;
   - when the seating surface is horizontally disposed, at least a portion of the first cushioning material is vertically aligned with the induction coil and is disposed vertically above the induction coil and at least a portion of the second cushioning material is vertically aligned with the induction coil and is disposed vertically below the induction coil.

10. The furniture system of claim 9, wherein the transverse member further comprises an inner cover that covers the first cushioning material, the second cushioning material, and the induction charger, the inner cover being at least partially covered by the outer cover.

11. The furniture system of claim 9, wherein the outer cover is comprised of at least one of polyester, chenille, tweed, linen, velvet, leather, polyester linen, cotton, cotton blend, denim, twill, faux fur, or leather material.

12. The furniture system of claim 9, wherein the first cushioning material has a first depth and the second cushioning material has a second depth, the first depth being different than the second depth.

13. The furniture system of claim 9, wherein the first cushioning material and the second cushioning material each comprises a foam pad.

14. The furniture system of claim 9, further comprising a third cushioning material and a fourth cushioning material that are laterally disposed on opposing sides of the induction coil when the seating surface is horizontally disposed.

15. A furniture system that provides an electrical charging system for charging an electrical device, the furniture system comprising:
   - a base comprising a base frame, the base providing a seating surface;
   - a transverse member forming a backrest or an armrest secured to the base, the transverse member comprising a transverse member frame, a first cushioning material, a second cushioning material, a third cushioning material, and a fourth cushioning material; and
   - an induction charger comprising a housing and an induction coil disposed within the housing, the housing having a top surface, a bottom surface, and also a first side surface and a second side surface that each extend between the top surface and the bottom surface, the induction coil being disposed between the first cushioning material and the second cushioning material so as to provide induction charging to an electrical device positioned adjacent to the first cushioning material,
   - wherein the first cushioning material is disposed along the top surface of the housing, the second cushioning material is disposed along the bottom surface of the housing, the third cushioning material is disposed along the first side surface of the housing, and the fourth cushioning material is disposed along the second side surface of the housing;

when the seating surface is horizontally disposed, at least a portion of the first cushioning material is vertically aligned with the induction coil and is disposed vertically above the induction coil and at least a portion of the second cushioning material is vertically aligned with the induction coil and is disposed vertically below the induction coil.

16. The furniture system of claim 15, wherein a charging surface is located on or proximate to the first cushioning material such that the induction charger provides induction charging to the electrical device when the electrical device is positioned on the charging surface.

17. The furniture system of claim 16, wherein the first cushioning material is separate from the charging surface.

18. The furniture system of claim 16, wherein the first cushioning material is integral with the charging surface.

19. The furniture system of claim 16, wherein the charging surface is on a cover that is disposed over the first cushioning material.

* * * * *